(12) United States Patent
Nagahama et al.

(10) Patent No.: US 10,132,972 B2
(45) Date of Patent: *Nov. 20, 2018

(54) OPTICAL ELEMENT AND METHOD FOR PRODUCING THE SAME

(71) Applicant: DEXERIALS CORPORATION, Tokyo (JP)

(72) Inventors: Tsutomu Nagahama, Miyagi (JP); Hironori Yoshida, Miyagi (JP); Masaharu Senoue, Fukushima (JP); Masashi Enomoto, Tokyo (JP); Hiroyuki Itou, Miyagi (JP)

(73) Assignee: DEXERIALS CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/450,887

(22) Filed: Mar. 6, 2017

(65) Prior Publication Data

US 2017/0176656 A1 Jun. 22, 2017

Related U.S. Application Data

(63) Continuation of application No. 14/853,591, filed on Sep. 14, 2015, now Pat. No. 9,588,267, which is a (Continued)

(30) Foreign Application Priority Data

Dec. 9, 2008 (JP) .................................. 2008-313594
May 15, 2009 (JP) .................................. 2009-119341

(51) Int. Cl.
  *F21V 9/04* (2018.01)
  *F21V 9/06* (2018.01)
(Continued)

(52) U.S. Cl.
  CPC .................. *G02B 5/26* (2013.01); *B32B 3/30* (2013.01); *B32B 7/12* (2013.01); *B32B 15/08* (2013.01);
(Continued)

(58) Field of Classification Search
  CPC ........ G02B 5/208; G02B 5/282; G02B 5/223; G02B 5/26; G02B 1/04
(Continued)

(56) References Cited

U.S. PATENT DOCUMENTS 4,657,355 A  4/1987  Negishi
6,024,455 A  2/2000  O'Neill et al.
(Continued)

FOREIGN PATENT DOCUMENTS

JP  06-299139  10/1994
JP  09-316115  12/1997
(Continued)

OTHER PUBLICATIONS

Jun. 4, 2012 Extended European Search Report issued in European Patent Application No. 09831746.4.
(Continued)

*Primary Examiner* — William R Alexander
*Assistant Examiner* — Tamara Y Washington
(74) *Attorney, Agent, or Firm* — Oliff PLC

(57) ABSTRACT

An optical element is provided includes an optical layer having a flat incident surface on which light is incident and a wavelength-selective reflective layer disposed in the optical layer. Of light incident on the incident surface at an incident angle ($\theta$, $\varphi$), the optical element selectively directionally reflects light in at least one specific wavelength range in at least one direction other than a specular reflection direction ($-\theta$, $\varphi+180°$) while transmitting light in at least one wavelength range other than the specific wavelength
(Continued)

range, and is transparent to light in at least one wavelength range other than the specific wavelength range.

19 Claims, 41 Drawing Sheets

Related U.S. Application Data continuation of application No. 12/634,383, filed on Dec. 9, 2009, now Pat. No. 9,132,608.

(51) Int. Cl.

| | | |
|---|---|---|
| *G02B 5/08* | (2006.01) | |
| *G02B 5/20* | (2006.01) | |
| *G02B 5/26* | (2006.01) | |
| *B32B 3/30* | (2006.01) | |
| *B32B 7/12* | (2006.01) | |
| *B32B 17/06* | (2006.01) | |
| *G02B 5/124* | (2006.01) | |
| *G02B 27/12* | (2006.01) | |
| *B32B 15/08* | (2006.01) | |
| *B32B 15/20* | (2006.01) | |
| *B32B 27/20* | (2006.01) | |
| *B32B 27/30* | (2006.01) | |
| *B32B 27/36* | (2006.01) | |
| *E06B 3/66* | (2006.01) | |
| *G02B 5/02* | (2006.01) | |
| *G02B 5/04* | (2006.01) | |
| *E06B 3/67* | (2006.01) | |
| *G02B 5/12* | (2006.01) | |
| *G02B 5/23* | (2006.01) | |
| *G02B 5/28* | (2006.01) | |
| *E06B 9/24* | (2006.01) | |

(52) U.S. Cl.
CPC ............ *B32B 15/20* (2013.01); *B32B 17/06* (2013.01); *B32B 17/064* (2013.01); *B32B 27/20* (2013.01); *B32B 27/308* (2013.01); *B32B 27/365* (2013.01); *E06B 3/66* (2013.01); *E06B 3/6715* (2013.01); *E06B 9/24* (2013.01); *G02B 5/0231* (2013.01); *G02B 5/0294* (2013.01); *G02B 5/045* (2013.01); *G02B 5/12* (2013.01); *G02B 5/124* (2013.01); *G02B 5/208* (2013.01); *G02B 27/126* (2013.01); *B32B 2264/10* (2013.01); *B32B 2307/302* (2013.01); *B32B 2307/412* (2013.01); *B32B 2307/416* (2013.01); *B32B 2307/418* (2013.01); *B32B 2307/712* (2013.01); *B32B 2307/752* (2013.01); *B32B 2605/006* (2013.01); *E06B 2009/2417* (2013.01); *G02B 5/23* (2013.01); *G02B 5/282* (2013.01)

(58) Field of Classification Search
USPC .......................................................... 359/359
See application file for complete search history.

(56) References Cited

U.S. PATENT DOCUMENTS

| | | |
|---|---|---|
| 6,208,466 B1 | 3/2001 | Liu et al. |
| 7,229,351 B2 | 6/2007 | Haag et al. |
| 7,597,820 B2 | 10/2009 | Manabe et al. |
| 7,939,160 B2 | 5/2011 | Furuya et al. |
| 7,977,875 B2 | 7/2011 | Adachi et al. |
| 2002/0067547 A1 | 6/2002 | Epstein et al. |
| 2011/0267686 A1 | 11/2011 | Kageyama et al. |
| 2012/0092756 A1 | 4/2012 | Yoshida et al. |
| 2012/0154921 A1 | 6/2012 | Yoshida et al. |
| 2012/0300306 A1 | 11/2012 | Nagahama et al. |

FOREIGN PATENT DOCUMENTS

| | | |
|---|---|---|
| JP | 2001-089492 A | 4/2001 |
| JP | 2002-509277 A | 3/2002 |
| JP | 2002-530713 A | 9/2002 |
| JP | 2007-010893 A | 1/2007 |
| JP | 2007-152773 A | 6/2007 |
| WO | 05/087680 A1 | 9/2005 |
| WO | 2007/005357 A1 | 1/2007 |

OTHER PUBLICATIONS

May 22, 2015 Notice of Allowance issued in U.S. Appl. No. 12/634,381.
Jun. 19, 2014 Office Action issued in U.S. Appl. No. 12/634,383.
Nov. 12, 2013 Office Action issued in U.S. Appl. No. 12/634,383.
Jan. 23, 2013 Office Action issued in U.S. Appl. No. 12/634,383.
Oct. 14, 2010 Office Action issued in Japanese Patent Application No. 2010-111453.
Oct. 15, 2010 Office Action issued in Japanese Patent Application No. 2010-111454.
Mar. 16, 2010 Office Action issued in Japanese Patent Application No. 2009-119341.
Mar. 16, 2010 Office Action issued in Japanese Patent Application No. 2010-036858.
Mar. 16, 2010 Office Action issued in Japanese Patent Application No. 2010-036894.
Mar. 16, 2016 Office Action Issued in U.S. Appl. No. 14/853,591.

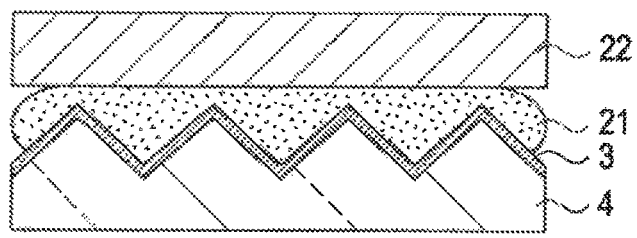
FIG. 11A
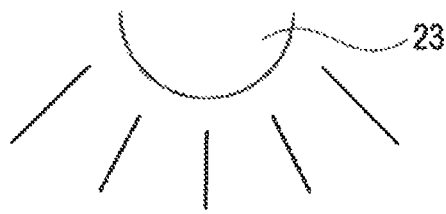
FIG. 11B
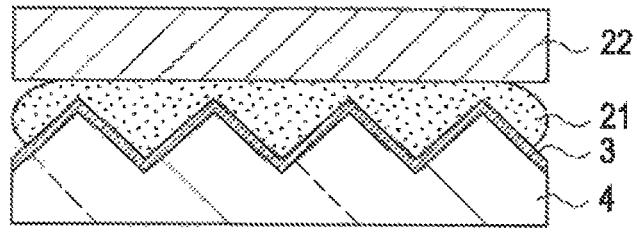
FIG. 11C
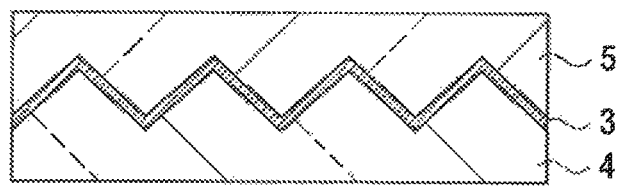

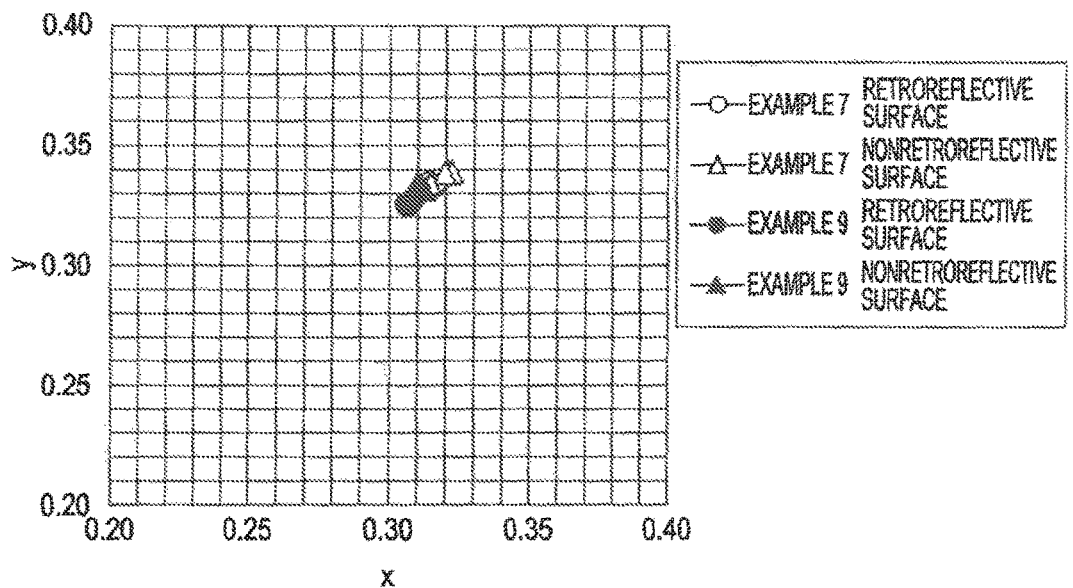
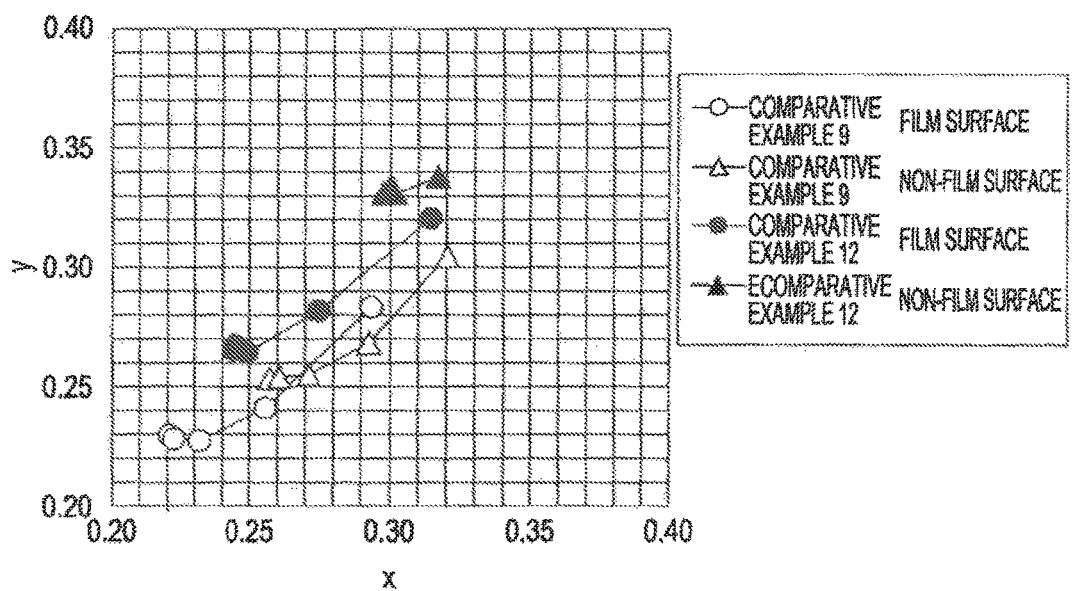

OPTICAL ELEMENT AND METHOD FOR PRODUCING THE SAME

CROSS REFERENCES TO RELATED APPLICATIONS

The present application is a Continuation of U.S. patent application Ser. No. 14/853,591 filed on Sep. 14, 2015, which claims priority to U.S. patent application Ser. No. 12/634,383 filed on Dec. 9, 2009, which claims priority to Japanese Priority Patent Application JP 2008-313594 filed in the Japan Patent Office on Dec. 9, 2008 and Japanese Priority Patent Application JP 2009-119341 filed in the Japan Patent Office on May 15, 2009, the entire contents of which is hereby incorporated by reference.

BACKGROUND

The present disclosure relates to optical elements and methods for producing optical elements. Specifically, the present disclosure relates to an optical element that selectively directionally reflects light in at least one specific wavelength range while transmitting light in at least one wavelength range other than the specific wavelength range.

Recently, building glass for high-rise buildings and houses and window glass for vehicles have increasingly been provided with layers for absorbing or reflecting some of sunlight. This IS one of the energy-conservation measures for preventing global warming and is aimed at reducing the load on air-conditioning systems that increases as more optical energy from sunlight enters an indoor space through a window to raise the indoor temperature thereof. The optical energy from sunlight is concentrated in the visible region, namely, a wavelength range from 380 to 780 nm, and the near infrared region, namely, a wavelength range from 780 to 2,100 nm. In particular, the transmittance of windows in the near infrared region, which is irrelevant to human visibility, is an important factor that determines the performance of highly transparent, highly heat-shielding windows.

Methods for shielding near infrared light while maintaining sufficient transmittance in the visible region include a method of providing window glass with a layer having high reflectance in the near infrared region and a method of providing window glass with a layer having high absorptance in the near infrared region.

For the first method, numerous techniques have been disclosed that use a reflective layer such as an optical laminated layer, a metal-containing layer, or a transparent conductive layer (see, for example, PCT International Publication No. WO 05/087680). Such a reflective layer, however, can only specularly reflect incident sunlight because the layer is provided on flat window glass. Accordingly, light coming from the sky is specularly reflected to reach another building or the ground, which absorbs the light as heat and therefore raises ambient temperature. This causes problems around a building with windows covered with such reflective layers, including an urban heat-island effect due to a local temperature rise and inhibition of lawn growth in a region irradiated with the reflected light.

For the second method, numerous techniques using organic dye films have been disclosed (see, for example, Japanese Unexamined Patent Application Publication No. 06-299139 and Japanese Patent Application Nos. 09-316115 and 2001-89492). A dye film attached to window glass, however, absorbs light as heat at the surface of the window and transfers some of the heat indoors as radiant heat, thus having problems such as insufficient shielding performance and the risk of the glass cracking due to thermal stress. Another problem is that the dye film has low weather resistance and is inconvenient for use at places where frequent replacement is difficult, such as high-rise buildings.

It is therefore desirable to provide an optical element capable of selectively directionally reflecting light in at least one specific wavelength range while transmitting light in at least one wavelength range other than the specific wavelength range and also to provide a method for producing such an optical element.

SUMMARY

According to an embodiment, there is provided an optical element including an optical layer having a flat incident surface on which light is incident and a wavelength-selective reflective layer disposed in the optical layer. Of light incident on the incident surface at an incident angle $(\theta, \varphi)$ (wherein $\theta$ is the angle of light incident on the incident surface or reflected light exiting through the incident surface with respect to a normal to the incident surface; $\varphi$ is the angle of a component of the incident light or the reflected light projected on the incident surface with respect to a specific line in the incident surface; and the specific line in the incident surface is the axis on which the reflection intensity in the $\varphi$ direction is maximized as the optical element is rotated about the normal to the incident surface thereof with the incident angle $(\theta, \varphi)$ fixed), the optical element selectively directionally reflects light in at least one specific wavelength range in at least one direction other than a specular reflection direction $(-\theta, \varphi+180°)$ while transmitting light in at least one wavelength range other than the specific wavelength range, and is transparent to light in at least one wavelength range other than the specific wavelength range. In the present specification, the term "flat" not only means being completely flat, but also means being substantially flat as long as it does not depart from the spirit of the present invention.

The above optical element can prevent light in at least one specific wavelength range from entering a predetermined space by directional reflection while allowing light in at least one wavelength range other than the specific wavelength range to enter the predetermined space. In addition, the intensity of light reflected in at least one specific direction other than the specular reflection direction is higher than that of specularly reflected light and is sufficiently higher than that of non-directional, diffuse reflected light. Thus, the above optical element can selectively directionally reflect light in at least one specific wavelength range while transmitting light in at least one wavelength range other than the specific wavelength range.

According to an embodiment, an optical element for selectively directionally reflecting light in a specific wavelength range while transmitting light in a wavelength range other than the specific wavelength range includes an optical layer having a flat incident surface on which light is incident and a wavelength-selective reflective film disposed in the optical layer. Of light incident on the incident surface at an incident angle $(\theta, \varphi)$ (wherein $\theta$ is the angle of light incident on the incident surface or reflected light exiting through the incident surface with respect to a normal to the incident surface; and $\varphi$ is the angle of a component of the incident light or the reflected light projected on the incident surface with respect to a specific line in the incident surface), the optical element selectively directionally reflects light in a specific wavelength range in a direction other than a specular reflection direction $(-\theta, \varphi+180°)$ while transmitting light in a wavelength range other than the specific wavelength range, and is transparent to light in the wavelength range other than the specific wavelength range.

Additional features and advantages are described herein, and will be apparent from the following Detailed Description and the figures.

BRIEF DESCRIPTION OF THE FIGURES

FIGS. 11A to 11C are process diagrams illustrating the example of the method for producing the directional reflector according to the first embodiment;

FIG. 50A is a graph showing reflection colors of the optical films of Examples 7 and 9 for retroreflective surface incidence and nonretroreflective surface incidence; and FIG. 50B is a graph showing reflection colors of the optical films of Comparative Examples 9 and 12 for film surface incidence and non-film surface incidence.

DETAILED DESCRIPTION

Embodiments will now be described with reference to the drawings in the following order:

1. First embodiment (example where structures are one-dimensionally arranged)
2. Second embodiment (example where structures are two-dimensionally arranged)
3. Third Embodiment (example where beads are used as structures)
4. Fourth embodiment (example where a louver wavelength-selective reflective layer is used)
5. Fifth embodiment (example where a self-cleaning layer is disposed on a directional reflector)
6. Sixth embodiment (example where a light scatterer is disposed in a directional reflector)
7. Seventh embodiment (example where a wavelength-selective reflective layer is directly formed on a window article)
8. Eighth embodiment (example where a directional reflector includes an optical layer having a double-layer structure)
9. Ninth embodiment (example where a barrier layer is disposed on or in a directional reflector)
10. Tenth embodiment (example where a hard coat layer is disposed on a directional reflector)
11. Eleventh embodiment (example where an antifouling layer is disposed on a hard coat layer on a directional reflector)

1. First Embodiment

Figure 1:
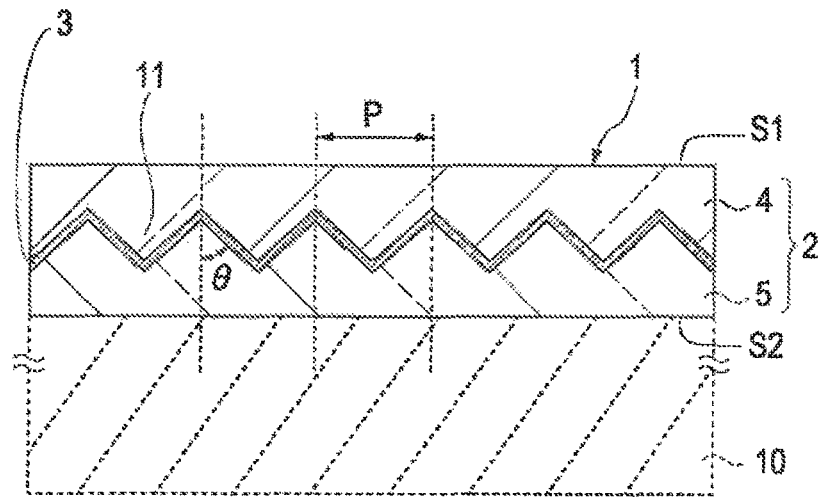
FIG. 1 is a sectional view showing an example of a directional reflector according to a first embodiment.

FIG. 1 is a sectional view showing an example of a directional reflector according to the first embodiment. As shown in FIG. 1, a directional reflector 1 includes an optical layer 2 and a wavelength-selective reflective layer 3 in the optical layer 2. The optical layer 2 includes a first optical layer 4 on a first main surface of the wavelength-selective reflective layer 3 and a second optical layer 5 on a second main surface of the wavelength-selective reflective layer 3. The directional reflector 1 has an incident surface S1 on which light such as sunlight is incident and an exit surface S2 through which, of the light incident on the incident surface S1, light passing through the optical layer 2 exits.

The directional reflector 1 is transparent, where the transparency level preferably falls within a transmitted-image clarity range described later. The first and second optical layers 4 and 5 preferably have a refractive index difference of 0.010 or less, more preferably 0.008 or less, and most preferably 0.005 or less. If the refractive index difference is more than 0.010, a transmitted image tends to appear blurred. If the refractive index difference is more than 0.008 and up to 0.010, no problem arises in everyday life, depending on outside brightness. If the refractive index difference is more than 0.005 and up to 0.008, an outside view can be clearly seen, although a very bright object such as a light source forms a noticeable diffraction pattern. If the refractive index difference is 0.005 or less, almost no diffraction pattern is observed. Of the first and second optical layers 4 and 5, the one bonded to, for example, a window article 10 can mainly contain an adhesive agent. With the optical layer mainly containing an adhesive agent, the directional reflector 1 can be bonded to the window article 10. In FIG. 1, the second optical layer 5 mainly contains an adhesive agent and is used to bond the directional reflector 1 to the window article 10. In this case, the refractive index difference between the adhesive agent and the other optical layer preferably falls within the above range.

The first and second optical layers 4 and 5 preferably have the same optical properties such as refractive index. Specifically, the first and second optical layers 4 and 5 are preferably formed of the same material transparent in the visible region. If the first and second optical layers 4 and 5 are formed of the same material, they have the same refractive index, thus contributing to improved transparency to visible light. It should be noted, however, that even films resulting finally from the same starting material could have different refractive indices, depending on, for example, the curing conditions in the film-forming step. On the other hand, if the first and second optical layers 4 and 5 are formed of different materials, they have different refractive indices. As a result, a transmitted image tends to appear blurred because of light refraction at the wavelength-selective reflective layer 3. In particular, a problem arises in that a noticeable diffraction pattern is observed when viewing an object close to a point source such as a distant electric light.

The first and second optical layers 4 and 5 are preferably transparent in the visible region. Here the term "transparent" has two different meanings: the absence of light absorption and the absence of light scattering. Although the term "transparent" may generally mean only the absence of light absorption, it is understood herein to have both meanings. Currently used retroreflectors are attached to, for example, road signs and clothing for night-time workers in order for people to see reflected light for indication purposes. For example, even though a retroreflector has light-scattering properties, the reflected light is visible if it is closely fitted on a base reflector. This is based on the same mechanism as, for example, the fact that an image is visible on a front surface of an image display device even if an antiglare finish having light-scattering properties is applied in order to impart antiglare properties. In contrast, the directional reflector 1 according to this embodiment transmits light in at least one wavelength range other than at least one specific wavelength range where it directionally reflects light. The directional reflector 1 is configured not to scatter light because it is bonded to a transparent object that mainly transmits light in at least one transmission wavelength range so that transmitted light can be observed. For some applications, however, the second optical layer 5 can be configured to scatter light.

The directional reflector 1 is preferably bonded to a rigid object, such as the window article 10, that is mainly transparent to transmitted light in at least one wavelength range other than the specific wavelength range using, for example, an adhesive agent. The window article 10 is, for example, a building window article for high-rise buildings and houses or a window article for vehicles. If the directional reflector 1 is applied to a building window article, the directional reflector 1 is preferably applied to a window article 10 facing any direction between east and south or between south and west (for example, a direction between southeast and southwest). Applied to the window article 10 thus oriented, the directional reflector 1 can more effectively reflect thermal radiation. The directional reflector 1 can be used not only for a monolayer window, but also for a special window such as a double-glazed window. In addition, the window article 10 is not limited to glass, but may instead be a transparent polymer material. The optical layer 2 is preferably transparent in the visible region. If the optical layer 2 is transparent in the visible region, the directional reflector 1 transmits visible light when bonded to the window article 10, such as window glass, thus taking in sufficient sunlight. In addition, the directional reflector 1 can be bonded to the inner surface of the window article 10, rather than to the outer surface thereof. If the directional reflector 1 is bonded to the inner surface, the directional reflection direction should be oriented to the intended direction by adapting the orientations of the front and back sides of structures 11 and the in-plane orientation thereof.

For the directional reflector 1 to be easily bonded to the window article 10, the directional reflector 1 preferably has flexibility. Examples of the shape of the directional reflector 1 include, but not limited to, a film shape, a sheet shape, a plate shape, and a block shape.

In addition, the directional reflector 1 can be used in combination with another thermal-radiation shielding film. For example, a light-absorbing coating can be disposed at the interface between air and the optical layer 2. The directional reflector 1 can also be used in combination with functional layers such as a hard coat layer, an ultraviolet-shielding layer, and an antireflection layer. If these functional layers are used, they are preferably disposed at the interface between air and the directional reflector 1. However, if a directional reflector 1 having an ultraviolet-shielding layer is bonded to an inner surface of a window separating indoor and outdoor spaces, the directional reflector 1 is preferably bonded with the ultraviolet-shielding layer between the window surface and the directional reflector 1 so that the ultraviolet-shielding layer is disposed on the sun side of the directional reflector 1. In this case, it is also possible to mix an ultraviolet absorber in an adhesive layer between the window surface and the directional reflector 1.

In addition, the directional reflector 1 may be colored for design purposes depending on the application of the directional reflector 1. If the directional reflector 1 is colored for design purposes, the optical layer 2 is preferably configured to absorb only light in at least one specific wavelength range without losing transparency.

In addition, although not shown, the directional reflector 1 can be held between two opposing glass substrates to form laminated glass. In this case, intermediate layers are provided between the individual glass substrates and the directional reflector 1. These intermediate layers function as adhesive layers when subjected to, for example, thermocompression, thus forming the laminated glass. The intermediate layers can be formed of, for example, polyvinyl butyral (PVB). Preferably, the intermediate layers also function to prevent the laminated glass from shattering in case it is broken. If the laminated glass is used as a window installed in a vehicle, the directional reflector 1 reflects heat radiation to prevent a sharp temperature rise in the vehicle. The laminated glass can be used for a wide variety of applications including all modes of transportation such as vehicles, trains, aircraft, and vessels and rides at theme parks. The two glass substrates may be curved, depending on applications. In this case, the directional reflector 1 preferably follows the curve of the glass substrates and maintains its directional reflectivity and transparency to a certain degree when curved. Because it is desirable for the laminated glass to be transparent to a certain degree as a whole, the material used for the intermediate layers (for example, resin) and the resin contained in the directional reflector 1 preferably have the same or similar refractive indices. It is also possible to omit the intermediate layers and use the resin contained in the directional reflector 1 to bond it to the glass substrates. In this case, it is preferable to use a resin that deforms the least during, for example, a thermocompression step for bonding. The two opposing substrates are not limited to glass, and one or both of them may instead be, for example, resin films, sheets, or plates. For example, lightweight, strong, flexible engineering plastics and reinforced plastics can be used.

Figure 2:
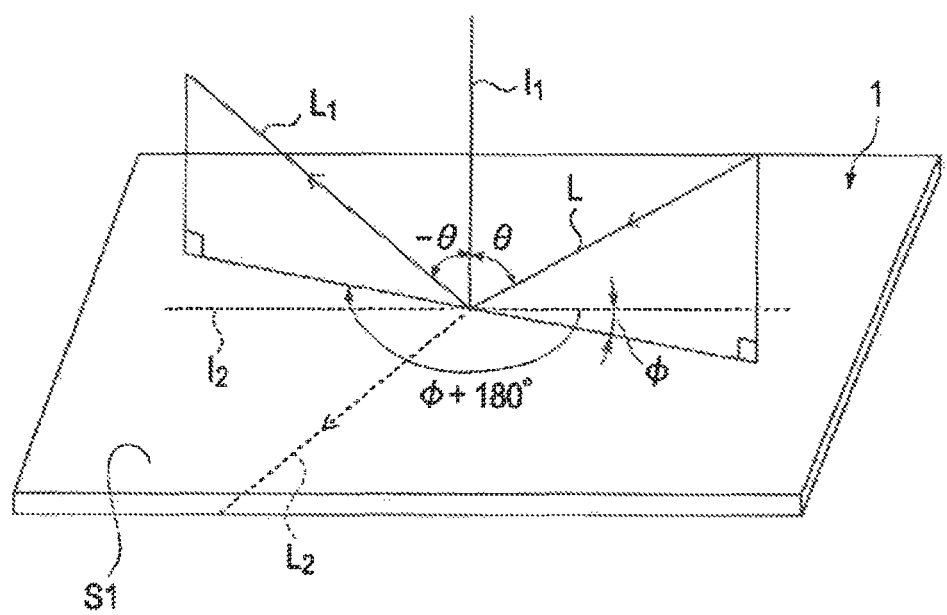
FIG. 2 is a perspective view illustrating the relationship between incident light incident on the directional reflector and reflected light reflected by the directional reflector.

FIG. 2 is a perspective view illustrating the relationship between incident light incident on the directional reflector 1 and reflected light reflected by the directional reflector 1. The directional reflector 1 has the incident surface S1 on which light L is incident. Of the light L incident on the incident surface S1 at an incident angle ($\theta$, $\varphi$), the directional reflector 1 selectively directionally reflects light $L_1$ in at least one specific wavelength range in at least one direction other than a specular reflection direction ($-\theta$, $\varphi+180°$) while transmitting light $L_2$ in at least one wavelength range other than the specific wavelength range. The directional reflector 1 is transparent to light in at least one wavelength range other than the specific wavelength range, where the transparency level preferably falls within the transmitted-image clarity range described later. The symbol $\theta$ denotes the angle of the incident light L or the reflected light $L_1$ with respect to a normal $l_1$ to the incident surface S1. The symbol $\varphi$ denotes the angle of the component of the incident light L or the reflected light $L_1$ projected on the incident surface S11 with respect to a specific line $l_2$ in the incident surface S1. The specific line $l_2$ in the incident surface S1 is the axis on which the reflection intensity in the $\varphi$ direction is maximized as the directional reflector 1 is rotated about the normal $l_1$ to the incident surface S1 thereof with the incident angle (θ, φ) fixed (see FIGS. 3 and 4). If the reflection intensity is maximized on different axes (in different directions), one of them is selected as the line $l_2$. The angle θ of an axis rotated clockwise with respect to the normal $l_1$ is referred to as "+θ", whereas the angle θ of an axis rotated counterclockwise with respect to the normal $l_1$ is referred to as "−θ". The angle φ of an axis rotated clockwise with respect to the line $l_2$ is referred to as "+φ", whereas the angle φ of an axis rotated counterclockwise with respect to the line $l_2$ is referred to as "−φ".

The specific wavelength range in which the directional reflector 1 selectively directionally reflects light and the wavelength range in which the directional reflector 1 transmits light depend on the application of the directional reflector 1. For example, if the directional reflector 1 is applied to the window article 10, the specific wavelength range in which the directional reflector 1 selectively directionally reflects light is preferably the near infrared region, and the wavelength range in which the directional reflector 1 transmits light is preferably the visible region. Specifically, the specific wavelength range in which the directional reflector 1 selectively directionally reflects light is preferably mainly a near infrared region from 780 to 2,100 nm. If the directional reflector 1 is configured to reflect near infrared light, it can be bonded to a window article such as window glass to alleviate an indoor temperature rise. This reduces cooling load, thus contributing to energy conservation. Here the term "directional reflection" means that the intensity of light reflected in at least one specific direction other than the specular reflection direction is higher than that of specularly reflected light and is sufficiently higher than that of non-directional, diffuse reflected light. Here the term "reflect" means that the reflectance in at least one specific wavelength range, for example, in the near infrared region, is preferably 30% or more, more preferably 50% or more, and most preferably 80% or more. The term "transmit" means that the transmittance in at least one specific wavelength range, for example, in the visible region, is preferably 30% or more, more preferably 50% or more, and most preferably 70% or more.

The angle φo of the directional reflected light preferably falls within the range from −90° to 90°. In this case, the directional reflector 1, when bonded to the window article 10, allows a component in at least one specific wavelength range in light coming from the sky to be returned skyward. This range is effective unless the directional reflector 1 is surrounded by tall buildings. In addition, the angle of the directionally reflected light preferably lies near (θ, −φ). Specifically, the directional reflection direction is preferably inclined at an angle of 5° or less, more preferably 3° or less, and most preferably 2° or less, with respect to (θ, −φ). If the directional reflection direction falls within this range, the directional reflector 1, when bonded to the window article 10, allows a component in at least one specific wavelength range in light coming from the sky above a mass of buildings of similar heights to be efficiently returned to the sky above another building. To achieve such directional reflection, the directional reflector 1 preferably has three-dimensional structures such as partial spheres or hyperbolas, triangular pyramids, quadrangular pyramids, or cones. Light incident in a (θ, φ)) direction (where −90°<φ<90°) can be reflected in a (θo, φo) direction (where 0°<θo<90° and −90°<φo<90°), depending on the shape of the structures. It is also preferable to form columns extending in one direction. Based on the inclination of the columns, light incident in a (θ, φ) direction (where −90°<φ<90°) can be reflected in a (θo, −φ) direction (where 0°<θo<90°).

The angle of the directional reflected light in the specific wavelength range preferably lies near the retroreflection direction; that is, the angle of a reflected component in the specific wavelength range in light incident on the incident surface S1 at the incident angle (θ, φ) preferably lies near (θ, φ). In this case, the directional reflector 1, when bonded to the window article 10, allows a component in at least one specific wavelength range in light coming from the sky to be returned skyward. Specifically, the directional reflection direction is preferably inclined at an angle of 5° or less, more preferably 3° or less, and most preferably 2° or less, with respect to (θ, φ). If the directional reflection direction falls within this range, the directional reflector 1, when bonded to the window article 10, allows a component in at least one specific wavelength range in light coming from the sky to be efficiently returned skyward. The directional reflection direction does not have to be exactly the same as the incident direction because no sensing in a specific direction is performed, unlike infrared sensing or infrared image acquisition, in which an infrared emitter and an infrared receiver are disposed close to each other and the reflection direction is adjusted to the incident direction.

The value of image clarity measured using an optical comb with a comb width of 0.5 mm in the wavelength range where light is transmitted is preferably 50 or more, more preferably 60 or more, and most preferably 75 or more. If the value of image clarity is less than 50, a transmitted image tends to appear blurred. If the value of image clarity is at least 50 and less than 60, no problem arises in everyday life, depending on outside brightness. If the value of image clarity is at least 60 and less than 75, an outside view can be clearly seen, although a diffraction pattern may be noticeable only for a very bright object such as a light source. If the value of image clarity is 75 or more, almost no diffraction pattern is observed. In addition, the sum of the values of image clarity measured using optical combs with comb widths of 0.125 mm, 0.5 mm, 1.0 mm, and 2.0 mm is preferably 230 or more, more preferably 270 or more, and most preferably 350 or more. If the sum of the values of image clarity is less than 230, a transmitted image tends to appear blurred. If the sum of the values of image clarity is at least 230 and less than 270, no problem arises in everyday life, depending on outside brightness. If the sum of the values of image clarity is at least 270 and less than 350, an outside view can be clearly seen, although a very bright object such as a light source forms a noticeable diffraction pattern. If the sum of the values of image clarity is 350 or more, almost no diffraction pattern is observed. Here the values of image clarity are measured using ICM-1T, manufactured by Suga Test Instruments Co., Ltd., according to JIS K 7105. If the wavelength range where light is to be transmitted differs from that of a D65 light source, it is preferable to carry out the measurement after calibration using a filter corresponding to the wavelength range where light is to be transmitted.

The haze in the wavelength range where light is transmitted is preferably 6% or less, more preferably 4% or less, and most preferably 2% or less. If the haze exceeds 6%, a transmitted image appears fogged because of light scattering. Here the haze is measured using HM-150, manufactured by Murakami Color Research Laboratory Co., Ltd., by a measurement method according to JIS K 7136. If the wavelength range where light is to be transmitted differs from that of a D65 light source, it is preferable to carry out the measurement after calibration using a filter corresponding to the wavelength range where light is to be transmitted. The incident surface S1 of the directional reflector 1, preferably both the incident surface S1 and the exit surface S2, has flatness in order not to decrease image clarity. Specifically, the incident surface S1 and the exit surface S2 preferably have an arithmetic average roughness Ra of 0.08 μm or less, more preferably 0.06 μm or less, and most preferably 0.04 μm or less. Here the arithmetic average roughness Ra is determined by measuring the surface roughness of the incident surface S1, obtaining a roughness curve from a two-dimensional profile curve, and calculating the arithmetic average roughness Ra as a roughness parameter. The measurement conditions comply with JIS B0601:2001. The measurement instrument used and the measurement conditions may be as follows:

Measurement instrument: the automatic microprofile-measuring instrument Surfcorder ET4000A (manufactured by Kosaka Laboratory Ltd.)

λc=0.8 mm; evaluation length=4 mm; cutoff=5;

data sampling interval=0.5 μm

The transmission color of the directional reflector 1 is preferably as neutral as possible and, if colored, is preferably a light color that appears cool, such as blue, blue-green, or green. To achieve such a color, the chromaticity coordinates x and y of the transmitted light incident on the incident surface S1, passing through the optical layer 2 and the wavelength-selective reflective layer 3, and exiting through the exit surface S2, and the chromaticity coordinates x and y of the reflected light preferably satisfy, for example, 0.20<x<0.35 and 0.20<y<0.40, more preferably 0.25<x<0.32 and 0.25<y<0.37, and most preferably 0.30<x<0.32 and 030<y<0.35, in the case of illumination from a D65 light source. For the light not to look reddish, additionally, it is preferable to satisfy y>x=−0.02, more preferably y>x. If the reflection color varies with the incident angle, a building window, for example, to which the directional reflector 1 is applied undesirably has different colors when viewed from different places or appears to change color when viewed during walking. To alleviate such color variations, the absolute value of the difference in the chromaticity coordinate x of light incident on the incident surface S1 or the exit surface S2 in the range of incident angle θ from 0° to 60° and specularly reflected by the directional reflector 1 (the optical element) and the absolute value of the difference in the chromaticity coordinate y of the light are each preferably 0.05 or less, more preferably 0.03 or less, and most preferably 0.01 or less, for each main surface of the directional reflector 1. The above numerical limitations of the chromaticity coordinates x and y of the reflected light are preferably satisfied for both the incident surface S1 and the exit surface S2.

First Optical Layer

The first optical layer 4 is, for example, a support for supporting the wavelength-selective reflective layer 3. The first optical layer 4 also serves to improve transmitted-image clarity and total light transmittance and to protect the wavelength-selective reflective layer 3. The first optical layer 4 has, for example, a film shape, a sheet shape, a plate shape, or a block shape. For the directional reflector 1 to be easily bonded to the window article 10, the first optical layer 4 preferably has a film shape or a sheet shape. The first optical layer 4 can be formed of, for example, a thermoplastic resin such as polycarbonate or a radiation-curable resin such as acrylic resin.

To improve the design of the directional reflector 1 or the window article 10, the first optical layer 4 preferably absorbs light in at least one specific wavelength range in the visible region. Either an organic pigment or an inorganic pigment may be dispersed in the resin, although an inorganic pigment is preferred for its high weather resistance. Specific examples include inorganic pigments such as zircon grey (cobalt-nickel-doped $ZrSiO_4$), praseodymium yellow (praseodymium-doped $ZrSiO_4$), chrome-titanium yellow (chromium-antimony-doped $TiO_2$ or chromium-tungsten doped $TiO_2$), chrome green (e.g., $Cr_2O_3$), peacock blue ((CoZn)O (AlCr)$_2O_3$), Victoria green ((AlCr)$_2O_3$), dark blue (CoO.Al$_2O_3$.SiO$_2$), vanadium-zirconium blue (vanadium-doped $ZrSiO_4$), chrome-tin pink (chromium-doped CaO.SnO$_2$.SiO$_2$), manganese pink (manganese-doped $Al_2O_3$), and coral pink (iron-doped $ZrSiO_4$) and organic pigments such as azo pigments and phthalocyanine pigments.

The first optical layer 4 has, for example, a one-dimensional array of structures 11 on a surface on which the wavelength-selective reflective layer 3 is disposed. The pitch P of the structures 11 is, for example, from 5 μm to 5 mm, preferably from 30 μm to 5 mm, more preferably from 10 μm to less than 250 μm, and most preferably from 20 μm to 200 μm. If the pitch P of the structures 11 falls below 5 μm, it is difficult to form the structures 11 in a desired shape, and the wavelength-selective reflective layer 3 may reflect some of light in the transmission wavelength range because it is generally difficult to make its wavelength selectivity steep. Such reflection tends to decrease transparency because higher-order reflections are observed due to diffraction. If the pitch P of the structures 11 exceeds 5 mm, the film thickness, which depends on the shape of the structures 11 that achieves directional reflection, is so large that the directional reflector 1 is no longer flexible. This makes it difficult to bond the directional reflector 1 to a rigid object such as the window article 10.

The shape of the structures 11 formed on the first optical layer 4 is not limited to a single type of shape, but different types of structures 11 may be formed on the first optical layer 4. If different types of structures 11 are formed, a predetermined pattern of different types of structures 11 may be repeated periodically. Alternatively, depending on the desired properties, different types of structures 11 may be formed randomly (nonperiodically).

Figure 3A:
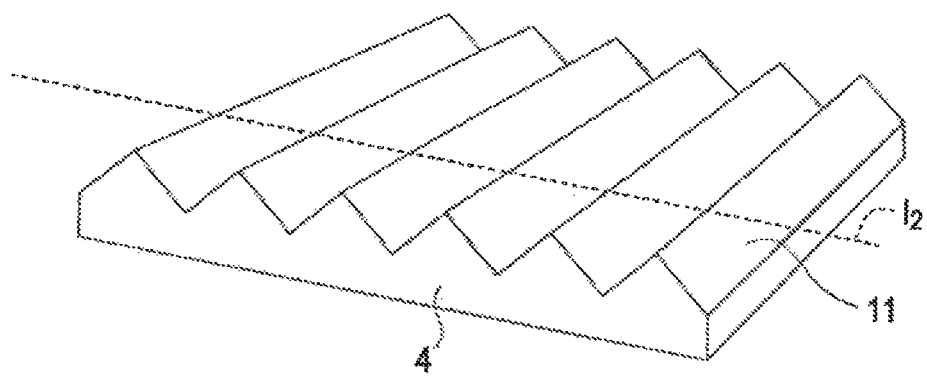
FIGS. 3A to 3C are perspective views showing examples of the shape of structures formed on a first optical layer.
Figure 3B:
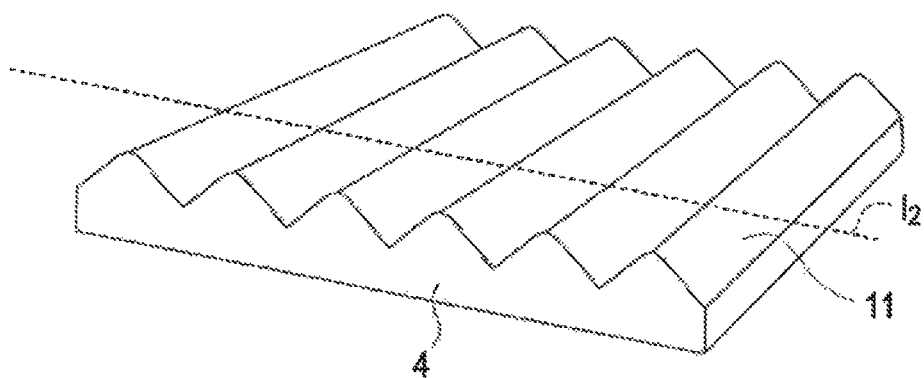
Figure 3C:
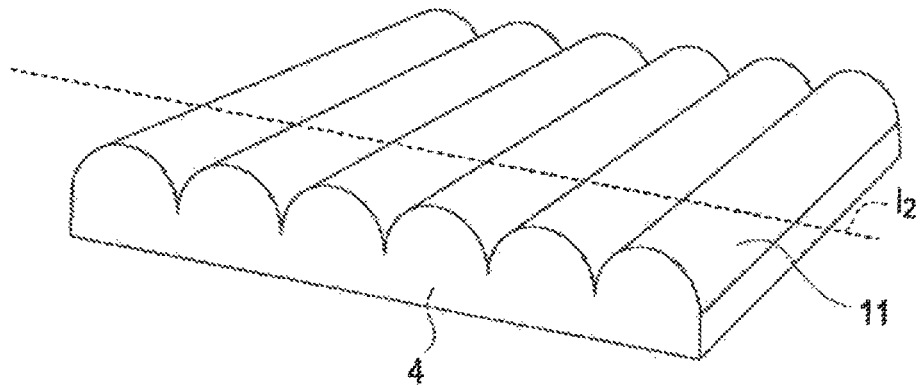

FIGS. 3A to 3C are perspective views showing examples of the shape of the structures 11 formed on the first optical layer 4. The structures 11 are columnar protrusions extending in one direction and one-dimensionally arranged in one direction. The wavelength-selective reflective layer 3, formed on the structures 11, has the same surface profile as the structures 11.

Examples of the shape of the structures 11 include a prism shape shown in FIG. 3A, a rounded-top prism shape shown in FIG. 3B, a cylindrical shape shown in FIG. 3C, and inverted shapes thereof. The shape of the structures 1, however, is not limited to the shapes shown in FIGS. 3A to 3C or the inverted shapes thereof, but other examples include a toroidal shape, a hyperbolic cylindrical shape, an elliptical cylindrical shape, a polygonal prism shape, and a free-form shape. If the structures 11 are formed in a prism shape (for example, a triangular prism shape), they have an inclination θ of, for example, 45°. If the directional reflector 1 is applied to the window article 10, the structures 11 preferably have at least 45° inclined flat or curved surfaces so that a larger proportion of the light coming from the sky can be reflected skyward. If the structures 11 have such a shape, the incident light is returned skyward by substantially one reflection. This allows the incident light to be efficiently reflected skyward even if the wavelength-selective reflective layer 3 does not have high reflectance, and also reduces light absorption at the wavelength-selective reflective layer 3.

Figure 4A:
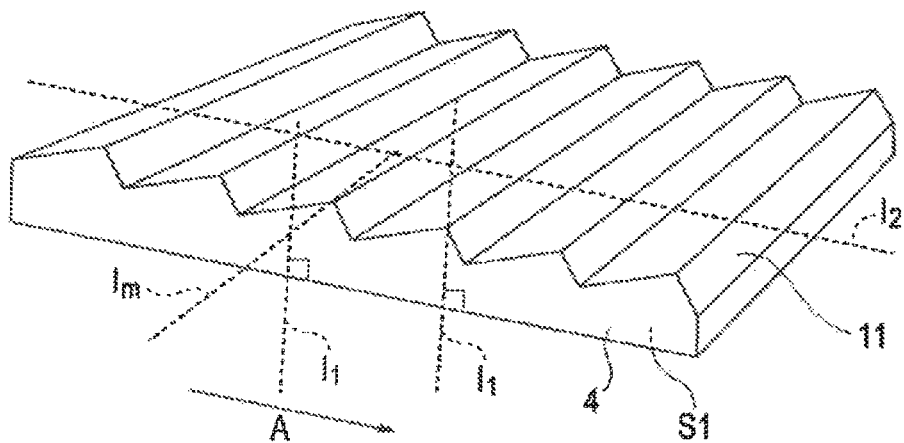
FIG. 4A is a perspective view showing an example of the shape of the structures formed on the first optical layer.
Figure 4B:
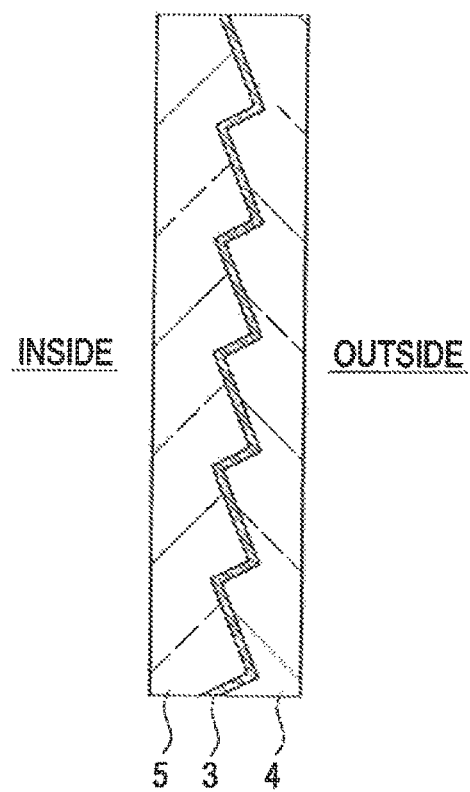
FIG. 4B is a sectional view showing the direction in which the major axis of the structures formed on the first optical layer is inclined.

Referring to FIG. 4A, alternatively, the shape of the structures 11 may be asymmetrical with respect to the normal $l_1$ to the incident surface S1 of the directional reflector 1. In this case, the major axis $l_m$ of the structures 11 is inclined in the direction A in which the structures 11 are arranged with respect to the normal $l_1$. Here the major axis $l_m$ of the structures 11 refers to a line passing through the midpoint of the bottom of the cross section of the structures 1 and the top of the cross section. If the directional reflector 1 is bonded to a window article 10 perpendicular to the ground, as shown in FIG. 4B, the major axis $l_m$ of the structures 11 is preferably inclined downward (toward the ground) with respect to the normal $l_1$. In general, a larger amount of heat enters through a window in the early afternoon, when the solar altitude angle is mostly larger than 45°. The above shape allows light incident at such large angles to be efficiently reflected upward. In the example shown in FIGS. 4A and 4B, the structures 11 have a prism shape asymmetrical with respect to the normal $l_1$. The structures 11 may also have another shape asymmetrical with respect to the normal $l_1$, for example, a corner cube shape asymmetrical with respect to the normal $l_1$.

Second Optical Layer

The second optical layer 5 serves to improve transmitted-image clarity and total light transmittance and to protect the wavelength-selective reflective layer 3. The second optical layer 5 can be formed of, for example, a thermoplastic resin such as polycarbonate or a radiation-curable resin such as acrylic resin. The second optical layer 5 may also be formed as an adhesive layer to bond the directional reflector 1 to the window article 10 with the adhesive layer therebetween. The adhesive layer can be formed of, for example, a pressure-sensitive adhesive (PSA) or an ultraviolet-curable resin.

To improve the design of the directional reflector 1, the second optical layer 5 may function to absorb light in at least one specific wavelength range. The second optical layer 5 having such a function can be formed of, for example, a material prepared by dispersing a pigment in the resin serving as the major constituent of the second optical layer 5. The pigment dispersed in the resin may be either an organic pigment or an inorganic pigment, although an inorganic pigment is preferred for its high weather resistance. Specific examples include inorganic pigments such as zircon grey (cobalt-nickel-doped $ZrSiO_4$), praseodymium yellow (praseodymium-doped $ZrSiO_4$), chrome-titanium yellow (chromium-antimony-doped $TiO_2$ or chromium-tungsten doped $TiO_2$), chrome green (e.g., $Cr_2O_3$), peacock blue $((CoZn)O(AlCr)_2O_3)$, Victoria green $((AlCr)_2O_3)$, dark blue $(CoO.Al_2O_3.SiO_2)$, vanadium-zirconium blue (vanadium-doped $ZrSiO_4$), chrome-tin pink (chromium-doped $CaO.Sn_2.SiO_2$), manganese pink (manganese-doped $Al_2O_3$), and coral pink (iron-doped $ZrSiO_4$) and organic pigments such as azo pigments and phthalocyanine pigments.

Wavelength-Selective Reflective Layer

The wavelength-selective reflective layer (wavelength-selective reflective film) 3 can be, for example, a laminated layer (a laminated film), a transparent conductive layer (a transparent conductive film), or a functional layer (a functional film). The wavelength-selective reflective layer 3 can also be formed of a combination of two or more of a laminated layer, a transparent conductive layer, and a functional layer. The wavelength-selective reflective layer 3 preferably has an average thickness of 20 µm or less, more preferably 5 µm or less, and most preferably 1 µm or less. If the wavelength-selective reflective layer 3 has an average thickness of more than 20 µm, a transmitted image tends to appear distorted because the transmitted light is refracted over an extended optical path. The wavelength-selective reflective layer 3 can be formed by, for example, sputtering, evaporation, dip coating, or die coating.

A laminated layer, a transparent conductive layer, and a functional layer will be described below.

Laminated Layer

The laminated layer is formed by, for example, alternately laminating low-refractive-index layers and high-refractive-index layers having different refractive indices. Alternatively, the laminated layer is formed by, for example, alternately laminating metal layers having high reflectance in the infrared region and optical transparent layers having a high refractive index in the visible region and therefore functioning as an antireflection layer, or transparent conductive layers.

The metal layers having high reflectance in the infrared region mainly contain, for example, gold, silver, copper, aluminum, nickel, chromium, titanium, palladium, cobalt, silicon, tantalum, tungsten, molybdenum, germanium, or an alloy containing two or more of the above metals. Of these, silver, copper, aluminum, silicon, germanium, and alloys thereof are preferred from the practical viewpoint. If the metal layers are formed of an alloy, they preferably mainly contain, for example, aluminum-copper alloy, aluminum-titanium alloy, aluminum-chromium alloy, aluminum-cobalt alloy, aluminum-neodymium-copper alloy, aluminum-magnesium-silicon alloy, silver-palladium-copper alloy, silver-palladium-titanium alloy, silver-copper-titanium alloy, silver-palladium-calcium alloy, silver-palladium-magnesium alloy, silver-palladium-iron alloy, silver, or silicon-boron alloy. It is also preferable to add another material such as titanium or neodymium to the metal layers to prevent corrosion of the metal layers. The addition of such a material is preferred particularly if the metal layers contain silver.

The optical transparent layers have a high refractive index in the visible region and therefore function as antireflection layers. The optical transparent layers mainly contain, for example, a high-k dielectric such as niobium oxide, tantalum oxide, or titanium oxide. The transparent conductive layers mainly contain, for example, zinc oxide or indium-doped tin oxide.

The laminated layer is not limited to one formed by laminating inorganic thin films, but may be formed by laminating polymer thin films or polymer layers in which fine particles are dispersed. To inhibit degradation of the underlying metal layers due to oxidation during the formation of the optical transparent layers, thin buffer layers, such as titanium layers, may be formed to a thickness of several nanometers at the interfaces of the optical transparent layers. Here the buffer layers inhibit oxidation of the underlying metal layers by self-oxidation during the formation of the overlying layers.

Transparent Conductive Layer

The transparent conductive layer mainly contains a conductive material transparent in the visible region. Specifically, the transparent conductive layer mainly contains a transparent conductive material such as tin oxide, zinc oxide, a carbon-nanotube containing material, indium-doped tin oxide, indium-doped zinc oxide, or antimony-doped tin oxide. It is also possible to use a layer in which nanoparticles, nanorods, or nanowires of the above conductive materials are dispersed in the resin in a high concentration.

Functional Layer

The functional layer mainly contains a chromic material, whose properties, including reflection performance, change reversibly in response to external stimuli. A chromic material reversibly changes its structure in response to external stimuli such as heat, light, or intruding molecules. The chromic material used can be, for example, a photochromic material, a thermochromic material, a gasochromic material, or an electrochromic material.

A photochromic material reversibly changes its structure in response to light. A photochromic material can be irradiated with, for example, ultraviolet light to reversibly change its various properties such as reflectance and color. The photochromic material used can be, for example, a transition metal oxide such as $TiO_2$, $WO_3$, $MoO_3$, or $Nb_2O_5$ doped with chromium, iron, or nickel. It is also possible to stack a film with a different refractive index to improve wavelength selectivity.

A thermochromic material reversibly changes its structure in response to heat. A thermochromic material can be heated to reversibly change its various properties such as reflectance and color. The thermochromic material used can be, for example, $VO_2$. It is also possible to add an element such as tungsten, molybdenum, or fluorine to control transition temperature or transition curve. In addition, a thin film mainly containing a thermochromic material such as $VO_2$ may be held between antireflection layers mainly containing a high-refractive-index material such as $TiO_2$ or indium tin oxide (ITO) to form a multilayer structure.

It is also possible to use a photonic lattice such as a cholesteric liquid crystal. A cholesteric liquid crystal can selectively reflect light of the wavelength corresponding to its layer interval. Because the layer interval changes with temperature, the properties such as reflectance and color can be reversibly changed by heating. In this case, several cholesteric liquid crystal layers with different layer intervals can be used to achieve an extended reflection wavelength range.

An electrochromic material can be supplied with electricity to reversibly change its various properties such as reflectance and color. The electrochromic material used can be, for example, one that reversibly changes its structure when a voltage is applied thereto. More specifically, the electrochromic material used can be, for example, a reflective light-controlling material whose reflection properties change when the material is doped or dedoped with, for example, protons. A specific example of a reflective light-controlling material is a material whose optical properties can be controlled to a transparent state, a mirror state, and/or an intermediate state by external stimuli. The reflective light-controlling material used can be, for example, a magnesium-nickel alloy, an alloy material mainly containing a magnesium-titanium alloy, $WO_3$, or a material containing microcapsules in which needle crystals with selective reflectivity are enclosed.

A specific example of the structure of the functional layer is a structure in which the above alloy film, a catalytic film such as a palladium-containing film, a buffer layer such as a thin aluminum layer, an electrolytic layer such as a $Ta_2O_5$ layer, an ion-storing layer containing protons such as a $WO_3$ layer, and a transparent conductive layer are stacked on the second optical layer 5. Another example is a structure in which a transparent conductive layer, an electrolytic layer, an electrochromic layer such as a $WO_3$ layer, and another transparent conductive layer are stacked on the second optical layer 5. In such structures, a voltage can be applied between the transparent conductive layer and the counter electrode to cause the alloy film to be doped or dedoped with protons from or to the electrolytic layer, thus changing the transmittance of the alloy film. It is also preferable to stack a layer of a high-refractive-index material such as $TiO_2$ or ITO on the electrochromic layer to improve wavelength selectivity. Another example is a structure in which a transparent conductive layer, an optical transparent layer having microcapsules dispersed therein, and a transparent electrode are stacked on the second optical layer 5. In this structure, the optical transparent layer can be converted into a transparent state, in which the needle crystals in the microcapsules are oriented, by applying a voltage between the two transparent electrodes, and can be converted into a wavelength-selective reflection state, in which the needle crystals face in all directions, by removing the voltage.

Function of Directional Reflector

Figure 5:
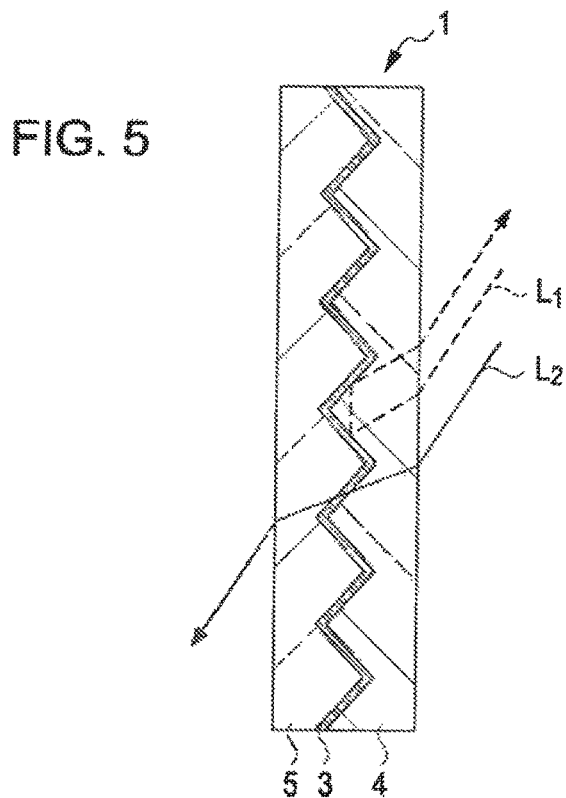
FIG. 5 is a sectional view illustrating an example of the function of the directional reflector.
Figure 6:
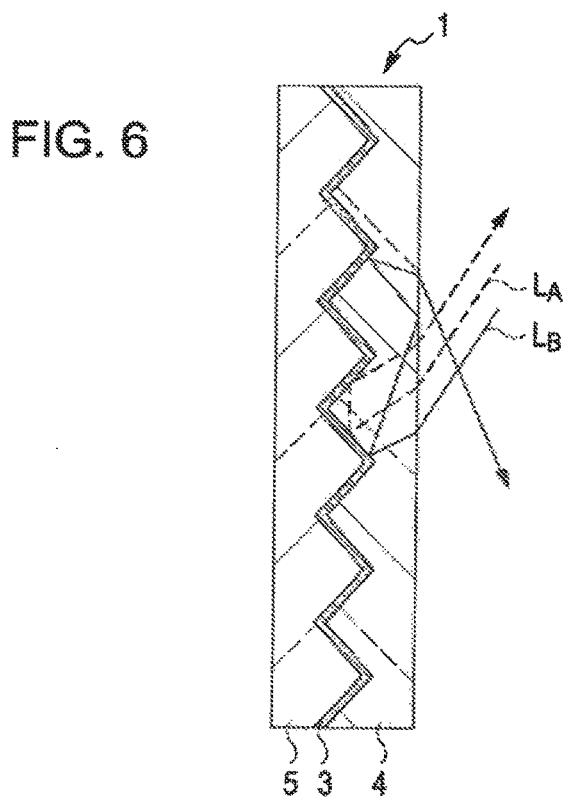
FIG. 6 is a sectional view illustrating an example of the function of the directional reflector.

FIGS. 5 and 6 are sectional views illustrating an example of the function of the directional reflector 1. Here the case where the structures 11 have a prism shape with an inclination of 45° will be described as an example.

As shown in FIG. 5, the directional reflector 1 directionally reflects some of near infrared light $L_1$ in sunlight incident thereon in a skyward direction similar to the incident direction while transmitting visible light $L_2$.

As shown in FIG. 6, additionally, the directional reflector 1 separates light incident on the directional reflector 1 and reflected at the reflective surface of the wavelength-selective reflective layer 3 into a skyward reflection component $L_A$ and a non-skyward reflection component $L_B$ in proportions depending on the incident angle. The non-skyward reflection component La is totally reflected at the interface between the second optical layer 5 and air and is finally reflected in a direction different from the incident direction.

The proportion x of the skyward reflection component $L_A$ in all incident components is represented by equation (1):

$$x=(\sin(45-\alpha')+\cos(45-\alpha')/\tan(45+\alpha'))/(\sin(45-\alpha')+\cos(45-\alpha'))\times R^2 \qquad (1)$$

where α is the incident angle of the light, n is the refractive index of the first optical layer 4, R is the reflectance of the wavelength-selective reflective layer 3, and $\alpha'=\sin^{-1}(\sin \alpha/n)$.

Figure 7:
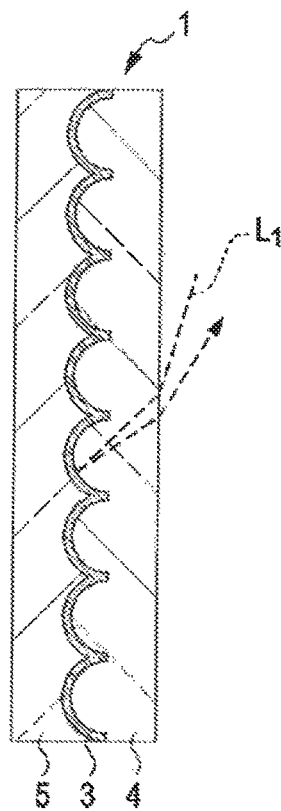
FIG. 7 is a sectional view illustrating an example of the function of the directional reflector.
Figure 8:
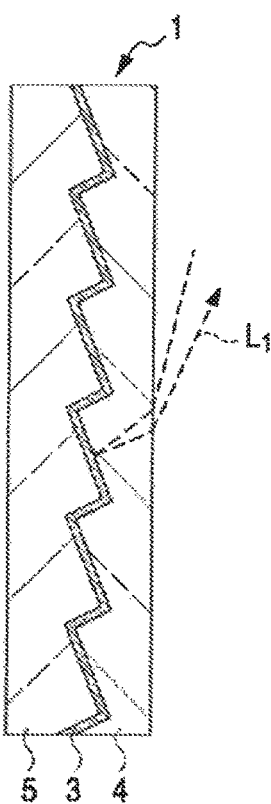
FIG. 8 is a sectional view illustrating an example of the function of the directional reflector.

The larger the proportion of the non-skyward reflection component $L_B$, in the smaller proportion the incident light is reflected skyward. To increase the proportion of the skyward reflection, it is effective to modify the profile of the wavelength-selective reflective layer 3, that is, the shape of the structures 11 of the first optical layer 4. To increase the proportion of the skyward reflection, for example, the structures 11 preferably have the cylindrical shape shown in FIG. 3C or the asymmetrical shape shown in FIG. 4. With such a shape, it is possible to increase the proportion in which light incident on, for example, a building window article from an upward direction is reflected upward, even if it is difficult to reflect the incident light in exactly the same direction. For the two shapes shown in FIGS. 3C and 4, the wavelength-selective reflective layer 3 reflects incident light only once, as shown in FIGS. 7 and 8, thus finally reflecting a larger proportion of the incident light than the shape shown in FIG. 5, which reflects incident light twice. For example, if the wavelength-selective reflective layer 3 reflects incident light twice and has a reflectance of 80% for a certain wavelength, the skyward reflectance is 64%; if it reflects incident light only once, the skyward reflectance is 80%.

Figure 9A:
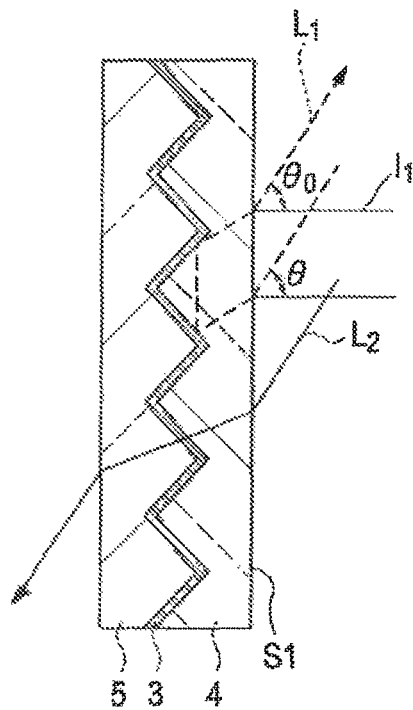
FIG. 9A is a sectional view showing the relationship between ridges of columnar structures and incident light and reflected light.
Figure 9B:
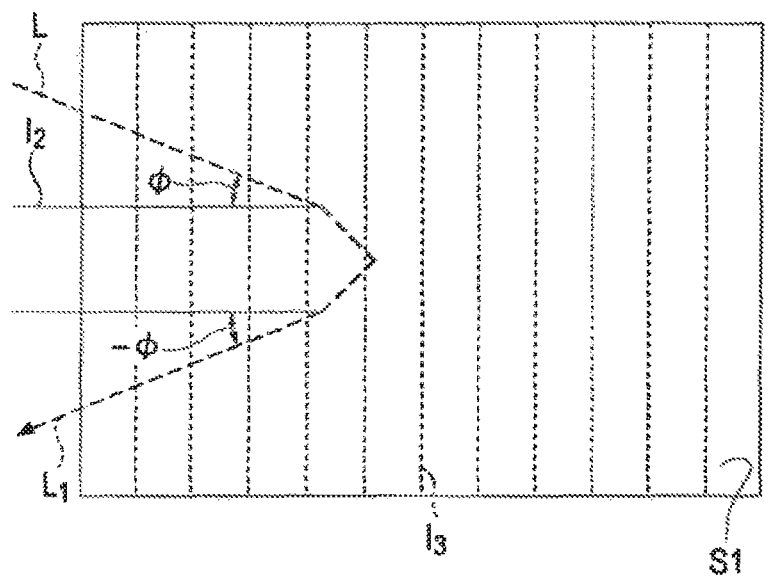
FIG. 9B is a plan view showing the relationship between the ridges of the columnar structures and the incident light and the reflected light.

FIGS. 9A and 9B show the relationship between the ridges $l_3$ of the columnar structures 11 and incident light L and reflected light $L_1$. Of the light L incident on the incident surface S1 at an incident angle (θ, φ), the directional reflector 1 preferably selectively directionally reflects light $L_1$ in at least one specific wavelength range in at least one ($\theta$o, $-\varphi$) direction (where 0°<$\theta$o<90°) while transmitting light $L_2$ in at least one wavelength range other than the specific wavelength range. Satisfying this relationship allows light in at least one specific wavelength range to be reflected skyward. The symbol $\theta$ denotes the angle of the incident light L or the reflected light $L_1$ with respect to the normal $l_1$ to the incident surface S1. The symbol $\varphi$ denotes the angle of the component of the incident light L or the reflected light $L_1$ projected on the incident surface S1 with respect to a line $l_2$ perpendicular to the ridges $l_3$ of the columnar structures 11 in the incident surface S1. The angle $\theta$ of an axis rotated clockwise with respect to the normal $l_1$ is referred to as "+$\theta$", whereas the angle $\theta$ of an axis rotated counterclockwise with respect to the normal $l_1$ is referred to as "−$\theta$". The angle q of an axis rotated clockwise with respect to the line $l_2$ is referred to as "+$\varphi$", whereas the angle $\varphi$ of an axis rotated counterclockwise with respect to the line $l_2$ is referred to as "−$\varphi$".

Method for Producing Directional Reflector

An example of a method for producing the directional reflector according to the first embodiment will now be described with reference to FIGS. 10A to 10C and 11A to 11C.

Figure 10A:
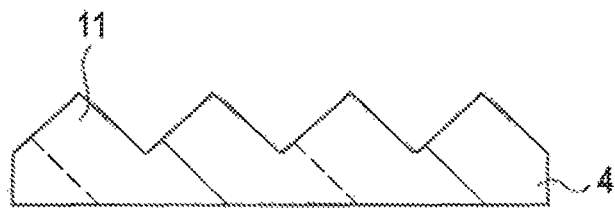
FIGS. 10A to 10C are process diagrams illustrating an example of a method for producing the directional reflector according to the first embodiment.
Figure 10B:

First, a mold having the same surface profile as the structures 11 or the inverted profile thereof is formed by, for example, cutting using a cutting tool or laser processing. The surface profile of the mold is then transferred to a resin film or sheet by, for example, hot-melt extrusion or a transfer process. Examples of the transfer process include a process of pouring a radiation-curable resin into the mold and curing it by irradiation with radiation and a process of transferring the profile by applying heat and/or pressure to a resin. Thus, as shown in FIG. 10A, the first optical layer 4 is formed, which has the structures 11 on one main surface thereof. Referring to FIG. 10B, the wavelength-selective reflective layer 3 is formed on the main surface of the first optical layer 4. Examples of the method for forming the wavelength-selective reflective layer 3 include sputtering, evaporation, chemical vapor deposition (CVD), dip coating, die coating, wet coating, and spray coating, and the method used is preferably selected from the above methods depending on, for example, the shape of the structures 11.

Figure 10C:
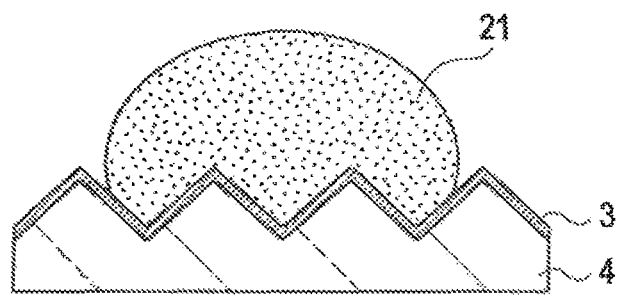

Referring to FIG. 10C, an uncured resin 21 is applied onto the wavelength-selective reflective layer 3. The resin 21 used can be, for example, a thermoplastic resin or a radiation-curable resin. The radiation-curable resin used is preferably an ultraviolet-curable resin. Referring to FIG. 11A, the resin 21 is covered with a removable film 22 to mold the surface of the resin 21. Referring to FIG. 11B, the resin 21 is cured by irradiation with ultraviolet light from a light source 23 or by cooling. Referring to FIG. 11C, the removable film 22 is removed from the cured resin 21. Thus, the second optical layer 5, which has a flat surface, is formed on the wavelength-selective reflective layer 3. Instead of using the removable film 22, it is possible to laminate a film transparent to light in the wavelength range where the wavelength-selective reflective layer 3 transmits light and to radiation so that the film can be used as part of the directional reflector 1 without being removed. It is also possible to form a directional reflector having an adhesive agent on one surface by thickly applying a solution containing the adhesive agent, leveling the coating, and covering it with the removable film 22.

Thus, the directional reflector 1 is produced, which has the wavelength-selective reflective layer 3 with the desired shape in the optical layer 2.

2. Second Embodiment

FIGS. 12A to 12C, 13A to 13C, and 14A and 14B are diagrams showing examples of structures of directional reflectors according to the second embodiment. In the second embodiment, the portions corresponding to those in the first embodiment are denoted by the same reference numerals. The second embodiment differs from the first embodiment in that the structures 11 are two-dimensionally arranged on one main surface of the first optical layer 4.

The structures 11 are two-dimensionally arranged on one main surface of the first optical layer 4. This arrangement is preferably in a closest-packed state. For example, the structures 11 are two-dimensionally arranged in a closest-packed state on the main surface of the first optical layer 4 so as to form a close-packed array such as a square close-packed array, a delta close-packed array, or a hexagonal close-packed array. A square close-packed array is an arrangement of structures 11 having square bottoms in a square close-packed pattern. A delta close-packed array is an arrangement of structures 11 having triangular bottoms in a hexagonal close-packed pattern. A hexagonal close-packed array is an arrangement of structures 11 having hexagonal bottoms in a hexagonal close-packed pattern.

Figure 12A:
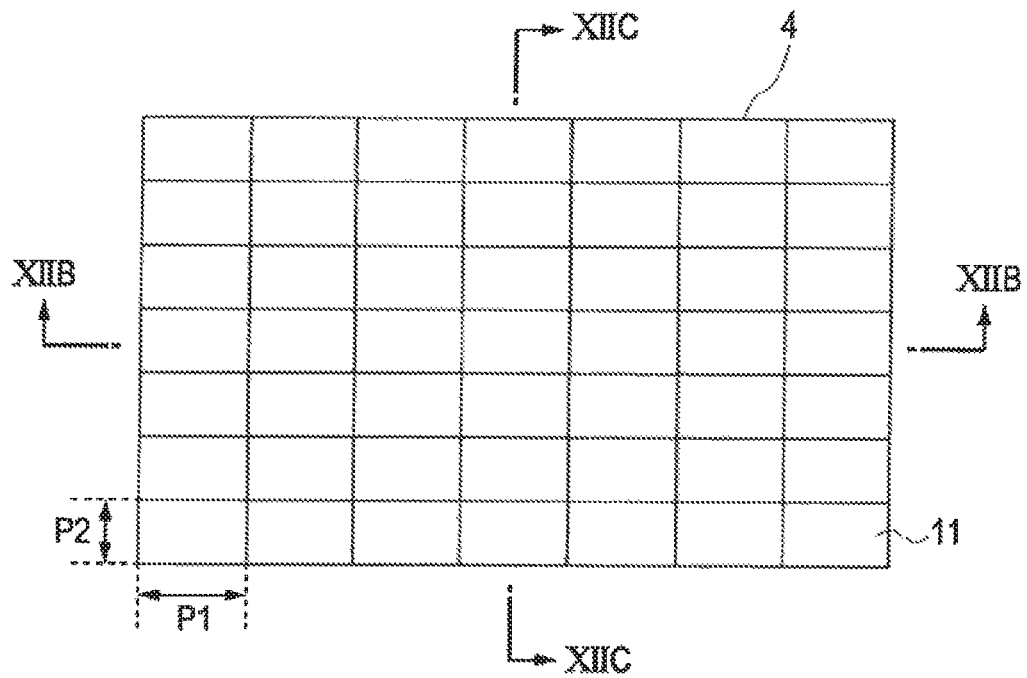
FIG. 12A is a plan view showing an example of structures of a directional reflector according to a second embodiment.
Figure 12B:
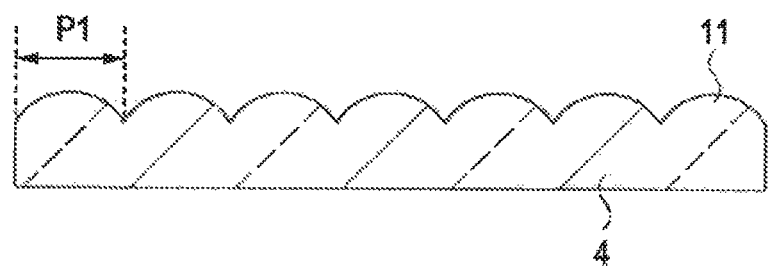
FIG. 12B is a sectional view, taken along line XIIB-XIIB, of the directional reflector shown in FIG. 12A.
Figure 12C:
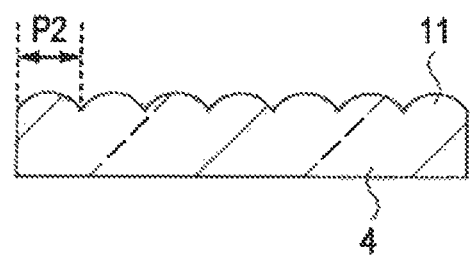
FIG. 12C is a sectional view, taken along line XIIC-XIIC, of the directional reflector shown in FIG. 12A.
Figure 13A:
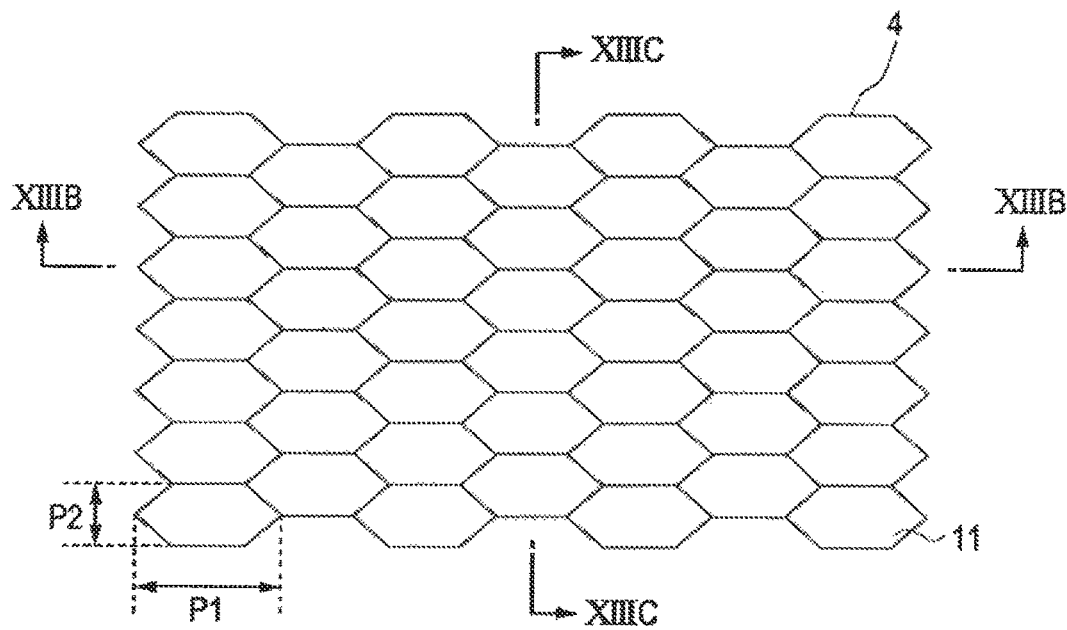
FIG. 13A is a plan view showing an example of the structures of the directional reflector according to the second embodiment.
Figure 13B:
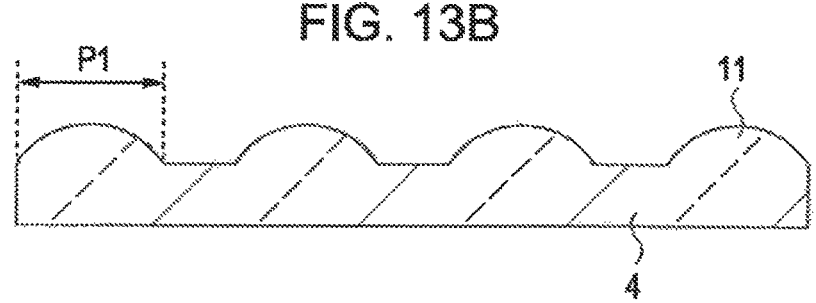
FIG. 13B is a sectional view, taken along line XIIIB-XIIIB, of the directional reflector shown in FIG. 13A.
Figure 13C:
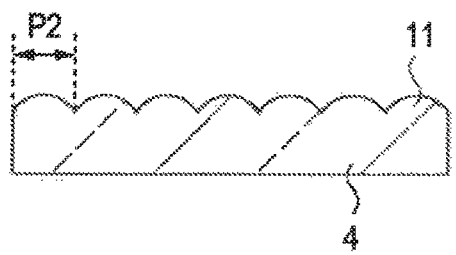
FIG. 13C is a sectional view taken along line XIIIC-XIIIC, of the directional reflector shown in FIG. 13A.
Figure 14A:
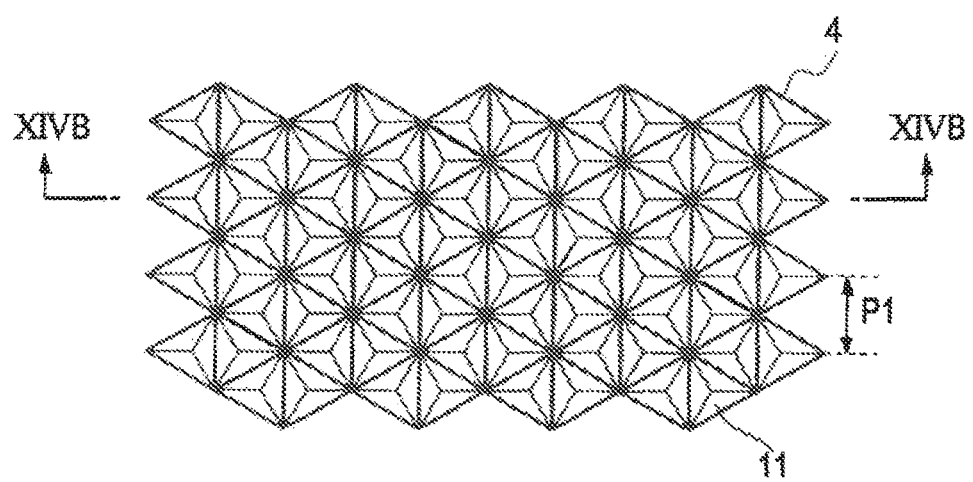
FIG. 14A is a plan view showing an example of the structures of the directional reflector according to the second embodiment.
Figure 14B:
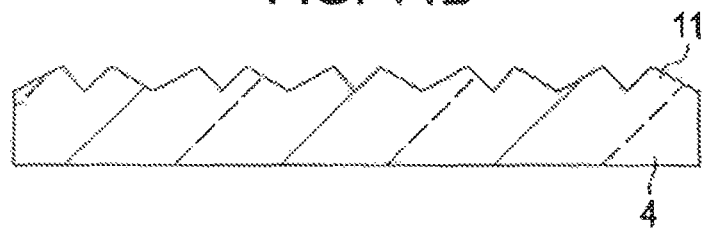
FIG. 14B is a sectional view, taken along line XIVB-XIVB, of the directional reflector shown in FIG. 14A.

The structures 11 are protrusions or recesses having, for example, a corner-cube shape, a hemispherical shape, a semielliptical shape, a prism shape, a free-form shape, a polygonal shape, a conical shape, a polygonal pyramid shape, a frusto-conical shape, or a parabolic shape. The bottoms of the structures 11 have, for example, a circular shape, an elliptical shape, or a polygonal shape such as a triangular shape, a quadrangular shape, a hexagonal shape, or an octagonal shape. FIGS. 12A to 12C show an example of a square close-packed array in which structures 11 having quadrangular bottoms are two-dimensionally arranged in a closest-packed state. FIGS. 13A to 13C show an example of a hexagonal close-packed array in which structures 11 having hexagonal bottoms are two-dimensionally arranged in a closest-packed state. FIGS. 14A and 14B show an example of a delta close-packed array in which structures 11 having triangular bottoms are two-dimensionally arranged in a closest-packed state. The pitches P1 and P2 of the structures 11 are preferably selected depending on the desired optical properties. If the major axis of the structures 11 is inclined with respect to the normal to the incident surface of the directional reflector 1, the major axis of the structures 11 is preferably inclined in at least one of the two directions in which the structures 11 are two-dimensionally arranged. If the directional reflector 1 is bonded to a window article perpendicular to the ground, the major axis of the structures 11 is preferably inclined downward (toward the ground) with respect to the normal.

3. Third Embodiment

Figure 15:
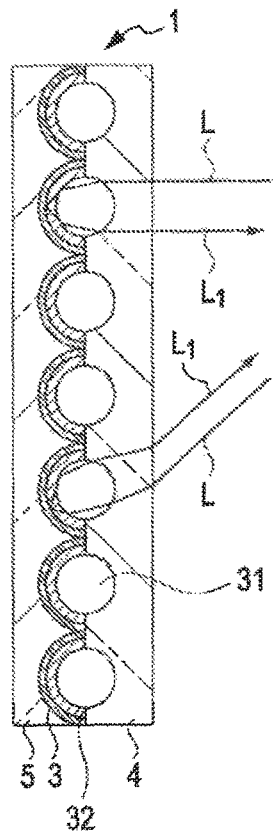
FIG. 15 is a sectional view showing an example of a directional reflector according to a third embodiment.

FIG. 15 is a sectional view showing an example of a directional reflector according to the third embodiment. In the third embodiment, the portions corresponding to those in the first embodiment are denoted by the same reference numerals. As shown in FIG. 15, the third embodiment differs from the first embodiment in that the directional reflector 1 includes beads 31 instead of the structures 11.

The beads 31 are embedded in one main surface of the first optical layer 4 so as to protrude therefrom. A focusing layer 32, the wavelength-selective reflective layer 3, and the second optical layer 5 are stacked in the above order on the main surface of the first optical layer 4 in which the beads 31 are embedded. The beads 31 have, for example, a spherical shape. The beads 31 are preferably transparent.

The beads 31 mainly contain, for example, an inorganic material such as glass or an organic material such as polymer resin.

4. Fourth Embodiment

Figure 16:
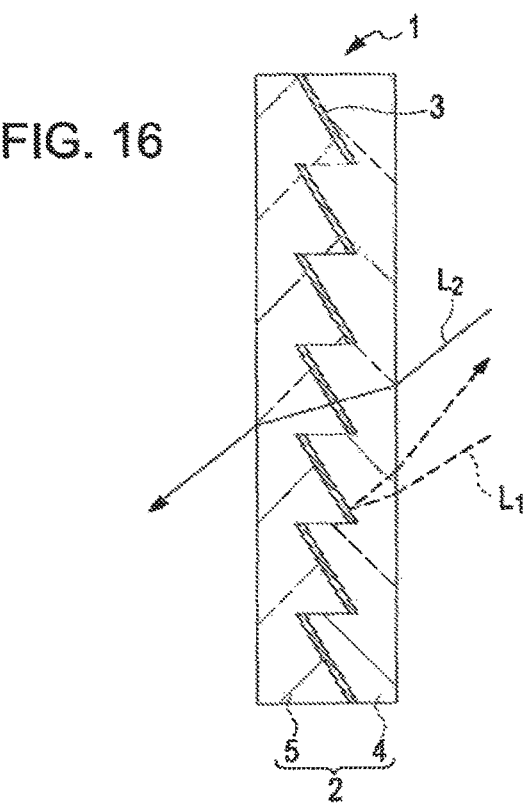
FIG. 16 is a sectional view showing an example of a directional reflector according to a fourth embodiment.

FIG. 16 is a sectional view showing an example of a directional reflector according to the fourth embodiment. In the fourth embodiment, the same portions as those in the first embodiment are denoted by the same reference numerals, and a description thereof will be omitted. The fourth embodiment differs from the first embodiment in that a plurality of wavelength-selective reflective layers 3 inclined with respect to the incident surface are arranged parallel to each other in the optical layer 2.

Figure 17:
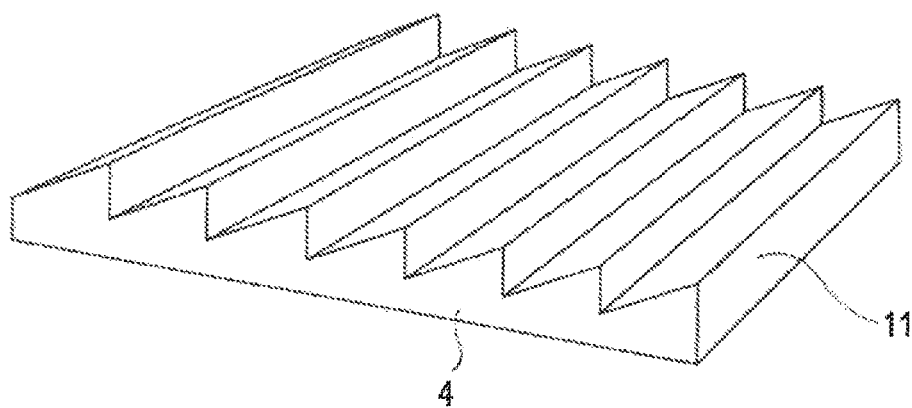
FIG. 17 is a perspective view showing an example of structures of the directional reflector according to the fourth embodiment.

FIG. 17 is a perspective view showing an example of structures of the directional reflector according to the fourth embodiment. The structures 11 are triangular columnar protrusions extending in one direction and one-dimensionally arranged in one direction. The cross section of the structures 11 perpendicular to the direction in which they extend has, for example, a right triangular shape. The wavelength-selective reflective layers 3 are formed on the inclined surfaces of the structures 11 between the acute angles thereof by, for example, a directional film-formation process such as evaporation or sputtering.

In the fourth embodiment, the wavelength-selective reflective layers 3 are arranged parallel to each other in the optical layer 2. This reduces the number of times of reflection as compared to the case where the structures 11 have a corner-cube shape or a right prism shape. It is therefore possible to increase reflectance and to reduce light absorption at the wavelength-selective reflective layers 3.

5. Fifth Embodiment

Figure 18:
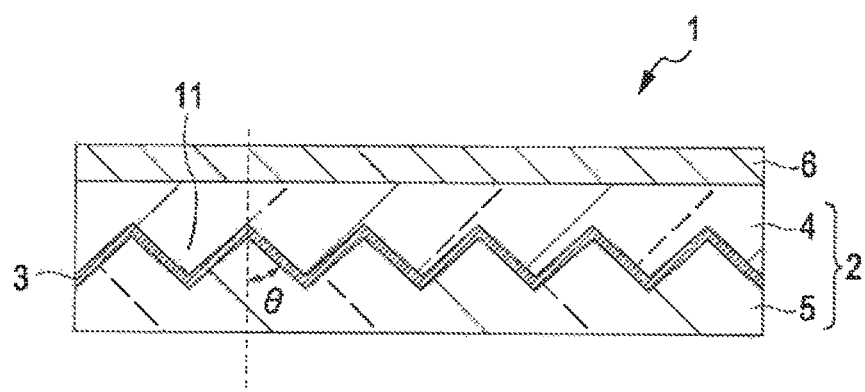
FIG. 18 is a sectional view showing an example of a directional reflector according to a fifth embodiment.

FIG. 18 is a sectional view showing an example of a directional reflector according to the fifth embodiment. In the fifth embodiment, the same portions as those in the first embodiment are denoted by the same reference numerals, and a description thereof will be omitted. As shown in FIG. 18, the fifth embodiment differs from the first embodiment in that the directional reflector 1 further includes a self-cleaning layer 6 that provides a cleaning effect on the incident surface of the directional reflector 1. The self-cleaning layer 6 contains, for example, a photocatalyst. The photocatalyst used can be, for example, $TiO_2$.

As described above, the directional reflector 1 selectively dimensionally reflects light in at least one specific wavelength range. If the directional reflector 1 is used outdoors or in a dirty room, dirt deposited on the surface thereof scatters light, thus degrading directional reflection properties. To remain optically transparent, therefore, the surface of the directional reflector 1 preferably has superior water-repellent or hydrophilic properties and provides a spontaneous cleaning effect.

In the fifth embodiment, the directional reflector 1 has the self-cleaning layer 6 on the incident surface thereof to make it water-repellent or hydrophilic. This inhibits deposition of dirt on the incident surface to avoid a degradation in directional reflection properties.

6. Sixth Embodiment

The sixth embodiment differs from the first embodiment in that the directional reflector 1 directionally reflects light in at least one specific wavelength range while scattering light in at least one wavelength range other than the specific wavelength range. The directional reflector 1 has a light scatterer for scattering incident light, for example, at one or more of the surface of the optical layer 2, the inside of the optical layer 2, and the interface between the optical layer 2 and the wavelength-selective reflective layer 3. Preferably, at least one light scatterer is disposed on the second optical layer 5, in the second optical layer 5, or between the second optical layer 5 and the wavelength-selective reflective layer 3. If the directional reflector 1 is bonded to a support such as a window article, the light scatterer can be applied either indoors or outdoors. If the directional reflector 1 is bonded outdoors, a light scatterer that scatters light in at least one wavelength range other than the specific wavelength range is preferably disposed only between the wavelength-selective reflective layer 3 and a support such as a window article. If the directional reflector 1 is bonded to a support such as a window article with the light scatterer between the wavelength-selective reflective layer 3 and the incident surface, the light scatterer degrades directional reflection properties. If the directional reflector 1 is bonded indoors, on the other hand, the light scatterer is preferably disposed between the exit surface, which is opposite the surface to be bonded, and the wavelength-selective reflective layer 3.

Figure 19A:
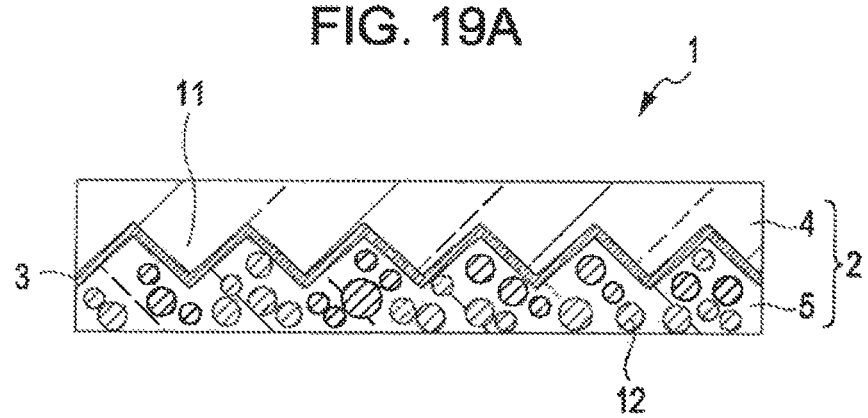
FIG. 19A is a sectional view showing a first example of a directional reflector according to a sixth embodiment.

FIG. 19A is a sectional view showing a first example of the directional reflector according to the sixth embodiment of the present invention. As shown in FIG. 19A, the second optical layer 5 contains a resin and fine particles 12. The refractive index of the fine particles 12 is different from that of the resin serving as the major constituent of the second optical layer 5. The fine particles 12 used can be, for example, at least one type of fine organic or inorganic particles. In addition, the fine particles 12 used can be fine hollow particles. Examples of the fine particles 12 include fine inorganic particles such as silica and alumina and fine organic particles such as styrene, acrylic resin, and copolymers thereof, and fine silica particles are particularly preferred.

Figure 19B:
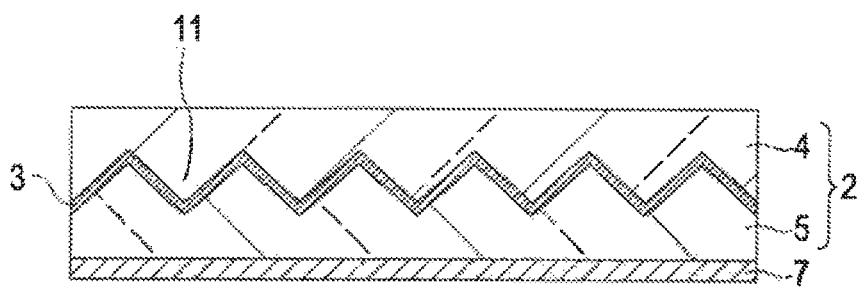
FIG. 19B is a sectional view showing a second example of the directional reflector according to the sixth embodiment.

FIG. 19B is a sectional view showing a second example of the directional reflector according to the sixth embodiment of the present invention. As shown in FIG. 19B, the directional reflector 1 further includes a light-scattering layer 7 on the second optical layer 5. The light-scattering layer 7 contains, for example, a resin and fine particles. The fine particles used can be similar to those of the first example.

Figure 19C:
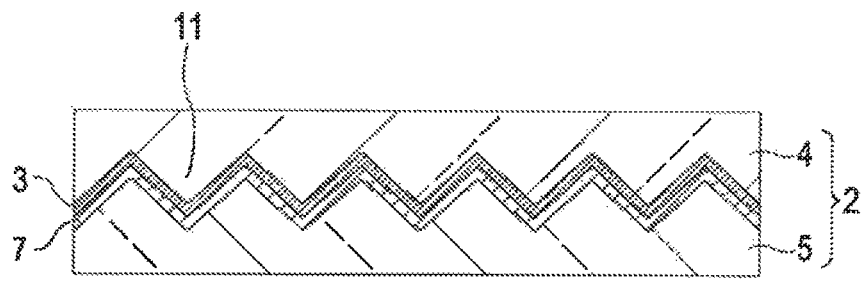
FIG. 19C is a sectional view showing a third example of the directional reflector according to the sixth embodiment.

FIG. 19C is a sectional view showing a third example of the directional reflector according to the sixth embodiment of the present invention. As shown in FIG. 19C, the directional reflector 1 further includes a light-scattering layer 7 between the wavelength-selective reflective layer 3 and the second optical layer 5. The light-scattering layer 7 contains, for example, a resin and fine particles. The fine particles used can be similar to those of the first example.

According to the sixth embodiment, the directional reflector 1 can directionally reflect light in at least one specific wavelength range such as the infrared region while scattering light in at least one other wavelength range such as the visible region. The directional reflector 1 can thus be fogged for design purposes.

7. Seventh Embodiment

Figure 20:
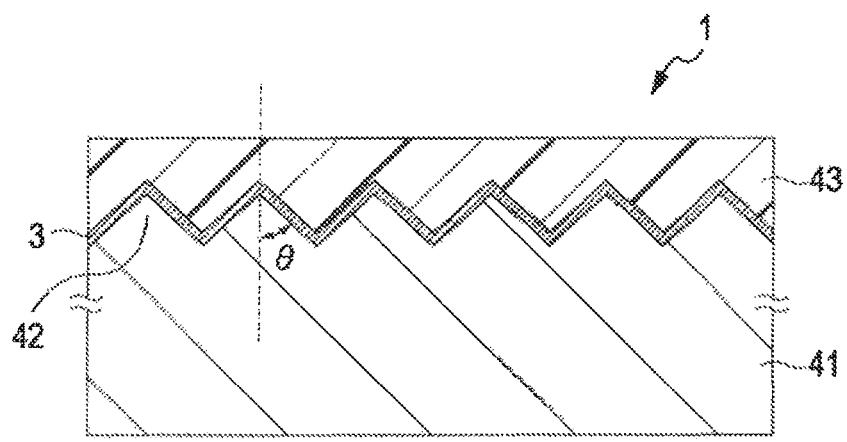
FIG. 20 is a sectional view showing an example of a directional reflector according to a seventh embodiment.

FIG. 20 is a sectional view showing an example of a directional reflector according to the seventh embodiment. In the seventh embodiment, the same portions as those in the first embodiment are denoted by the same reference numerals, and a description thereof will be omitted. The seventh embodiment differs from the first embodiment in that the wavelength-selective reflective layer 3 is directly formed on a window article 41.

The window article 41 has structures 42 on one main surface thereof. The wavelength-selective reflective layer 3 and an optical layer 43 are stacked in the above order on the main surface on which the structures 42 are formed. The shape of the structures 42 can be the inverted shape of the structures 11 in the first embodiment. The optical layer 43 serves to improve transmitted-image clarity and total light transmittance and to protect the wavelength-selective reflective layer 3. The optical layer 43 is formed by, for example, curing a resin mainly containing a thermoplastic resin or a radiation-curable resin.

8. Eighth Embodiment

Figure 21A:
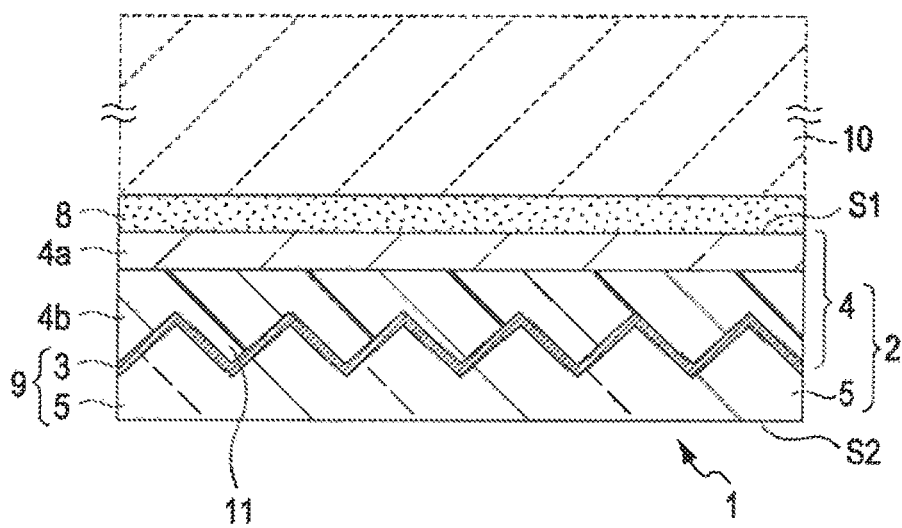
FIGS. 21A and 21B are sectional views showing a first example of a directional reflector according to an eighth embodiment.
Figure 21B:
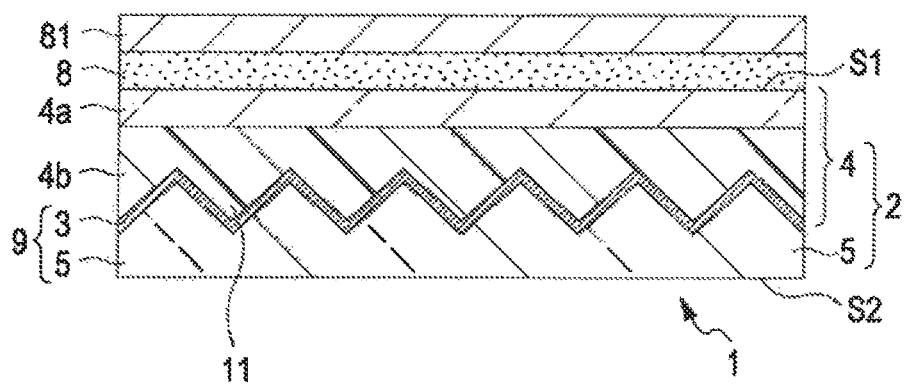
Figure 22A:
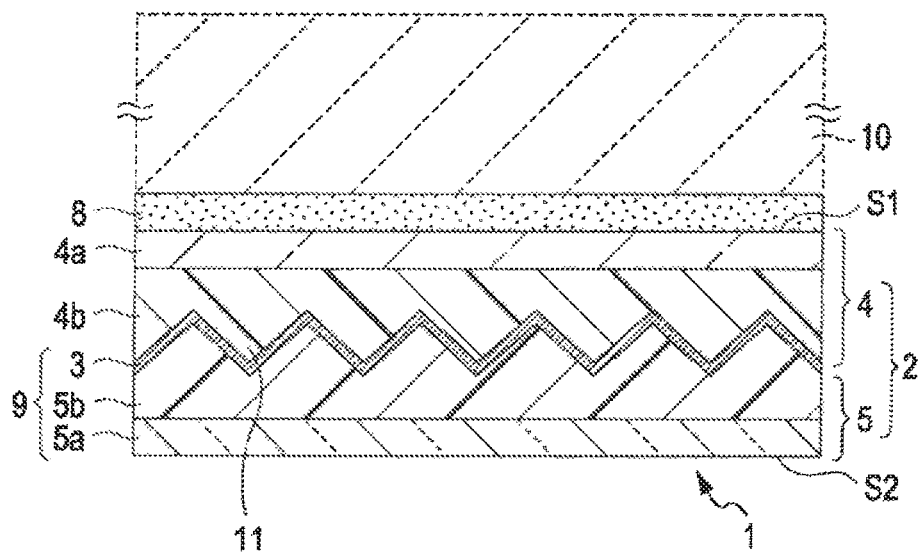
FIGS. 22A and 22B are sectional views showing a second example of the directional reflector according to the eighth embodiment.
Figure 22B:
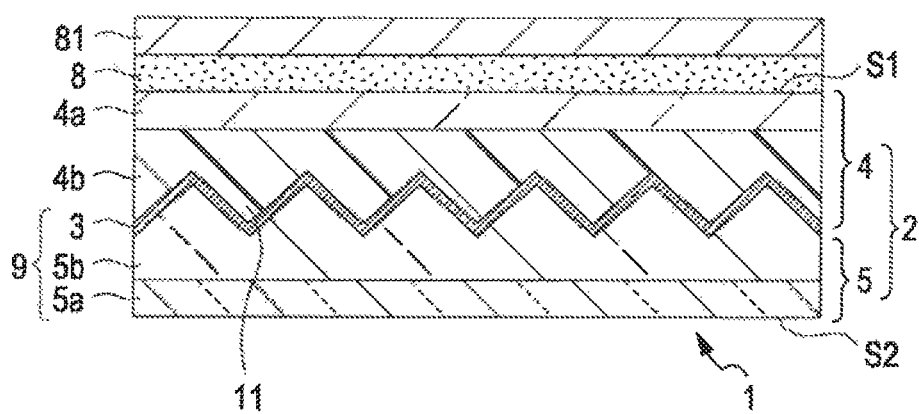

FIGS. 21A and 21B are sectional views showing a first example of a directional reflector according to the eighth embodiment. FIGS. 22A and 22B are sectional views showing a second example of the directional reflector according to the eighth embodiment of the present invention. In the eighth embodiment, the same portions as those in the first embodiment are denoted by the same reference numerals, and a description thereof will be omitted. The eighth embodiment differs from the first embodiment in that at least one of the first and second optical layers 4 and 5 has a double-layer structure. In the example shown in FIGS. 21A and 21B, the first optical layer 4, which constitutes the incident surface S1 on which external light is incident, has a double-layer structure. In the example shown in FIGS. 22A and 22B, the first optical layer 4, which constitutes the incident surface S1 on which external light is incident, and the second optical layer 5, which constitutes the exit surface S2 through which the light exits, each have a double-layer structure. As shown in FIGS. 21A and 21B, the double-layer structure of the first optical layer 4 includes, for example, a flat outer substrate 4a and a resin layer 4b formed between the substrate 4a and the wavelength-selective reflective layer 3. As shown in FIGS. 22A and 22B, the double-layer structure of the second optical layer 5 includes, for example, a flat outer substrate 5a and a resin layer 5b formed between the substrate 5a and the wavelength-selective reflective layer 3. The second optical layer 5 having the wavelength-selective reflective layer 3 formed thereon is hereinafter referred to as a reflective-layer-coated optical layer 9.

The directional reflector 1 is bonded to the outdoor or indoor side of the window article 10, serving as an adherend, for example, with a bonding layer 8 therebetween. The bonding layer 8 used can be, for example, an adhesive layer mainly containing an adhesive agent. If the bonding layer 8 is an adhesive layer, as shown in FIGS. 21B and 22B, the directional reflector 1 preferably further includes a removable layer 81 on the bonding layer 8 formed on the incident surface S1 or the exit surface S2. In this case, the directional reflector 1 can be easily bonded to an adherend such as the window article 10 with the bonding layer 8 therebetween simply by removing the removable layer 81.

To improve adhesion between the directional reflector 1 and the bonding layer 8, a primer layer is preferably formed between the directional reflector 1 and the bonding layer 8. To improve adhesion between the directional reflector 1 and the bonding layer 8, additionally, the incident surface S1 or the exit surface S2 of the directional reflector 1 on which the bonding layer 8 is to be formed is preferably subjected to physical pretreatment used in the related art. Examples of physical pretreatment used in the related art include plasma treatment and corona treatment.

The first substrate 4a and the second substrate 5a are, for example, transparent substrates. Examples of the shape of the substrates 4a and 5a include, but not limited to, a film shape, a sheet shape, a plate shape, and a block shape. The substrates 4a and 5a used can be formed of, for example, a polymer material used in the related art. Examples of polymer materials used in the related art include, but not limited to, triacetyl cellulose (TAC), polyester (TPEE), polyethylene terephthalate (PET), polyimide (PI), polyamide (PA), aramid, polyethylene (PE), polyacrylate, polyethersulfone, polysulfone, polypropylene (PP), diacetyl cellulose, polyvinyl chloride, acrylic resin (PMMA), polycarbonate (PC), epoxy resin, urea resin, urethane resin, and melamine resin. The first and second substrates 4a and 5a preferably have a thickness from 38 to 100 µm in view of productivity, although the thickness is not limited to this range. The first substrate 4a or the second substrate 5a is preferably transparent to radiation so that, as described later, a radiation-curable resin disposed between the first substrate 4a or the second substrate 5a and the wavelength-selective reflective layer 3 can be cured by irradiation with radiation through the first substrate 4a or the second substrate 5a.

The first and second resin layers 4b and 5b are, for example, transparent. The first resin layer 4b is formed by, for example, curing a resin composition between the first substrate 4a and the wavelength-selective reflective layer 3. The second resin layer 5b is formed by, for example, curing a resin composition between the second substrate 5a and the wavelength-selective reflective layer 3. In view of ease of production, the resin composition used is preferably a radiation-curable resin, which is cured by radiation such as light or an electron beam, or a thermosetting resin, which is cured by heat. The radiation-curable resin used is preferably a photocurable resin composition, which is cured by light, and most preferably an ultraviolet-curable resin composition, which is cured by ultraviolet light. To improve adhesion between the first resin layer 4b or the second resin layer 5b and the wavelength-selective reflective layer 3, the resin composition preferably further contains a compound containing phosphoric acid, a compound containing succinic acid, or a compound containing butyrolactone. The compound containing phosphoric acid can be, for example, a (meth)acrylate containing phosphoric acid, preferably a (meth)acrylic monomer or oligomer having phosphoric acid as a functional group. The compound containing succinic acid can be, for example, a (meth)acrylate containing succinic acid, preferably a (meth)acrylic monomer or oligomer having succinic acid as a functional group. The compound containing butyrolactone can be, for example, a (meth)acrylate containing butyrolactone, preferably a (meth)acrylic monomer or oligomer having butyrolactone as a functional group. Preferably, at least one of the first and second resin layers 4b and 5b contains a functional group with high polarity, and the content of the functional group is different between the first and second resin layers 4b and 5b. Preferably, the first and second resin layers 4b and 5b both contain a compound containing phosphoric acid, and the content of phosphoric acid is different between the first and second resin layers 4b and 5b. The content of phosphoric acid in one of the first and second resin layers 4b and 5b is preferably twice or more, more preferably five times or more, and most preferably ten times or more, the content of phosphoric acid in the other resin layer.

If at least one of the first and second resin layers 4b and 5b contains a compound containing phosphoric acid, the wavelength-selective reflective layer 3 preferably contains an oxide, a nitride, or an oxynitride at the surface in contact with the resin layer containing the compound containing phosphoric acid. Particularly preferably, the wavelength-selective reflective layer 3 has a thin film containing zinc oxide at the surface in contact with the resin layer containing the compound containing phosphoric acid.

The ultraviolet-curable resin composition contains, for example, a (meth)acrylate and a photoinitiator. The ultraviolet-curable resin composition may further contain additives such as a photostabilizer, a flame retardant, a leveling agent, and an antioxidant where appropriate.

The (meth)acrylate used is preferably a monomer and/or oligomer having two or more (meth)acryloyl groups. The monomer and/or oligomer used can be, for example, a urethane (meth)acrylate, an epoxy (meth)acrylate, a polyester (meth)acrylate, a polyol (meth)acrylate, a polyether (meth)acrylate, or a melamine (meth)acrylate. Here the term "(meth)acrylate, group" refers to either an acryloyl group or a methacryloyl group. Here the term "oligomer" refers to a molecule having a molecular weight of 500 to 60,000.

The photoinitiator used can be selected from materials used in the related art. Examples of such materials include benzophenone derivatives, acetophenone derivatives, and anthraquinone derivatives, and they can be used alone or in combination. The amount of photoinitiator used is preferably 0.1% to 10% by mass of the solid content. If the amount used falls below 0.1% by mass, the resin composition is practically unsuitable for industrial production because of low photocurability. If the amount used exceeds 10% by mass, a resultant coating tends to have odor if the irradiation intensity is insufficient. Here the term "solid content" refers to the content of all constituents that are to constitute a resin layer after curing. Specifically, the term "solid content" refers to the content of, for example, (meth)acrylate and photoinitiator.

The resin used is preferably one that does not deform or crack at a process temperature during the formation of the wavelength-selective reflective layer 3 and/or the second optical layer 5. If the resin has a low glass transition temperature, the resin layer undesirably deforms at elevated temperatures after the formation of the resin layer, or the shape thereof varies during the formation of the wavelength-selective reflective layer 3 and/or the second optical layer 5. If the resin has a high glass transition temperature, the resin layer undesirably tends to crack or peal at the interface thereof. Specifically, the resin preferably has a glass transition temperature from 60° C. to 150° C., more preferably from 80° C. to 130° C.

The resin used is preferably one onto which a profile can be transferred by, for example, energy beam irradiation or heat, and may be any type of resin having the desired refractive index described above, such as a vinyl resin, an epoxy resin, or a thermoplastic resin.

To alleviate a curing contraction, an oligomer may be added. A curing agent such as a polyisocyanate may also be contained. To improve adhesion to the substrate, it is also possible to add, for example, a monomer containing a hydroxyl group, a carboxyl group, or a phosphate group; a polyalcohol; a carboxylic acid; a silane, aluminum, or titanium coupling agent; or a chelating agent.

A preferred example of a vinyl resin is a (meth)acrylic resin. Examples of monomers of preferred (meth)acrylic resins will be shown below. Specific examples of hydroxyl-containing vinyl monomers include various hydroxylalkyl esters of α,β-ethylenically unsaturated carboxylic acids, such as 2-hydroxylethyl (meth)acrylate, 2-hydroxylpropyl (meth)acrylate, 3-hydroxylpropyl (meth)acrylate, 2-hydroxylbutyl (meth)acrylate, 3-hydroxylbutyl (meth)acrylate, 4-hydroxylbutyl (meth)acrylate, 3-chloro-2-hydroxylpropyl (meth)acrylate, di-2-hydroxylethyl fumarate, mono-2-hydroxylethyl-monobutyl fumarate, polyethylene glycol mono(meth)acrylates and adducts thereof with ε-caprolactone, polypropylene glycol mono(meth)acrylates and adducts thereof with ε-caprolactone, and "PLACCEL FM or FA monomer" (a trade name for a caprolactone-modified monomer manufactured by Daicel Chemical Industries, Ltd.).

Specific examples of carboxyl-containing vinyl monomers include various unsaturated mono- or dicarboxylic acids such as (meth)acrylic acid, crotonic acid, maleic acid, fumaric acid, itaconic acid, and citraconic acid; dicarboxylate monoesters such as monoethyl fumarate and monobutyl maleate; and adducts of the hydroxyl-containing (meth)acrylates shown above with anhydrides of various polycarboxylic acids such as succinic acid, maleic acid, phthalic acid, hexahydrophthalic acid, tetrahydrophthalic acid, benzenetricarboxylic acid, benzenetetracarboxylic acid, and "HIMIC ACID" (a product from Hitachi Chemical Co., Ltd.; "HIMIC ACID" is a registered trademark of the company), and tetrachlorophthalic acid.

Specific examples of phosphate-containing vinyl monomers include dialkyl ((meth)acryloyloxyalkyl) phosphates, dialkyl ((meth)acryloyloxyalkyl) acid phosphates, dialkyl ((meth)acryloyloxyalkyl) phosphites, and dialkyl ((meth)acryloyloxyalkyl) acid phosphites.

Examples of polyalcohols include various polyalcohols such as ethylene glycol, propylene glycol, glycerol, trimethylolethane, trimethylolpropane, neopentyl glycol, 1,6-hexanediol, 1,2,6-hexanetriol, pentacrythritol, and sorbitol, and they can be used alone or in a combination of two or more. Instead of alcohols, various glycidyl esters of aliphatic acids can be used, including "CARDURA E" (manufactured by Shell Chemicals; a trade name for a glycidyl ester of an aliphatic acid).

Examples of carboxylic acids include various carboxylic acids such as benazoic acid, p-tert-butylbenzoic acid, phthalic acid (anhydride), hexahydrophthalic acid (anhydride), tetrahydrophthalic acid (anhydride), tetrachlorophthalic acid (anhydride), hexachlorophthalic acid (anhydride), tetrabromophthalic acid (anhydride), trimellitic acid, "HIMIC ACID", succinic acid (anhydride), maleic acid (anhydride), fumaric acid, itaconic acid (anhydride), adipic acid, sebacic acid, and oxalic acid.

The above monomers can be used alone or be copolymerized. Examples of comonomers include styrene monomers such as styrene, vinyltoluene, p-methylstyrene, ethylstyrene, propylstyrene, isopropylstyrene, and p-tert-butylstyrene; alkyl (meth)acrylates such as methyl (meth)acrylate, ethyl (meth)acrylate, propyl (meth)acrylate, isopropyl (meth)acrylate, n-butyl (meth)acrylate, isobutyl (meth)acrylate, tert-butyl (meth)acrylate, sec-butyl (meth)acrylate, octyl (meth)acrylate, 2-ethylhexyl (meth)acrylate, lauryl (meth)acrylate, "ACRYESTER SL" (manufactured by Mitsubishi Rayon Co., Ltd.; a trade name for a C12 or C13 methacrylate mixture), and stearyl (meth)acrylate; (meth)acrylates having no functional group in the side chains thereof, such as cyclohexyl (meth)acrylate, 4-tert-butylcyclohexyl (meth)acrylate, isobornyl (meth)acrylate, adamantyl (meth)acrylate, and benzyl (meth)acrylate; bifunctional vinyl monomers such as ethylene di(meth)acrylate; various alkoxyalkyl (meth)acrylates such as methoxyethyl (meth)acrylate, ethoxyethyl (meth)acrylate, and methoxybutyl (meth)acrylate; diesters of various dicarboxylic acids such as maleic acid, fumaric acid, and itaconic acid with monoalcohols, such as dimethyl maleate, diethyl maleate, diethyl fumarate, di-n-butyl fumarate, diisobutyl fumarate, and dibutyl itaconate; various vinyl esters such as vinyl acetate, vinyl benzoate, "VEOVA" (manufactured by Shell Chemicals; a trade name for a vinyl ester of a branched aliphatic monocarboxylic acid), and (meth)acrylonitrile; and nitrogen-containing vinyl monomers including N,N-alkylaminoalkyl (meth)acrylates, such as N,N-dimethylaminoethyl (meth)acrylate and N,N-diethylaminoethyl (meth)acrylate, and amide-containing vinyl monomers, such as (meth)acrylamide, a butyl ether of N-methylol (meth)acrylamide, and dimethylaminopropylacrylamide.

The amount used can be adjusted depending on the properties of a dielectric layer or a metal film.

The first substrate 4a preferably has a lower water vapor permeability than the first resin layer 4b, whereas the second substrate 5a preferably has a lower water vapor permeability than the second resin layer 5b. For example, if the first resin layer 4b is formed of a radiation-curable resin such as a urethane acrylate, the first substrate 4a is preferably formed of a resin, such as PET, that has a lower water vapor permeability than the first resin layer 4b and that is transparent to radiation. This reduces diffusion of moisture through the incident surface S1 or the exit surface S2 into the wavelength-selective reflective layer 3 to alleviate degradation of, for example, the metal contained in the wavelength-selective reflective layer 3, thus improving the durability of the directional reflector 1. A PET film having a thickness of 75 μm has a water vapor permeability of about 10 g/m$^2$ per day (at 40° C. and 90% RH).

Apparatus for Producing Directional Reflector

Figure 23:
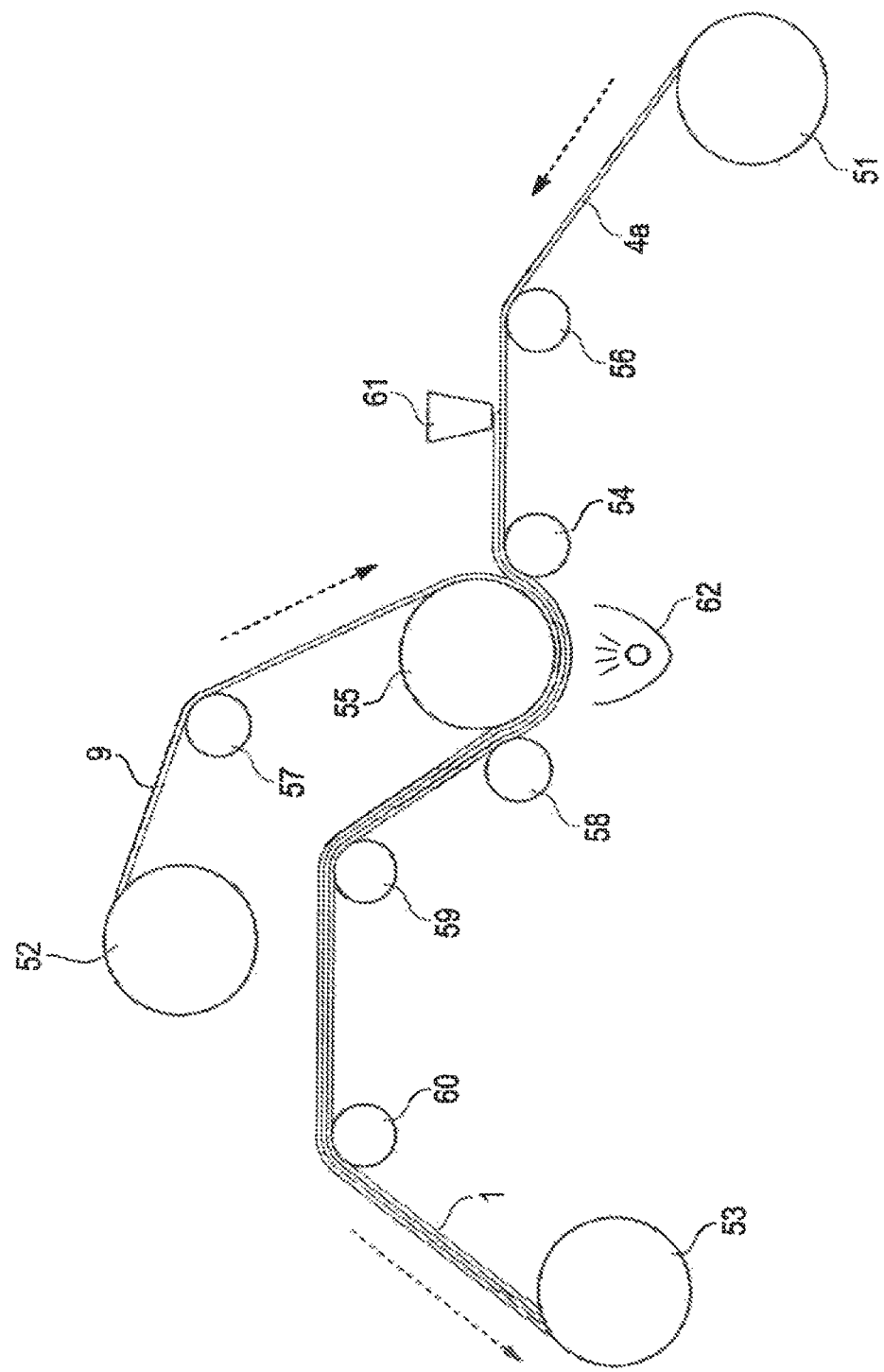
FIG. 23 is a schematic diagram showing an example of an apparatus for producing the directional reflector according to the eighth embodiment.

FIG. 23 is a schematic diagram showing an example of an apparatus for producing the directional reflector according to the eighth embodiment. As shown in FIG. 23, this production apparatus includes a substrate supply roller 51, an optical-layer supply roller 52, a take-up roller 53, lamination rollers 54 and 55, guide rollers 56 to 60, an application unit 61, and an irradiation unit 62.

The substrate supply roller 51 has a strip of substrate 4a wounded thereon in roll form, whereas the optical-layer supply roller 52 has a strip of reflective-layer-coated optical layer 9 wounded thereon in roll form. These supply rollers 51 and 52 are arranged so that the substrate 4a and the reflective-layer-coated optical layer 9 can be continuously fed via the guide rollers 56 and 57. The arrows shown indicate the direction in which the substrate 4a and the reflective-layer-coated optical layer 9 are conveyed. The reflective-layer-coated optical layer 9 is the second optical layer 5 having the wavelength-selective reflective layer 3 formed thereon.

The take-up roller 53 is arranged so that it can take up a strip of directional reflector 1 produced by the production apparatus. The lamination rollers 54 and 55 are arranged so that they can nip the reflective-layer-coated optical layer 9 fed from the optical-layer supply roller 52 and the substrate 4a fed from the substrate supply roller 51. The guide rollers 56 to 60 are arranged along the conveyance path in the production apparatus so that they can convey the strip of substrate 4a, the strip of reflective-layer-coated optical layer 9, and the strip of directional reflector 1. The materials of the lamination rollers 54 and 55 and the guide rollers 56 to 60 are not particularly limited and can be selected from, for example, metals such as stainless steel, rubber, and silicone depending on the desired roller properties.

The application unit 61 used can be a device having an applicator such as a coater. The coater used can be, for example, a gravure coater, a wire bar coater, or a die coater depending on, for example, the properties of the resin composition used. The irradiation unit 62 emits radiation such as an electron beam, ultraviolet light, visible light, or gamma rays.

Method for Producing Directional Reflector

An example of a method for producing the directional reflector according to the eighth embodiment will be described with reference to FIGS. 22 and 23.

First, the reflective-layer-coated optical layer 9 is prepared as follows. A radiation-curable resin is applied onto a strip of substrate 5a, is pressed against a textured surface of a mold having, for example, a roller shape, and is cured by irradiation with radiation through the substrate 5a. Thus, the second optical layer 5 is formed, which has a textured surface. The wavelength-selective reflective layer 3 is then formed on the textured surface of the second optical layer 5 by, for example, sputtering. Thus, the reflective-layer-coated optical layer 9 is prepared. The wavelength-selective reflective layer 3 can be formed by at least one of physical vapor deposition and chemical vapor deposition, preferably, by sputtering. The optical-layer supply roller 52 then takes up the reflective-layer-coated optical layer 9.

Next, the directional reflector 1 is produced using the production apparatus shown in FIG. 23 as follows.

First, the substrate 4a is fed from the substrate supply roller 51 and is passed under the application unit 61 via the guide roller 56. The application unit 61 then applies a radiation-curable resin onto the substrate 4a being passed under the application unit 61. The substrate 4a having the radiation-curable resin applied thereto is conveyed toward the lamination rollers 54 and 55. The reflective-layer-coated optical layer 9, on the other hand, is fed from the optical-layer supply roller 52 and is conveyed toward the lamination rollers 54 and 55 via the guide roller 57.

The lamination rollers 54 and 55 nip the substrate 4a and the reflective-layer-coated optical layer 9 so that no bubble remains therebetween, thus laminating the reflective-layer-coated optical layer 9 on the substrate 4a. The substrate 4a having the reflective-layer-coated optical layer 9 laminated thereon is conveyed on the circumferential surface of the lamination roller 55 when the irradiation unit 62 irradiates the radiation-curable resin with radiation through the substrate 4a to cure the radiation-curable resin. The substrate 4a and the reflective-layer-coated optical layer 9 are thus bonded together with the radiation-curable resin therebetween, so that the intended directional reflector 1 is produced. The strip of directional reflector 1 thus produced is conveyed to the take-up roller 53 via the guide rollers 58 to 60 and is taken up by the take-up roller 53.

9. Ninth Embodiment

Figure 24:
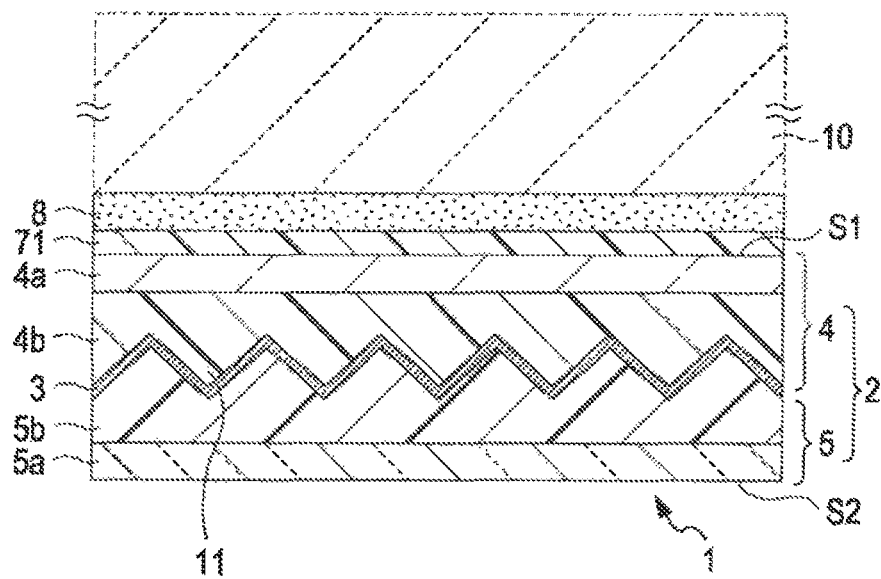
FIG. 24 is a sectional view showing a first example of a directional reflector according to a ninth embodiment.
Figure 25:
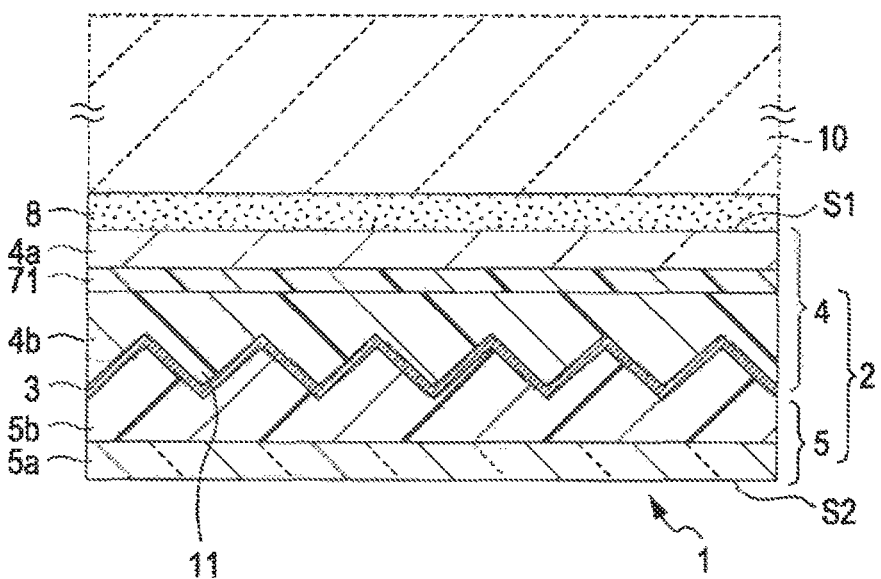
FIG. 25 is a sectional view showing a second example of the directional reflector according to the ninth embodiment.

FIG. 24 is a sectional view showing a first example of a directional reflector according to the ninth embodiment. FIG. 25 is a sectional view showing a second example of the directional reflector according to the ninth embodiment of the present invention. The ninth embodiment differs from the eighth embodiment in that the directional reflector 1 further includes a barrier layer 71 on the incident surface S1 or the exit surface S2 bonded to an adherend such as the window article 10 or between that surface and the wavelength-selective reflective layer 3. In the example shown in FIG. 24, the directional reflector 1 has the barrier layer 71 on the incident surface S1 bonded to an adherend such as the window article 10. In the example shown in FIG. 25, the directional reflector 1 has the barrier layer 71 between the first substrate 4a bonded to an adherend such as the window article 10 and the first resin layer 4b.

The barrier layer 71 can be formed of, for example, an inorganic oxide containing at least one of alumina ($Al_2O_3$), silica ($SiO_x$), and zirconia or a resin material containing at least one of polyvinylidene chloride (PVDC), polyvinyl fluoride, and a partial hydrolysate of ethylene-vinyl acetate copolymer (EVOH). The barrier layer 71 can also be formed of, for example, a dielectric material containing at least one of SiN, $ZnS.SiO_2$, AlN, $Al_2O_3$, $SiO_2.Cr_2O_3.ZrO_2$ (SCZ), $SiO_2.In_2O_3.ZrO_2$ (SIZ), $TiO_2$, and $Nb_2O_5$.

As described above, if the directional reflector 1 has the barrier layer 71 on the incident surface S1 or the exit surface S2, the first optical layer 4 or the second optical layer 5 on or in which the barrier layer 71 is formed preferably satisfies the following relationship. That is, the first substrate 4a or the second substrate Sa on which the barrier layer 71 is formed preferably has a lower water vapor permeability than the first resin layer 4b or the second resin layer 5b. This further reduces diffusion of moisture through the incident surface S1 or the exit surface S2 of the directional reflector 1 into the wavelength-selective reflective layer 3.

In the ninth embodiment, because the directional reflector 1 has the barrier layer 71 on the incident surface S1 or the exit surface S2, it reduces diffusion of moisture through the incident surface S1 or the exit surface S2 into the wavelength-selective reflective layer 3 to alleviate degradation of, for example, the metal contained in the wavelength-selective reflective layer 3, thus improving the durability of the directional reflector 1.

10. Tenth Embodiment

Figure 26:
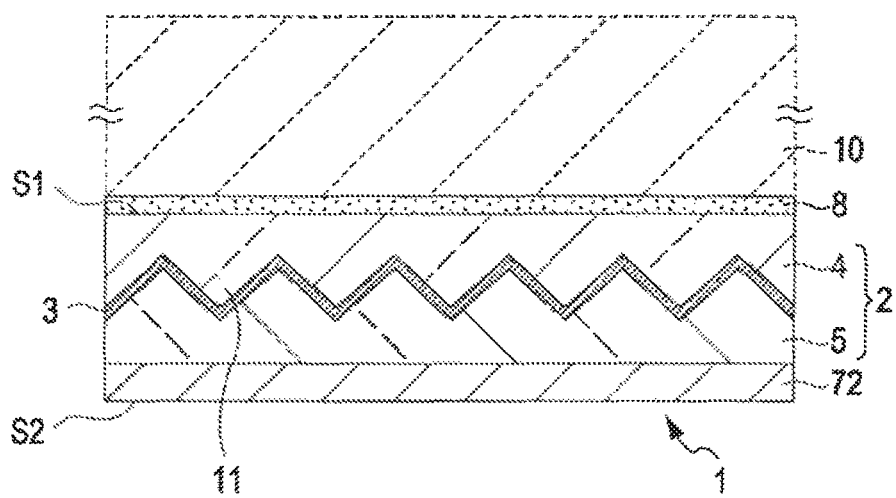
FIG. 26 is a sectional view showing an example of a directional reflector according to a tenth embodiment.

FIG. 26 is a sectional view showing an example of a directional reflector according to the tenth embodiment. In the tenth embodiment, the same portions as those in the eighth embodiment are denoted by the same reference numerals, and a description thereof will be omitted. The tenth embodiment differs from the eighth embodiment in that the directional reflector 1 further includes a hard coat layer 72 on at least one of the incident surface S1 and the exit surface S2. In the example shown in FIG. 26, the directional reflector 1 has the hard coat layer 72 on the exit surface S2.

The hard coat layer 72 preferably has a pencil hardness of 2H or more, more preferably 3H or more, in view of scratch resistance. The hard coat layer 72 is formed by applying a resin composition onto at least one of the incident surface S1 and the exit surface S2 of the directional reflector 1 and curing the composition. Examples of the resin composition include those disclosed in Japanese Examined Patent Application Publication Nos. 50-28092, 50-28446, 51-24368, and 57-2735 and Japanese Unexamined Patent Application Publication Nos. 52-112698 and 2001-301095. Specific examples include organosilane thermosetting resins such as methyltriethoxysilane and phenyltriethoxysilane, melamine thermosetting resins such as etherified methylolmelamine, and polyfunctional acrylate ultraviolet-curable resins such as polyol acrylates, polyester acrylates, urethane acrylates, and epoxy acrylates.

The resin composition preferably further contains an antifouling agent to impart antifouling properties to the hard coat layer 72. The antifouling agent used is preferably a silicone oligomer and/or a fluorine-containing oligomer having one or more (meth)acrylic, vinyl, or epoxy groups. The amount of silicone oligomer and/or fluorine-containing oligomer added is preferably from 0.01% to 5% by mass of the solid content. If the amount added falls below 0.01% by mass, the antifouling properties tend to be insufficient. If the amount added exceeds 5% by mass, the coating hardness tends to decrease. Preferred examples of antifouling agents include RS-602 and RS-751-K manufactured by DIC Corporation, CN4000 manufactured by Sartomer Company, Inc., OPTOOL DAC-HP manufactured by Daikin Industries, Ltd., X-22-164E manufactured by Shin-Etsu Chemical Co., Ltd., FM-7725 manufactured by Chisso Corporation, EBECRYL 350 manufactured by Daicel-Cytec Company, Ltd., and TEGORAD 2700 manufactured by Degussa Corporation. The hard coat layer 72 with antifouling properties preferably has a pure water contact angle of 70° or more, more preferably 90° or more. The resin composition may further contain additives such as a photostabilizer, a flame retardant, and an antioxidant where appropriate.

In the tenth embodiment, because the directional reflector 1 has the hard coat layer 72 on at least one of the incident surface S1 and the exit surface $2, the directional reflector 1 has scratch resistance. For example, if the directional reflector 1 is bonded to the inside of a window, the directional reflector 1 is not scratched when its surface is touched or cleaned. Similarly, the directional reflector 1 is not scratched if it is bonded to the outside of a window.

11. Eleventh Embodiment

Figure 27:
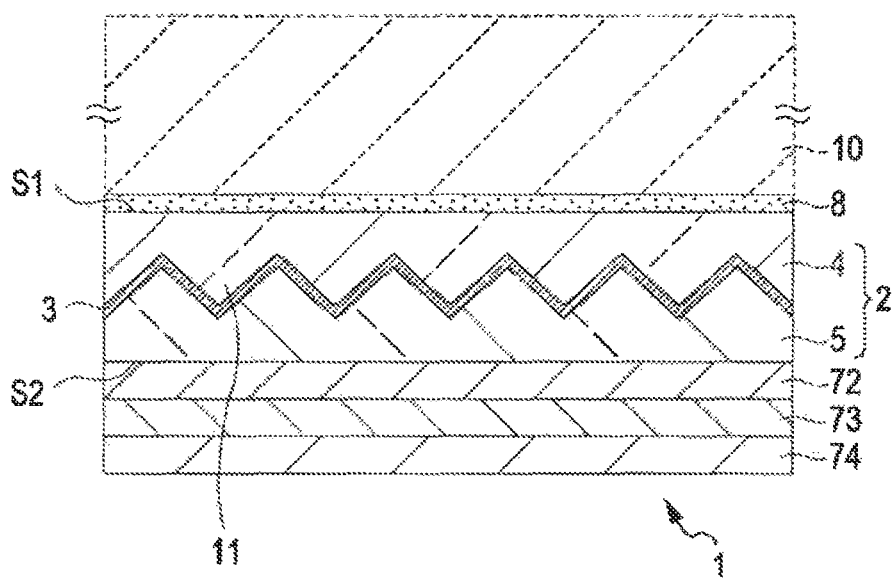
FIG. 27 is a sectional view showing an example of a directional reflector according to an eleventh embodiment.

FIG. 27 is a sectional view showing an example of a directional reflector according to the eleventh embodiment. In the eleventh embodiment, the same portions as those in the tenth embodiment are denoted by the same reference numerals, and a description thereof will be omitted. The eleventh embodiment differs from the tenth embodiment in that the directional reflector 1 further includes an antifouling layer 74 on the hard coat layer 72. To improve adhesion between the hard coat layer 72 and the antifouling layer 74, the directional reflector 1 preferably further includes a coupling agent layer (primer layer) 73 between the hard coat layer 72 and the antifouling layer 74.

In the eleventh embodiment, because the directional reflector 1 has the antifouling layer 74 on the hard coat layer 72, the directional reflector 1 has antifouling properties.

EXAMPLES

Examples will be specifically described nonlimiting below.

Example 1

Figure 28:
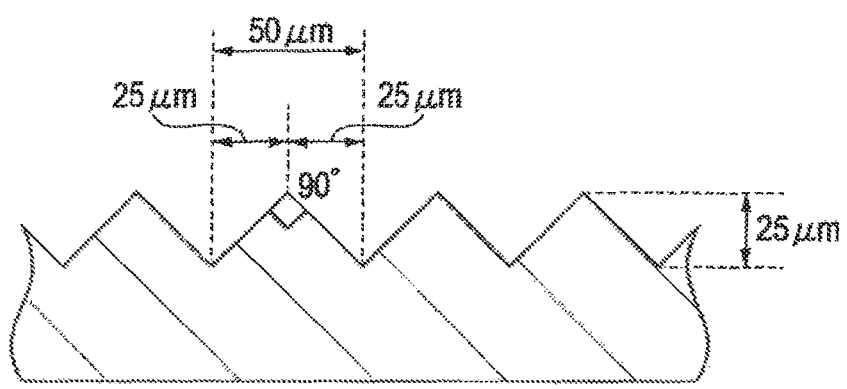
FIG. 28 is a sectional view showing the surface profile of a Ni—P alloy mold used in Example 1.

First, as shown in FIG. 28, a prism profile was formed on a Ni—P alloy mold by cutting using a cutting tool. The Ni—P alloy mold was coated with a mixed resin of dipentaerythritol hexaacrylate and dipentaerythritol pentaacrylate (the trade name "DPHA", manufactured by Nippon Kayaku Co., Ltd.) and was covered with a PET film (A4300, manufactured by Toyobo Co., Ltd.) having a thickness of 75 μm. The mixed resin was cured by irradiation with ultraviolet light through the PET film, and the laminate of the resin and the PET film was removed from the Ni—P alloy mold. Thus, a resin layer (second optical layer) having a molded surface with a prism profile was formed.

Next, as shown in Table 1 below, an alternate multilayer film including $Nb_2O_5$ films and silver films was formed by vacuum sputtering on the molded surface on which the prism profile was formed by the mold. The spectral reflectance of the PET film having the alternate multilayer film was measured using DUV3700, manufactured by Shimadzu Corporation. As a result, the spectral reflectance curve shown in FIG. 29 was obtained. Next, the alternate multilayer film was further coated with the above mixed resin. After bubbles were squeezed, the resin was cured by irradiation with ultraviolet light to form a resin layer (first optical layer) on the alternate multilayer film. Thus, an optical film serving as the intended directional reflector was produced.

Example 2

Figure 30A:
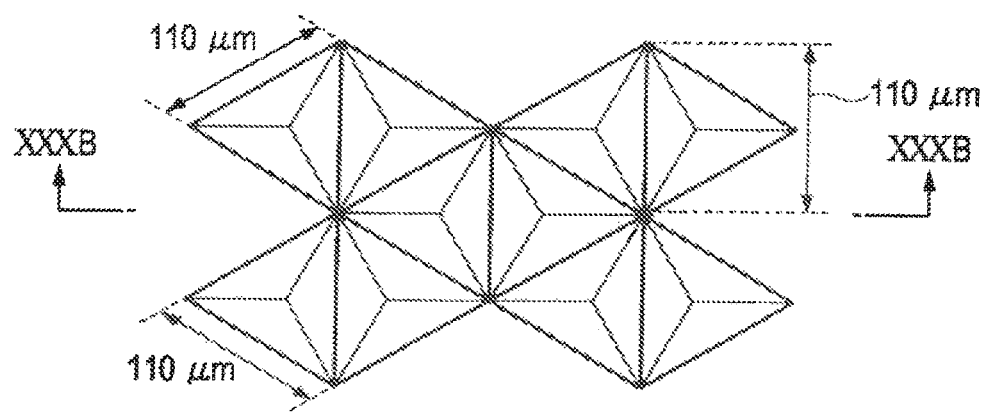
FIG. 30A is a plan view showing the surface profile of a mold for producing optical films of Examples 2 to 4.
Figure 30B:
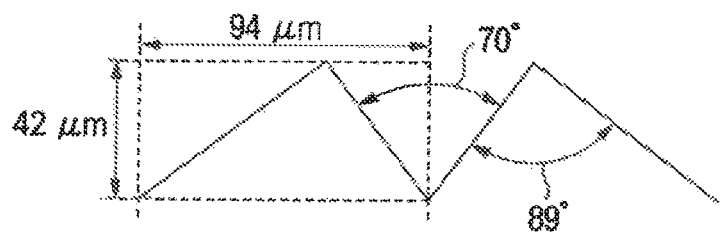
FIG. 30B is a sectional view, taken along line XXXB-XXXB, of the mold shown in FIG. 30A.

First, as shown in FIGS. 30A and 30B, a triangular pyramid profile was formed on a Ni—P alloy mold by cutting using a cutting tool. The Ni—P alloy mold was coated with a urethane acrylate (ARONIX, manufactured by Toagosei Co., Ltd.; refractive index after curing: 1.533) and was covered with a PET film (A4300, manufactured by Toyobo Co., Ltd.) having a thickness of 75 μm. The resin was cured by irradiation with ultraviolet light through the PET film.

After the laminate of the resin and the PET film was removed from the Ni—P alloy mold, as shown in Table 1, an alternate multilayer film including zinc oxide films and silver alloy films was formed by vacuum sputtering on the molded surface on which the prism profile was formed by the mold. The silver alloy films, namely, Ag—Nd—Cu alloy films, were formed using an alloy target having the composition Ag:Nd:Cu=99.0:0.4:0.6 (in atomic percent). After the formation of the alternate multilayer film, the textured surface was further coated with the same resin as the underlying layer (ARONIX, manufactured by Toagosei Co., Ltd.; refractive index after curing: 1.533) and was covered with a PET film (A4300, manufactured by Toyobo Co., Ltd.) having a thickness of 75 μm. After bubbles were squeezed, the resin was cured by irradiation with ultraviolet light through the PET film.

Example 3

An optical film of Example 3 was produced as in Example 2 except that the constituent films of the selective reflective layer had the thicknesses shown in Table 1.

Example 4

An optical film of Example 4 was produced as in Example 2 except that the constituent films of the selective reflective layer had the thicknesses shown in Table 1.

Example 5

After a triangular pyramid profile was formed on a resin having a refractive index after curing of 1.533 as in Example 2, an alternate multilayer film including zinc oxide films and silver alloy films was formed as a selective retroreflective layer as in Example 2. Subsequently, the textured surface was further coated with an ultraviolet-curable resin (ARONIX, manufactured by Toagosei Co., Ltd.; refractive index after curing: 1.540) and was covered with a PET film (A4300, manufactured by Toyobo Co., Ltd.) having a thickness of 75 μm. After bubbles were squeezed, the resin was cured by irradiation with ultraviolet light through the PET film. Thus, an optical film of Example 5 having a refractive index difference between the upper and lower resin layers of 0.007 was produced.

Example 6

An optical film of Example 6 was produced as in Example 5 except that the upper resin layer was formed of an ultraviolet-curable resin having a refractive index after curing of 1.542 and the refractive index difference between the upper and lower resin layers was 0.009.

Comparative Example 1

An optical film of Comparative Example 1 was produced by forming an alternate multilayer film whose constituent films had the thicknesses shown in Table 1 on a PET film having a flat surface.

Comparative Example 2

An optical film of Comparative Example 2 was produced by forming an alternate multilayer film on a PET film having a flat surface under the same film-formation conditions as in Example 2.

Comparative Example 3

An optical film of Comparative Example 3 was produced by forming an alternate multilayer film on a PET film having a flat surface under the same film-formation conditions as in Example 3.

Comparative Example 4

An optical film of Comparative Example 4 was produced by forming an alternate multilayer film on a PET film having a flat surface under the same film-formation conditions as in Example 4.

Comparative Example 5

An optical film of Comparative Example 5 was produced by forming an alternate-multilayer-film-coated PET film as in Example 2 until the step of forming the alternate multilayer film, the alternate multilayer film remaining exposed without being embedded with a resin.

Comparative Example 6

An optical film of Comparative Example 6 was produced by forming an alternate-multilayer-film-coated PET film as in Example 2 until the step of forming the alternate multilayer film and further coating the textured surface with the same resin as the underlying layer (ARONIX, manufactured by Toagosei Co., Ltd.; refractive index after curing: 1.533). The resin was cured without being covered with a PET film by irradiation with ultraviolet light while performing nitrogen purging to avoid curing inhibition due to oxygen.

Comparative Example 7

An optical film of Comparative Example 7 was produced as in Example 5 except that the upper resin layer was formed of an ultraviolet-curable resin having a refractive index after curing of 1.546 and the refractive index difference between the upper and lower resin layers was 0.013.

Comparative Example 8

An optical film of Comparative Example 8 was produced as in Example 5 except that the upper resin layer was formed of an ultraviolet-curable resin having a refractive index after curing of 1.558 and the refractive index difference between the upper and lower resin layers was 0.025.

Evaluation of Directional Reflectance

The optical films of Example 1 and Comparative Example 1 were evaluated for directional reflectance as follows.

Figure 31:
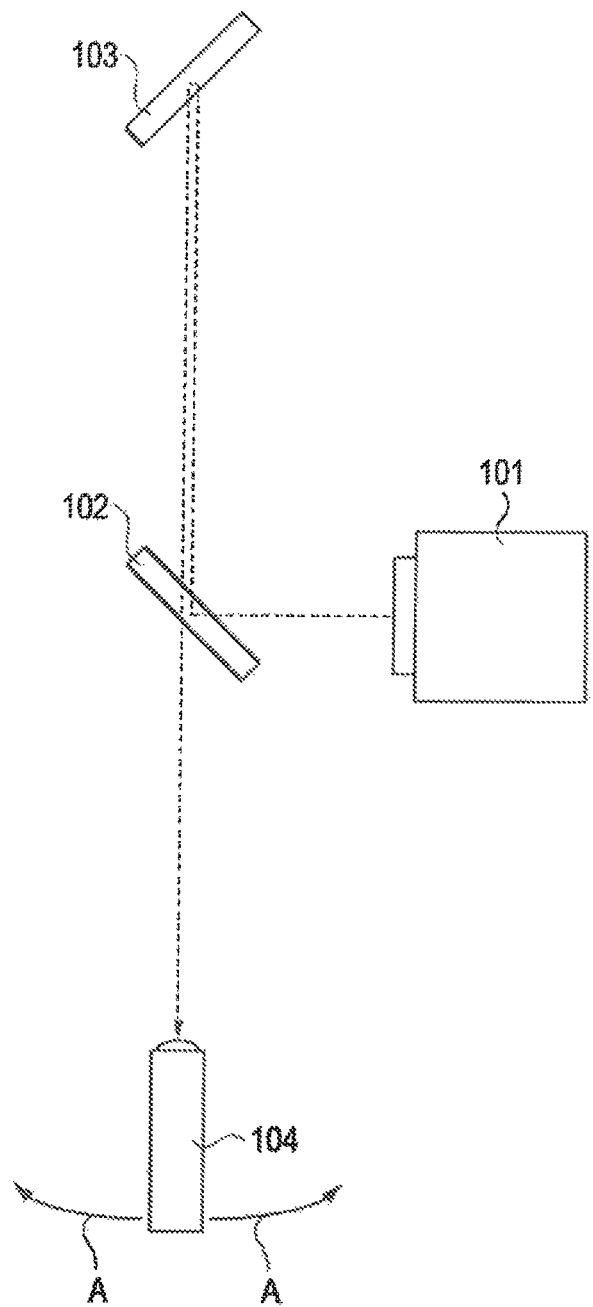
FIG. 31 is a schematic diagram showing the configuration of an apparatus for measuring the retroreflectance of a directional reflector.

FIG. 31 shows the configuration of an apparatus for measuring the retroreflectance of an optical film. Linear light emitted from a halogen lamp 101 and collimated by a lens is incident on a half mirror 102 disposed at an angle of 450 with respect to the direction in which the light travels. A half of the incident light is reflected by the half mirror 102 so that its traveling direction is 90° rotated, whereas the other half passes through the half mirror 102. The reflected light is retroreflected by a sample 103 and is incident again on the half mirror 102. A half of the incident light passes through the half mirror 102 and is incident on a detector 104. The detector 104 measures the intensity of the incident light as reflection intensity.

The measuring apparatus having the configuration described above was used to determine the retroreflectances at wavelengths of 900 and 1,100 nm by the following method. First, a mirror was attached to a sample holder of the measuring apparatus at an incident angle θ of 0°, and the light intensities at the individual wavelengths were measured using the detector 104. Next, the optical films were attached to the sample holder of the measuring apparatus, and the light intensities at incident angles θ of 0°, 20°, 40°, 60°, and 80° were measured. The retroreflectances of the optical films were determined with respect to the light intensity of the mirror as a retroreflectance of 90%. The results are shown in Table 2 (in this measurement, φ=0°).

Evaluation of Directional Reflection Direction

The optical films of Examples 1 to 6 and Comparative Examples 5 to 8 were evaluated for directional reflection direction using the above measuring apparatus shown in FIG. 31 as follows. The detector 104 was rotated about the sample 103 as indicated by the arrows A to determine the direction in which the reflection intensity was maximized. The results are shown in Table 3.

Evaluation of Normal Transmittance

The optical films of Examples 2 to 4 and Comparative Examples 2 to 4 were evaluated for normal transmittance as follows.

Figure 32:
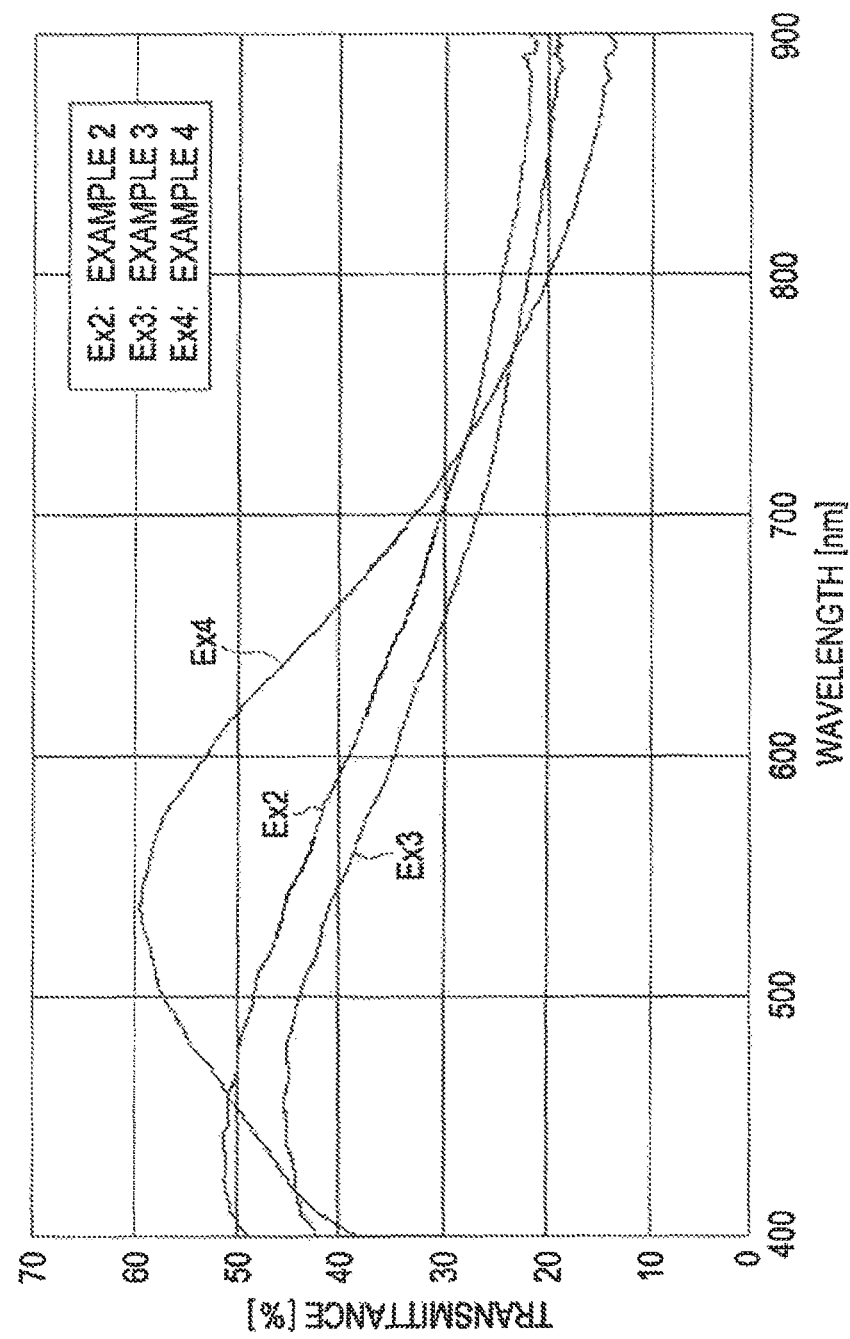
FIG. 32 is a graph showing the spectral transmittance of the optical films of Examples 2 to 4.
Figure 33:
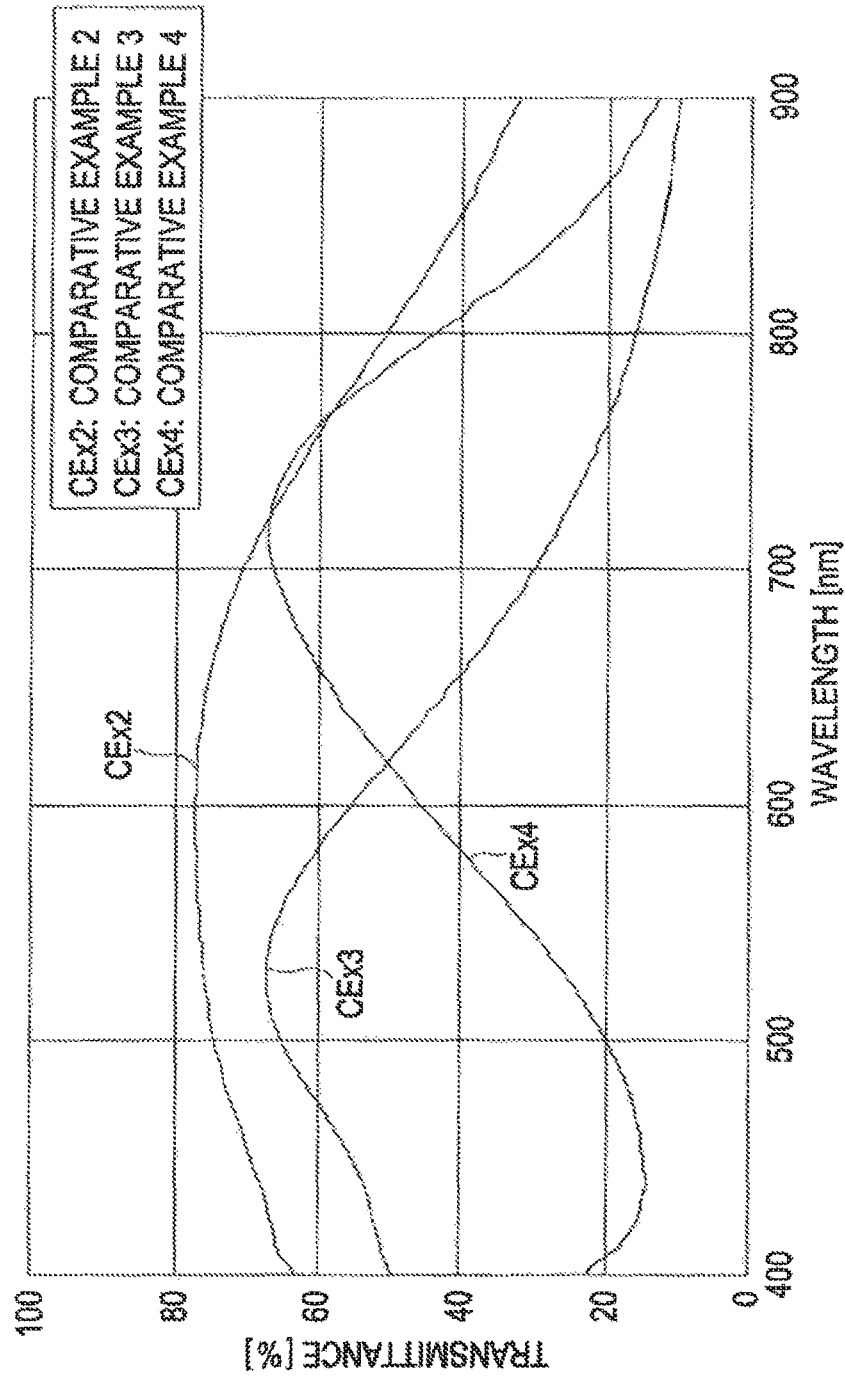
FIG. 33 is a graph showing the spectral transmittance of optical films of Comparative Examples 2 to 4.

The normal transmittance in the visible and near infrared regions was measured using DUV3700, manufactured by Shimadzu Corporation. The resultant spectral transmittance curves are shown in FIGS. 32 and 33.

Evaluation of Chromaticity

The optical films of Examples 2 to 4 and Comparative Examples 2 to 4 were evaluated for chromaticity as follows.

The optical films of the invention examples and the comparative examples were placed on a black sheet (ACRYLITE L502, manufactured by Mitsubishi Rayon Co., Ltd.) for avoiding the effect of the background color and were subjected to measurement using SP62 (integrating sphere specctrophotometer manufactured by X-Rite, Incorporated, d/8° optical system, D64 light source, 2° field of view, SPEX mode). The results are shown in Table 4. The chromaticity coordinates x and y of the black sheet measured without a sample placed thereon were 0.325 and 0.346, respectively.

Evaluation of Transmitted-Image Clarity

The optical films of Examples 1 to 5 and Comparative Examples 5 to 8 were evaluated for transmitted-image clarity as follows. The transmitted-image clarity was evaluated using optical combs with comb widths of 2.0 mm, 1.0 mm, 0.5 mm, and 0.125 mm according to JIS K 7105. The measuring instrument used was an image clarity meter manufactured by Suga Test Instruments Co., Ltd (model: ICM-1T). Next, the sum of the values of transmitted-image clarity measured using the optical combs with comb widths of 2.0 mm, 1.0 mm, 0.5 mm, and 0.125 mm was determined. The results are shown in Table 3.

Evaluation of Haze

The optical films of Examples 1 to 6 and Comparative Examples 5 to 8 were evaluated for haze as follows.

The haze was measured using the haze meter HM-150 (manufactured by Murakami Color Research Laboratory Co., Ltd.) under the measurement conditions according to JIS K 7136. The results are shown in Table 3. The measurement was carried out using a D65 light source without applying a filter.

Evaluation of Visibility

The optical films of Examples 1 to 6 and Comparative Examples 5 to 8 were evaluated for visibility as follows.

The prepared films were bonded to glass sheets with a thickness of 3 mm using an optically transparent adhesive agent. The glass sheets were held at a distance of about 50 cm from the eyes, and the interior of a neighboring building at a distance of about 10 m was observed through the glass sheets. The evaluation results were based on the following criteria:

A: No multiple images due to diffraction were seen, and the view was similar to that through a normal window B: No problem occurred for normal use, but multiple images due to diffraction were slightly seen in the presence of, for example, a specular reflector C: The shape of an object could be roughly recognized, but the multiple images due to diffraction were noticeable D: Nothing was recognized because of fogging due to diffraction The results are shown in Table 3.

Measurement of Surface Roughness

The optical film of Comparative Example 6 was evaluated for surface roughness as follows.

Figure 34:
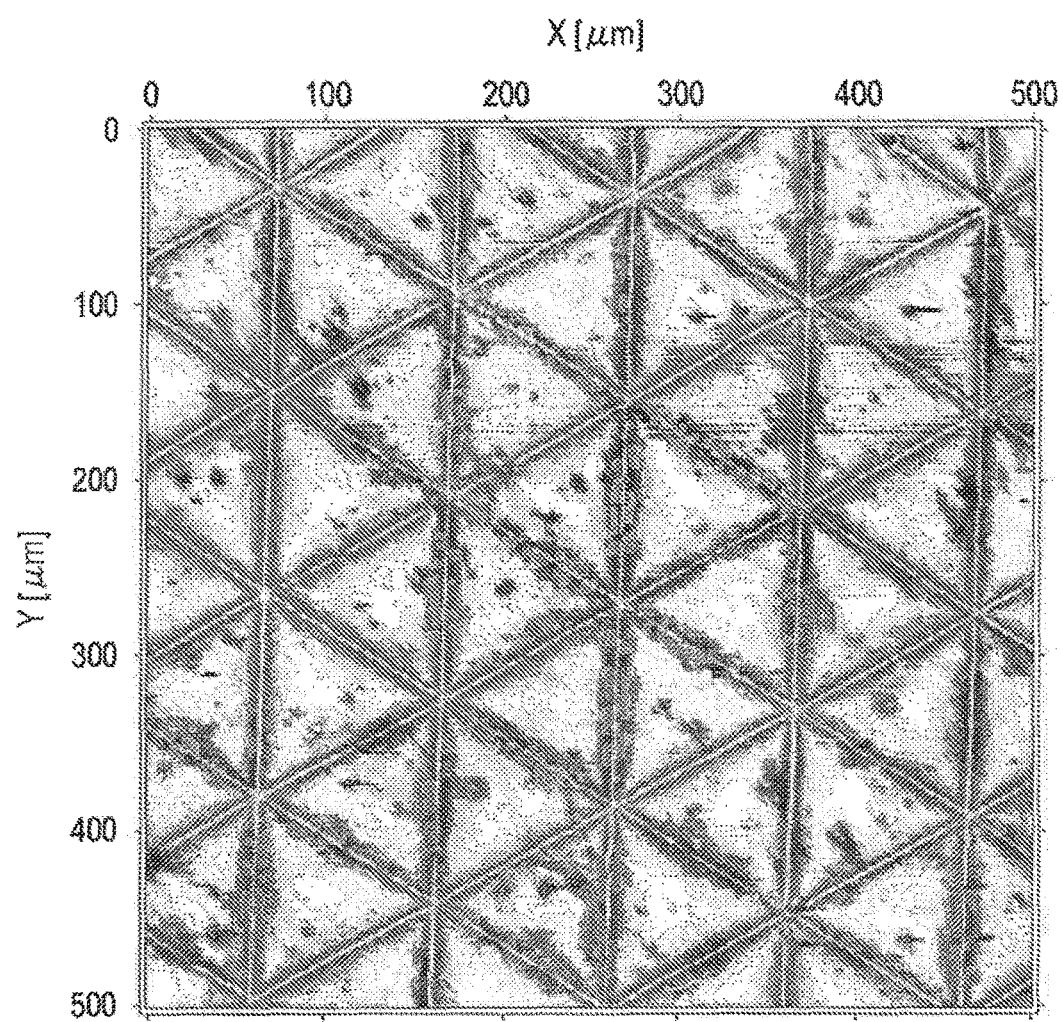
FIG. 34 is a diagram showing the evaluation results of the surface roughness of an optical film of Comparative Example 6.

The surface roughness was measured using the contact profilometer ET-4000 (manufactured by Kosaka Laboratory Ltd.). The results are shown in FIG. 34.

Table 1 shows the structures of the optical films of Examples 1 to 6 and Comparative Examples 1 to 8.

TABLE 1

| | | Structure of alternate multilayer film | | | | | | | | | Resin | |
| | | First layer | | Second layer | | Third layer | | Fourth layer | | Fifth layer | | layer on | PET film |
| | Shape of structure | Material | Thickness [nm] | Material | Thickness [nm] | Material | Thickness [nm] | Material | Thickness [nm] | Material | Thickness [nm] | alternate multilayer film | on incident side |
| Example 1 | Prism | $Nb_2O_5$ | 47 | Ag | 18 | $Nb_2O_5$ | 99 | Ag | 18 | $Nb_2O_5$ | 47 | Formed | Laminated |
| Example 2 | Triangular pyramid | ZnO | 50 | AgNdCu | 9 | ZnO | 100 | AgNdCu | 9 | ZnO | 50 | Formed | Laminated |
| Example 3 | Triangular pyramid | | 30 | | 12 | | 70 | | 12 | | 31 | Formed | Laminated |
| Example 4 | Triangular pyramid | | 77 | | 19 | | 180 | | 19 | | 81 | Formed | Laminated |
| Example 5 | Triangular pyramid | | 50 | | 9 | | 100 | | 9 | | 50 | Formed | Laminated |
| Example 6 | Triangular pyramid | | 50 | | 9 | | 100 | | 9 | | 50 | Formed | Laminated |

TABLE 1-continued

| | | Structure of alternate multilayer film | | | | | | | | | Resin | |
| | | First layer | | Second layer | | Third layer | | Fourth layer | | Fifth layer | | layer on | PET film |
| | Shape of structure | Material | Thickness [nm] | Material | Thickness [nm] | Material | Thickness [nm] | Material | Thickness [nm] | Material | Thickness [nm] | alternate multilayer film | on incident side |
|---|---|---|---|---|---|---|---|---|---|---|---|---|---|
| Comparative Example 1 | None | Nb$_2$O$_5$ | 33 | Ag | 13 | Nb$_2$O$_5$ | 70 | Ag | 13 | Nb$_2$O$_5$ | 33 | Formed | Laminated |
| Comparative Example 2 | None | ZnO | 50 | AgNdCu | 9 | ZnO | 100 | AgNdCu | 9 | ZnO | 50 | Formed | Laminated |
| Comparative Example 3 | None | | 30 | | 12 | | 70 | | 12 | | 31 | Formed | Laminated |
| Comparative Example 4 | None | | 77 | | 19 | | 180 | | 19 | | 81 | Formed | Laminated |
| Comparative Example 5 | Triangular pyramid | | 50 | | 9 | | 100 | | 9 | | 50 | Not formed | Not laminated |
| Comparative Example 6 | Triangular pyramid | | 50 | | 9 | | 100 | | 9 | | 50 | Formed | Not laminated |
| Comparative Example 7 | Triangular pyramid | | 50 | | 9 | | 100 | | 9 | | 50 | Formed | Laminated |
| Comparative Example 8 | Triangular pyramid | | 50 | | 9 | | 100 | | 9 | | 50 | Formed | Laminated |

Table 2 shows the evaluation results of the directional reflectance of Example 1 and Comparative Example 1.

TABLE 2

| | | Incident angle | | | | |
| | | 0° | 20° | 40° | 60° | 80° |
|---|---|---|---|---|---|---|
| Directional reflectance at wavelength of 900 nm [%] | Example 1 | 65 | 52 | 34 | 21 | 8 |
| | Comparative Example 1 | 80 | 0 | 0 | 0 | 0 |
| Directional reflectance at wavelength of 1,100 nm [%] | Example 1 | 82 | 66 | 43 | 26 | 11 |
| | Comparative Example 1 | 89 | 0 | 0 | 0 | 0 |

Table 3 shows the evaluation results of the directional reflection direction, transmitted-image clarity, haze, and visibility of the optical films of Examples 1 to 6 and Comparative Examples 5 to 8 at an incident angle (θ, φ) of (10°, 45°).

Table 4 shows the evaluation results of the chromaticity of Examples 2 to 4 and Comparative Examples 2 to 4.

TABLE 4

| | Chromaticity |
|---|---|
| Example 2 | x = 0.371, y = 0.357 |
| Example 3 | x = 0.303, y = 0.301 |
| Example 4 | x = 0.318, y = 0.322 |
| Comparative Example 2 | x = 0.517, y = 0.433 |
| Comparative Example 3 | x = 0.261, y = 0.325 |
| Comparative Example 4 | x = 0.450, y = 0.349 |

Figure 29:
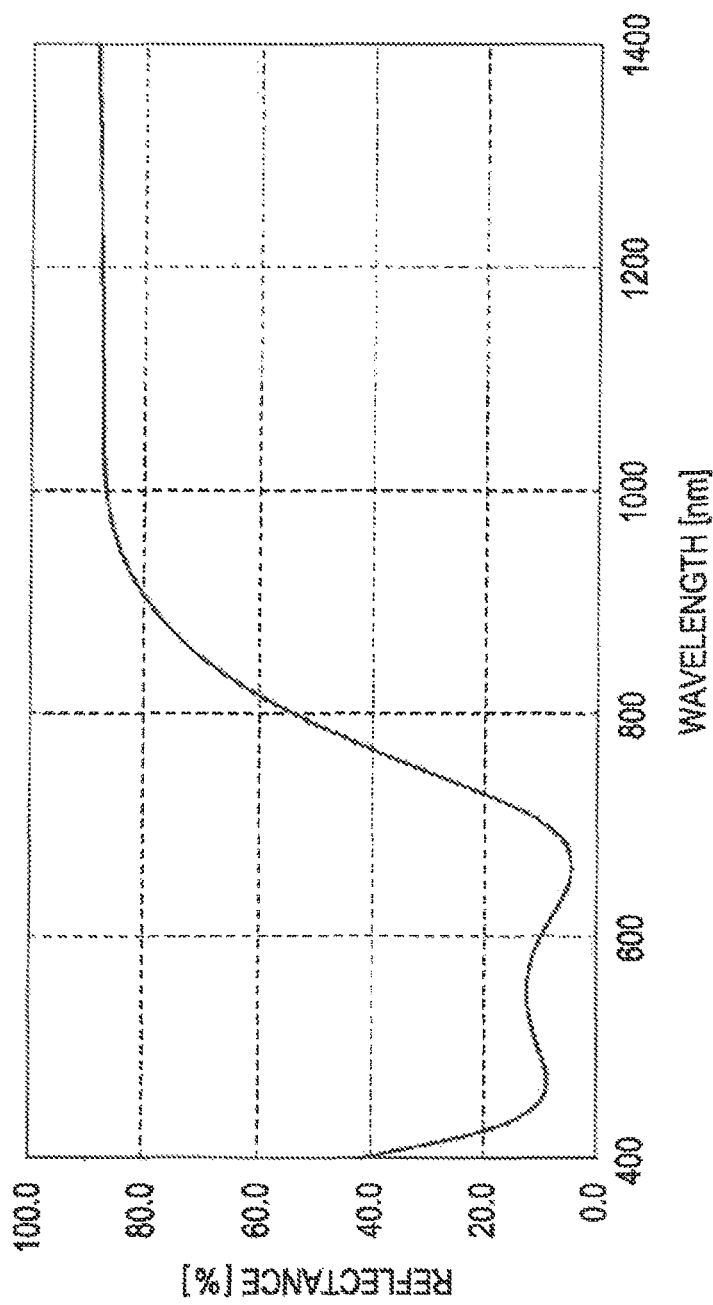
FIG. 29 is a graph showing the spectral reflectance curve of Example 1.

The following can be seen from Table 2 and FIG. 29.

The optical film of Example 1 could directionally reflect near infrared light while having a visible transmittance of more than 80%. In contrast, the optical film of Comparative Example 1 had a visible transmittance comparable to that of Example 1 but did not retroreflect near infrared light at an incident angle other than 0°.

TABLE 3

| | Directional reflection direction | | Transmitted-image clarity | | | | | Haze | |
| | φ | θ | 0.125 mm | 0.5 mm | 1.0 mm | 2.0 mm | Total | [%] | Visibility |
|---|---|---|---|---|---|---|---|---|---|
| Example 1 | −10° | 45° | 69.7 | 73.5 | 72.7 | 88.0 | 303.9 | 3.6 | B |
| Example 2 | 10° | 45° | 60.8 | 81.5 | 88.8 | 95.5 | 326.6 | 2.7 | B |
| Example 3 | 10° | 45° | 78.7 | 89.0 | 93.3 | 97.5 | 358.5 | 5.8 | A |
| Example 4 | 10° | 45° | 54.9 | 78.6 | 88.0 | 96.2 | 317.7 | 3.8 | B |
| Example 5 | 10° | 45° | 60.4 | 61.0 | 65.8 | 85.2 | 272.4 | 2.8 | B |
| Example 6 | 10° | 45° | 54.3 | 50.2 | 56.4 | 77.3 | 238.2 | 3.1 | B |
| Comparative Example 5 | 10° | 45° | 0.0 | 0.0 | 0.0 | 0.0 | 0.0 | 99.8 | D |
| Comparative Example 6 | 10° | 45° | 3.2 | 15.2 | 4.5 | 36.6 | 59.5 | 4.5 | D |
| Comparative Example 7 | 10° | 45° | 28.8 | 34.0 | 38.1 | 41.9 | 142.8 | 4.1 | C |
| Comparative Example 8 | 10° | 45° | 12.2 | 5.6 | 25.8 | 37.6 | 81.2 | 8.7 | D |

The following can be seen from Table 3 and FIG. 34.

The optical film of Comparative Example 5 could directionally reflect near infrared light with a wavelength of about 1,200 nm and also transmitted visible light, but an object behind the optical film was not seen because the resin layer was formed on the alternate multilayer film and was not subjected to clearing treatment. The surface of the optical film of Comparative Example 6 was not completely planarized by clearing treatment, as shown in FIG. 34. As in Comparative Example 5, therefore, an object behind the optical film of Comparative Example 6 was not seen. The prisms were arranged at a bottom pitch of about 110 m and had a maximum height Rz of about 1.3 μm and an arithmetic average roughness Ra of about 0.14 μm; it can be seen that the surface had insufficient flatness for a transmitted image to be clearly seen.

For the optical films of Comparative Examples 7 and 8, which had refractive index differences of 0.013 and 0.025, respectively, the value of transmitted-image clarity measured using the optical comb with a comb width of 0.5 mm was less than 50. In addition, the sum of the values of image clarity measured using the optical combs with comb widths of 0.125 mm, 0.5 mm, 1.0 mm, and 2.0 mm was less than 230. Thus, the optical films of Comparative Examples 7 and 8 scattered more light and had lower selective transparency to visible light. That is, these optical films had lower transparency.

The following can be seen from Table 3.

For the optical films of Examples 1 to 6, the value of image clarity measured using the optical comb with a comb width of 0.5 mm was more than 50, and the sum of the values of image clarity measured using the individual optical combs was more than 230. In addition, the visibility was evaluated as "B" or "A".

For the optical films of Comparative Examples 5 to 8, on the other hand, the value of image clarity measured using the optical comb with a comb width of 0.5 mm was less than 50, and the sum of the values of image clarity measured using the individual optical combs was less than 230. In addition, the visibility was evaluated as "D".

Thus, in view of visibility, the value of transmitted-image clarity measured using an optical comb with a comb width of 0.5 mm is preferably 50 or more. In view of visibility, additionally, the sum of the values of image clarity measured using optical combs with comb widths of 0.125 mm, 0.5 mm, 1.0 mm, and 2.0 mm is preferably 230 or more.

The following can be seen from Tables 3 and 4 and FIGS. 32 and 33.

The optical film of Comparative Example 2 had high reflectance in the visible region and had a slightly golden color. The optical film of Comparative Example 3 had high reflectance in the visible region and had a slightly blue-green color. The optical film of Comparative Example 4 had high reflectance in the visible region and had a reddish color. In addition, the optical films of Comparative Examples 3 and 4 appeared to change color when viewed at different angles. That is, the colors of the optical films of Comparative Examples 2 to 4 were unsuitable for applications such as building windows. In contrast, the optical films of Examples 2 to 4, which had the same film structures as the Comparative Examples 2 to 4, respectively, had a color not noticeable to see. Although the optical film of Example 2 was slightly green and the optical films of Examples 3 and 4 were slightly blue, their colors did not substantially appear to change color when viewed at different angles. Such properties are preferred if an optical film is used for applications where design is important, such as window glass.

Example 7

Figure 35A:
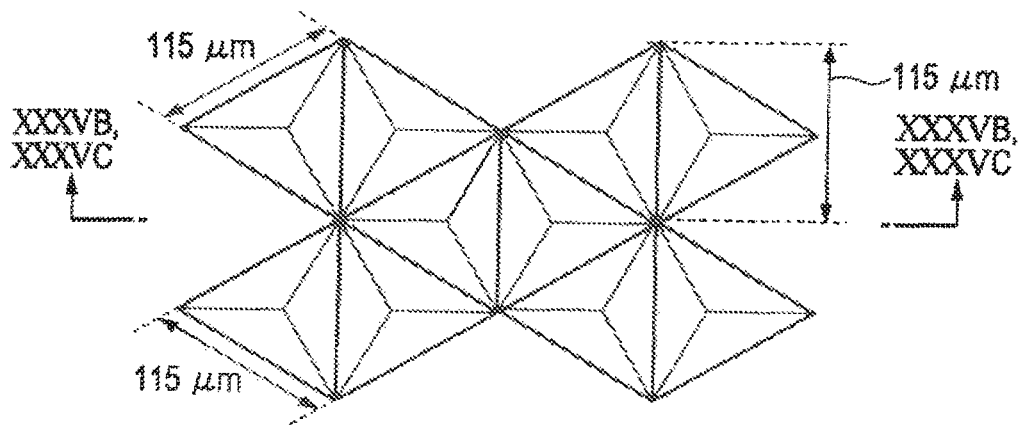
FIG. 35A is a plan view showing the surface profile of a mold for producing optical films of Examples 7 to 11.
Figure 35B:
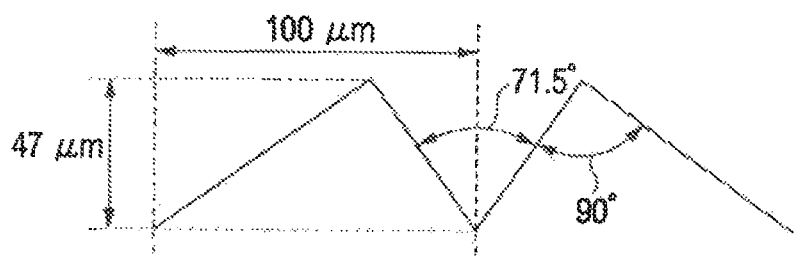
FIG. 35B is a sectional view, taken along line XXXVB-XXXVB, of the mold shown in FIG. 35A.
Figure 35C:
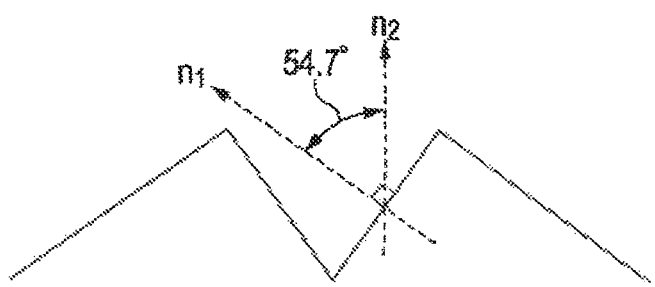
FIG. 35C is a sectional view, taken along line XXXVC-XXXVC, of the mold shown in FIG. 35A.
Figure 36:
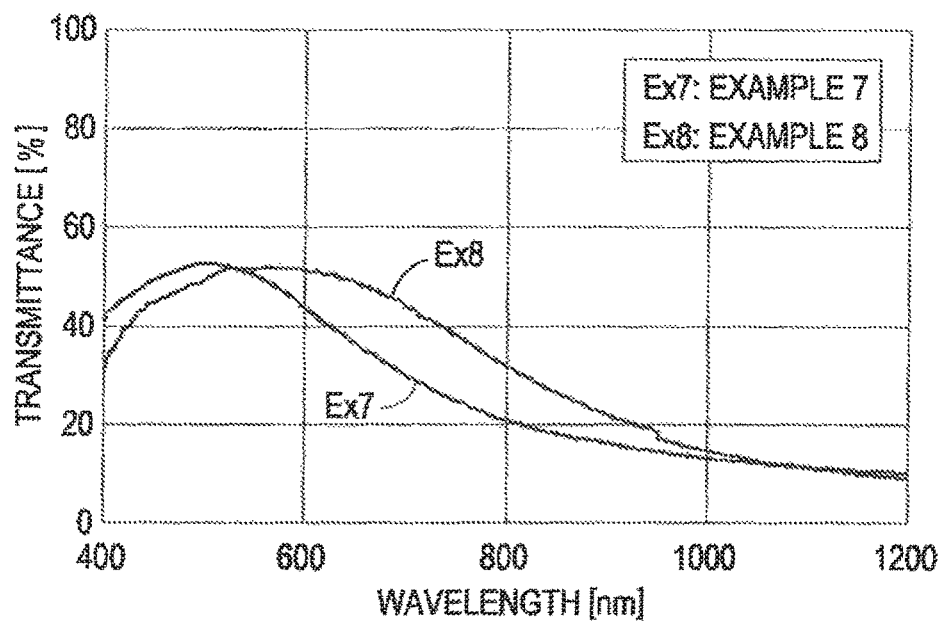
FIG. 36 is a graph showing the transmission characteristics of the optical films of Examples 7 and 8.
Figure 37:
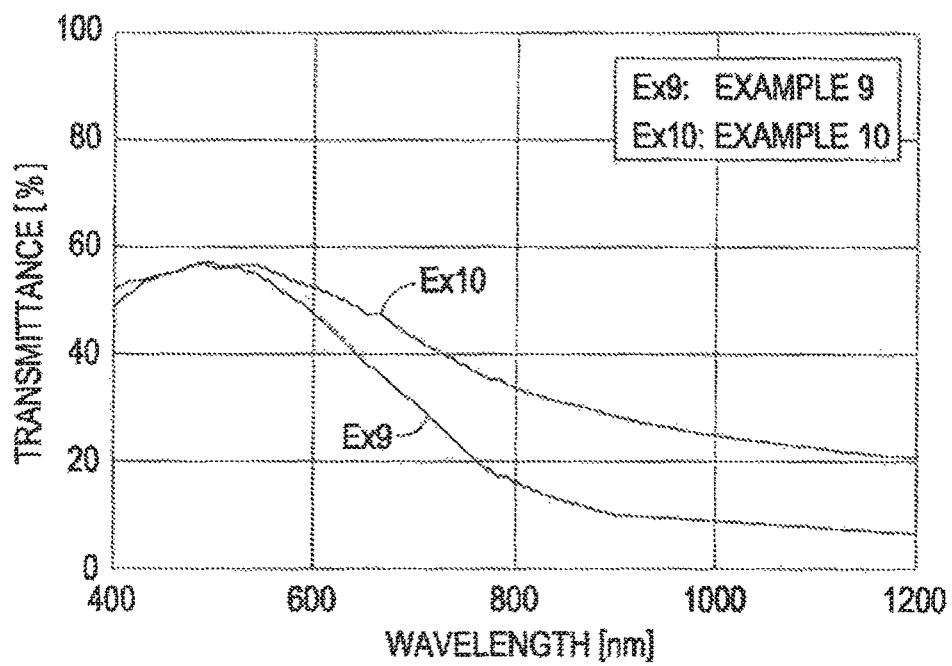
FIG. 37 is a graph showing the transmission characteristics of the optical films of Examples 9 and 10.
Figure 38A:
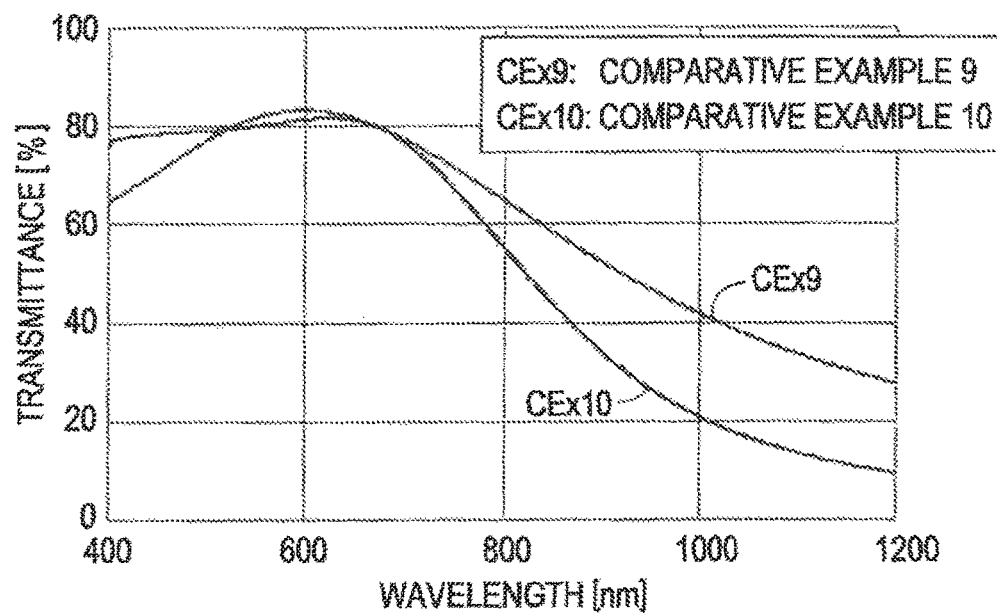
FIG. 38A is a graph showing the transmission characteristics of the optical films of Comparative Examples 9 and 10.
Figure 38B:
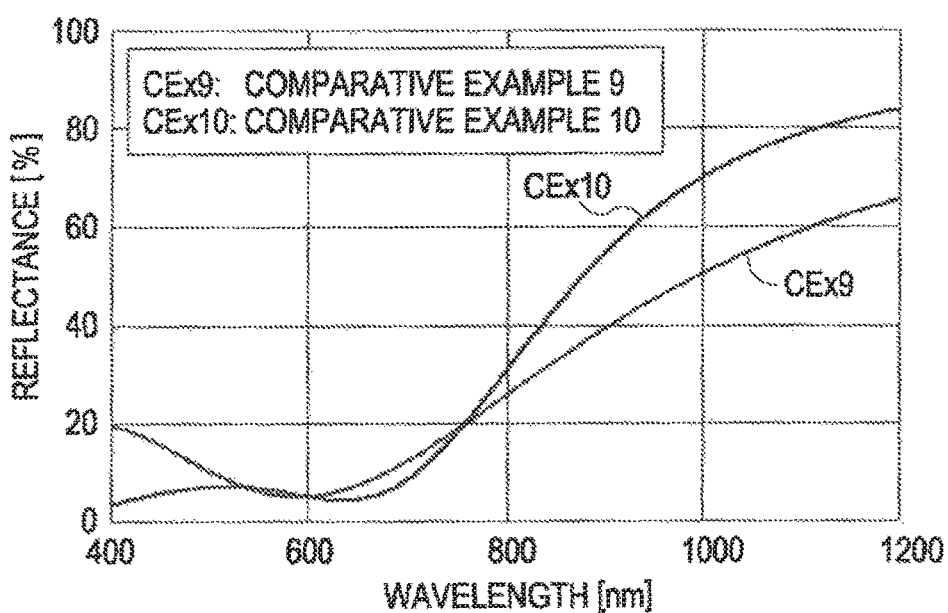
FIG. 38B is a graph showing the reflection characteristics of the optical films of Comparative Examples 9 and 10.
Figure 39A:
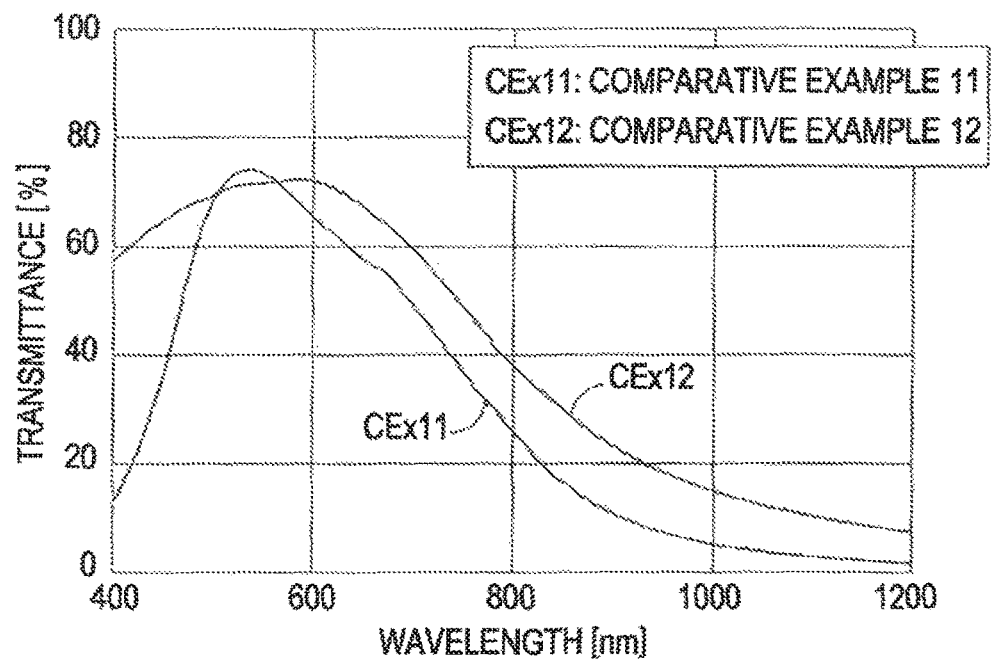
FIG. 39A is a graph showing the transmission characteristics of the optical films of Comparative Examples 11 and 12.
Figure 39B:
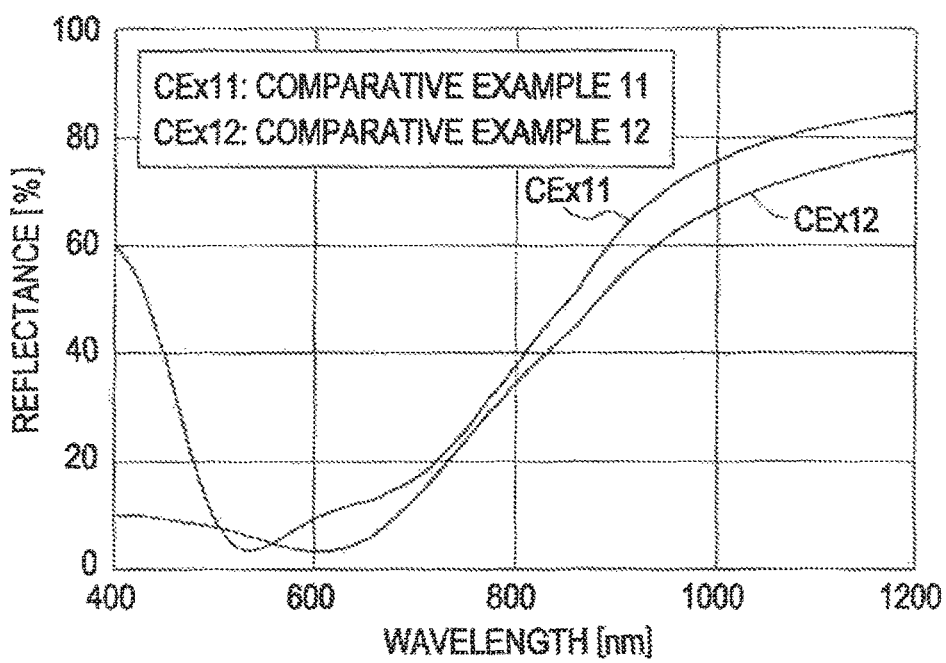
FIG. 39B is a graph showing the reflection characteristics of the optical films of Comparative Examples 11 and 12.
Figure 40A:
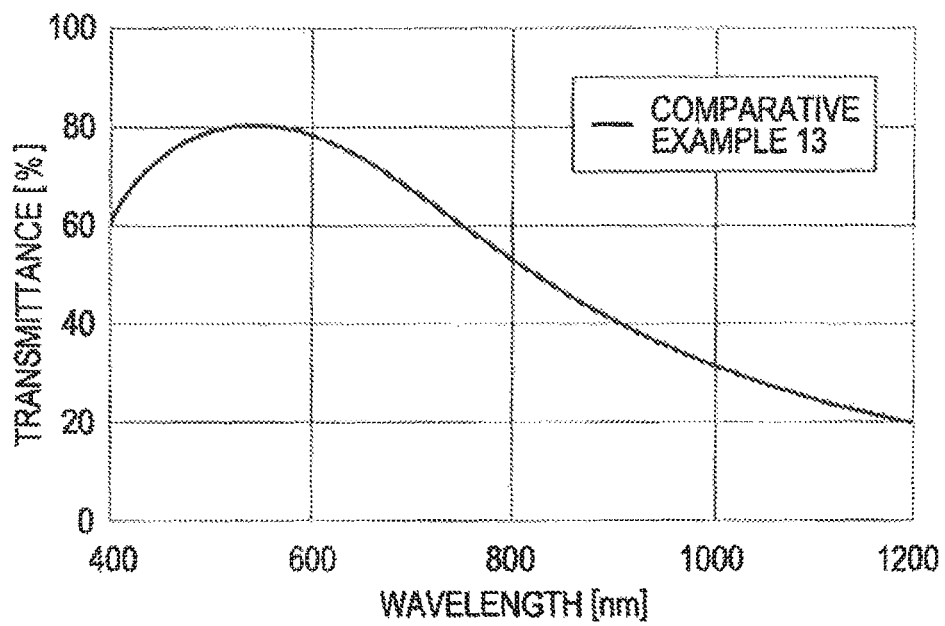
FIG. 40A is a graph showing the transmission characteristics of an optical film of Comparative Example 13.
Figure 40B:
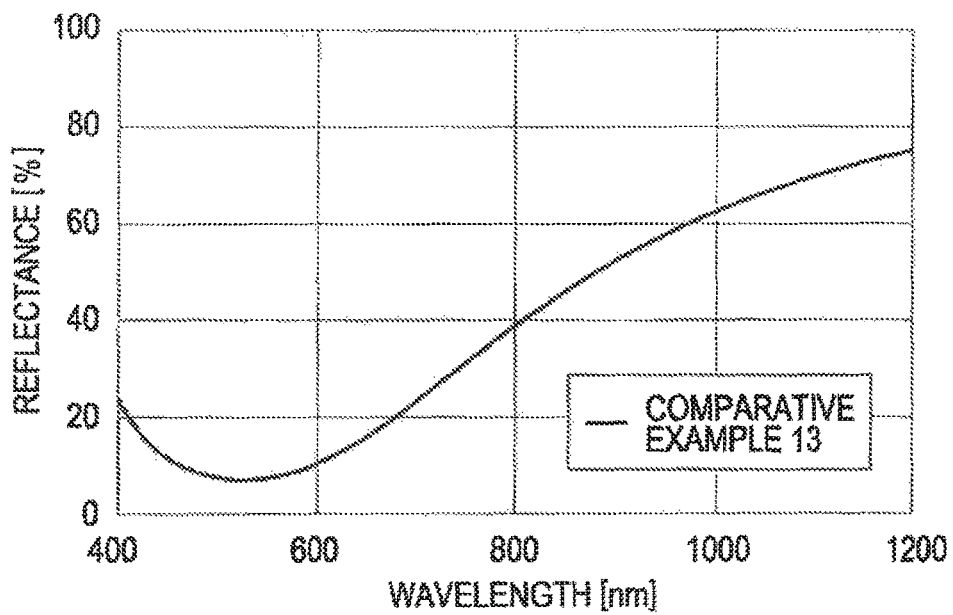
FIG. 40B is a graph showing the reflection characteristics of the optical film of Comparative Example 13.

First, a Ni—P alloy mold roller having a fine triangular pyramid profile shown in FIGS. 35A to 35C was prepared by cutting using a cutting tool. A urethane acrylate (ARONIX, manufactured by Toagosei Co., Ltd.; refractive index after curing: 1.533) was applied onto a PET film (A4300, manufactured by Toyobo Co., Ltd.) having a thickness of 75 μm and was cured in contact with the mold by irradiation with ultraviolet light through the PET film. The laminate of the resin layer formed by curing the urethane acrylate and the PET film was removed from the Ni—P alloy mold. Thus, a resin layer having a triangular pyramid profile (hereinafter referred to as "textured resin layer" or "lower resin layer") was formed on the PET film. A wavelength-selective reflective layer having the film structure shown in Table 5 was then formed by sputtering on the molded surface on which the triangular pyramid profile was formed by the mold. The Ag—Pd—Cu alloy films were formed using an alloy target having the composition Ag:Pd:Cu=99.0:0.4:0.6 (in atomic percent).

Next, the production apparatus shown in FIG. 23 was used to embed the wavelength-selective reflective layer on the textured film with a resin as follows. Specifically, a resin composition having the formulation below was applied onto a flat PET film (A4300, manufactured by Toyobo Co., Ltd.) having a thickness of 75 μm, and the textured PET film having the wavelength-selective reflective layer was laminated on the flat PET film so that no bubbles remained therebetween. The resin composition was then cured by irradiation with ultraviolet light through the flat PET film. As a result, the resin composition between the flat PET film and the wavelength-selective reflective layer was cured to form a resin layer (hereinafter referred to as "embedded resin layer" or "upper resin layer"). Thus, the intended optical film of Example 7 was produced.

Formulation of Resin Composition

Urethane acrylate 99 parts by mass (ARONIX, manufactured by Toagosei Co., Ltd.; refractive index after curing: 1.533)

2-Acryloyloxyethyl acid phosphate 1 part by mass (LIGHT-ACRYLATE P-1A, manufactured by Kyoeisha Chemical Co., Ltd.)

Example 8

An optical film of Example 8 was produced as in Example 7 except that the wavelength-selective reflective layer had the film structure shown in Table 5.

Example 9

An optical film of Example 9 was produced as in Example 7 except that the wavelength-selective reflective layer had the film structure shown in Table 5. The Ag—Bi alloy films were formed using an alloy target having the composition Ag:Bi=99.0:1.0 (in atomic percent), and the $Nb_2O_5$ films were formed using a $Nb_2O_5$ ceramic target.

Example 10

An optical film of Example 10 was produced as in Example 9 except that the wavelength-selective reflective layer had the film structure shown in Table 5.

Example 11

An optical film of Example 11 was produced as in Example 9 except that the wavelength-selective reflective layer had the film structure shown in Table 5.

Example 12

An optical film of Example 12 was produced as in Example 9 except that the wavelength-selective reflective layer had the film structure shown in Table 5.

Comparative Example 9

An optical film of Comparative Example 9 was produced as in Comparative Example 1 except that a wavelength-selective reflective layer having the same structure as in Example 7 was formed on a PET film having a flat surface, rather than on the textured PET film.

Comparative Example 10

An optical film of Comparative Example 10 was produced as in Comparative Example 1 except that a wavelength-selective reflective layer having the same structure as in Example 8 was formed on a PET film having a flat surface, rather than on the textured PET film.

Comparative Example 11

An optical film of Comparative Example 11 was produced as in Comparative Example 1 except that a wavelength-selective reflective layer having the same structure as in Example 9 was formed on a PET film having a flat surface, rather than on the textured PET film.

Comparative Example 12

An optical film of Comparative Example 12 was produced as in Comparative Example 1 except that a wavelength-selective reflective layer having the same structure as in Example 10 was formed on a PET film having a flat surface, rather than on the textured PET film.

Comparative Example 13

An optical film of Comparative Example 13 was produced as in Comparative Example 1 except that a wavelength-selective reflective layer having the same structure as in Example 12 was formed on a PET film having a flat surface, rather than on the textured PET film.

Evaluation of Adhesion of Reflective Layer

The prepared films were bonded to glass sheets having a thickness of 3 mm using an optically transparent adhesive agent, were peeled at the edges thereof, and were observed to evaluate the adhesion based on the following criteria:

A: The film was difficult to peel, and when the film was forcedly peeled, a bulk fracture occurred in the substrate or the resin layer B: The film was relatively difficult to peel, but when forcedly peeled, the film was peeled at the interface thereof C: The film was peeled at the interface thereof with resistance D: The film was peeled at the interface thereof without resistance Evaluation of Transmittance and Reflectance The transmittance and the reflectance were measured using DUV3700, manufactured by Shimadzu Corporation. The transmittance was measured at an angle of 0° with respect to the normal to the optical film, whereas the reflectance was measured at an angle of 8° with respect to the normal to the optical film. The results are shown in FIGS. 36 to 40.

Evaluation of Colors of Transmitted Light and Reflected Light

Transmitted light and reflected light were visually evaluated for redness. The results are shown in Tables 6 and 7.

Table 5 shows the structures and evaluation results of the optical films of Examples 7 to 12 and Comparative Examples 9 to 13.

TABLE 5

| | Film surface | \multicolumn{8}{c}{Structure of alternate multilayer film} | Adhesion |
| | | First layer | Second layer | Third layer | Fourth layer | Fifth layer | Sixth layer | Seventh layer | Eighth layer | |
|---|---|---|---|---|---|---|---|---|---|---|
| Example 7 | Textured | ZnO 17 nm | AgPdCu 7 nm | ZnO 75 nm | AgPdCu 7 nm | ZnO 17 nm | — | — | — | A |
| Example 8 | Textured | ZnO 68 nm | AgPdCu 13 nm | ZnO 128 nm | AgPdCu 13 nm | ZnO 68 nm | — | — | — | A |
| Example 9 | Textured | $Nb_2O_5$ 38 nm | AgBi 18 nm | ZnO 7 nm | $Nb_2O_5$ 63 nm | AgBi 19 nm | Zn 7 nm | $Nb_2O_5$ 33 nm | ZnO 3 nm | A |
| Example 10 | Textured | $Nb_2O_5$ 22 nm | AgBi 10 nm | ZnO 6 nm | $Nb_2O_5$ 37 nm | AgBi 11 nm | ZnO 6 nm | $Nb_2O_5$ 19 nm | ZnO 3 nm | A |
| Example 11 | Textured | $Nb_2O_5$ 38 nm | AgBi 18 nm | ZnO 7 nm | $Nb_2O_5$ 63 nm | AgBi 19 nm | ZnO 7 nm | $Nb_2O_5$ 35 nm | — | A |
| Example 12 | Textured | ZnO 76 | AgPdCu 22 | ZnO 76 | — | — | — | — | — | A |
| Comparative Example 9 | Flat | ZnO 10 nm | AgPdCu 5 nm | ZnO 47 nm | AgPdCu 5 nm | ZnO 10 nm | — | — | — | — |
| Comparative Example 10 | Flat | ZnO 40 mm | AgPdCu 9 nm | ZnO 80 nm | AgPdCu 9 nm | ZnO 40 nm | — | — | — | — |
| Comparative Example 11 | Flat | $Nb_2O_5$ 38 nm | AgBi 18 nm | ZnO 7 nm | $Nb_2O_5$ 63 nm | AgBi 19 nm | Zno 7 nm | $Nb_2O_5$ 33 nm | ZnO 3 nm | — |
| Comparative Example 12 | Flat | $Nb_2O_5$ 22 mm | AgBi 10 nm | ZnO 6 nm | $Nb_2O_5$ 37 nm | AgBi 11 nm | ZnO 6 nm | $Nb_2O_5$ 19 nm | ZnO 3 nm | — |
| Comparative Example 13 | Flat | ZnO 45 | AgPdCu 15 | ZnO 45 | — | — | — | — | — | — |

Figure 42:
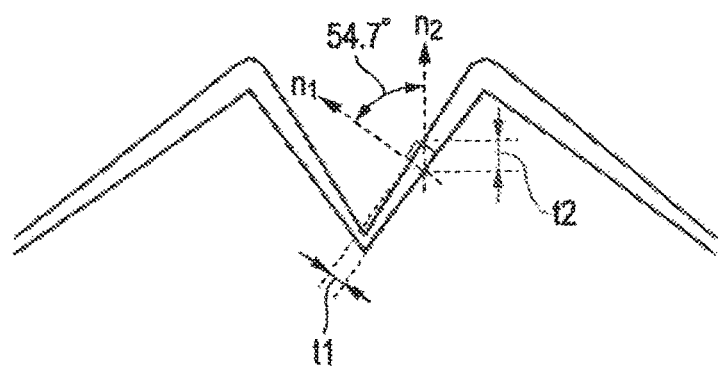
FIG. 42 is a diagram showing the thickness of a wavelength-selective reflective layer.

In Table 5, the average thicknesses of the individual layers in Examples 7 to 12, where the wavelength-selective reflective layer was formed on the textured surface, were measured as follows. First, a sample was prepared by forming a wavelength-selective reflective layer on a flat film under the same conditions as the wavelength-selective reflective layer formed on the textured resin layer in Examples 7 to 12 and cutting the film using a focused ion beam (FIB). The thicknesses of the individual layers in the cross section of the sample were measured by transmission electron microscopy (TEM), and the average thickness was determined therefrom. It has been confirmed that the average thickness thus measured agrees with the average thickness t2 in an n2 direction at the midpoint of the median of a triangle forming a triangular pyramid on the textured resin layer (see FIG. 42). Here the term "median of a triangle" refers to a median extending from the top of a triangle forming a pyramid surface of a triangular pyramid to the opposite side (side of the base of the triangular pyramid). The position on the triangular pyramid at which the thickness agrees with the measured average thickness is thus specified because, as shown in FIG. 42, the measured average thickness of the wavelength-selective reflective layer formed on the triangular pyramids on the textured resin layer varies at different positions on the triangles forming the triangular pyramids. In FIG. 42, the n1 direction is a direction perpendicular to an inclined surface of a prism formed on the PET film, and the n2 direction is a direction perpendicular to the main surface of the PET film (the thickness direction of the PET film).

Table 6 shows the evaluation results of the optical films of Examples 7 to 10 and 12.

TABLE 6

|  | Transmission Redness | Reflection Redness |
|---|---|---|
| Example 7 | None | None |
| Example 8 | None | None |
| Example 9 | None | None |
| Example 10 | None | None |
| Example 12 | None | None |

Table 7 shows the evaluation results of the optical films of Comparative Examples 9 to 13.

TABLE 7

|  | Transmission Redness | Reflection Redness |
|---|---|---|
| Comparative Example 9 | None | Slight |
| Comparative Example 10 | None | None |
| Comparative Example 11 | None | Strong |
| Comparative Example 12 | None | Strong |
| Comparative Example 13 | None | Strong |

Figure 41:
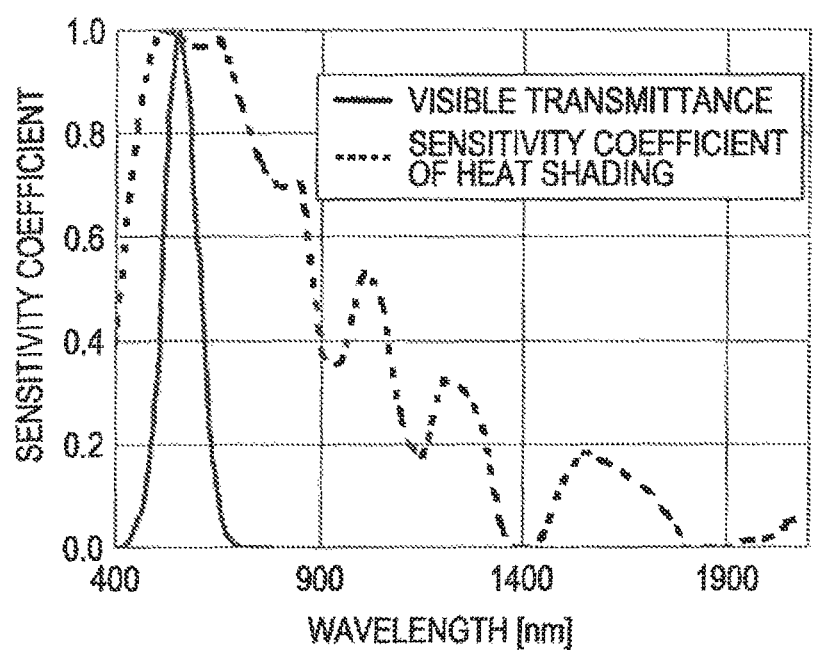
FIG. 41 is a graph showing sensitivity coefficients according to a test method of JIS R 3106.

FIG. 41 is a graph showing sensitivity coefficients according to a test method of JIS R 3106.

For improved visible transmittance, the transmittance is preferably high around a wavelength of 500 nm, where the luminous coefficient is high, and it is therefore desirable to transmit light in a wavelength range from 400 to 750 nm. For improved heat shield performance, on the other hand, light in a wavelength range where the sensitivity coefficient of heat shading for wavelength is high is preferably shielded. Accordingly, for improved visible transmittance and heat shield performance, it is desirable to transmit visible light in a wavelength range from about 400 to 750 nm while effectively shielding near infrared light in a wavelength range from about 750 to 1,300 nm.

The textured resin layer, formed before the formation of the wavelength-selective reflective layer, and the embedded resin layer, formed after the formation of the wavelength-selective reflective layer, preferably have substantially the same refractive index. However, if the two layers are formed of the same resin, the textured resin layer is not easily peeled from the Ni—P alloy mold during the profile transfer if an additive is added to the embedded resin layer to improve adhesion between the wavelength-selective reflective layer, which is an inorganic thin film, and the embedded resin layer, which is an organic thin film. If the wavelength-selective reflective layer is formed by sputtering, the adhesion between the textured resin layer and the wavelength-selective reflective layer rarely becomes a problem because high-energy particles are deposited. It is therefore preferable to add an additive for improving adhesion to the embedded resin layer while minimizing the amount of additive added to the textured resin layer. In this case, if the embedded resin layer and the textured resin layer have a large refractive index difference, the optical film may be fogged and difficult to see through. The optical films of Examples 7 to 12, however, had high clarity because the amount of additive added was 1% by mass and the refractive index was not substantially varied. If a large amount of additive is to be added, the formulation of the resin composition for forming the textured resin layer is preferably adjusted so that it has substantially the same refractive index as the embedded resin layer.

Example 9 differed primarily from Example 11 in that a ZnO layer was formed as the outermost layer of the wavelength-selective reflective layer. Although their spectra substantially agreed with each other, the adhesion to the embedded resin layer was higher in Example 9, in which a ZnO layer was formed as the outermost layer.

The following can be seen from the evaluation results shown in FIG. 36 to 40 and Tables 6 and 7.

The optical films of Comparative Examples 9 and 11 to 13 had a reddish purple to purple reflection color that was noticeable when they were applied to window glass. The optical film of Comparative Example 10 caused no noticeable red reflection, but had a low reflectance, namely, less than 50%, in a wavelength range from 800 to 900 nm in the near infrared region targeted for shielding heat from sunlight. Thus, there was difficulty in achieving a balance of redness and heat shield performance.

In contrast, the optical films of Examples 7 to 10 and 12 had no reflection color because the reflected light returned toward the light source. These optical films had only a blue-green color whether reflected sunlight or transmitted sunlight was viewed, and the color was comfortable with coolness when they were applied to windows. In addition, the optical film of Example 9, for example, which had the same film structure as that of Comparative Example 11, had high reflection performance for infrared light. Thus, the film of this invention example can be applied to achieve a balance of comfortable color appearance and infrared shield performance.

Figure 43:
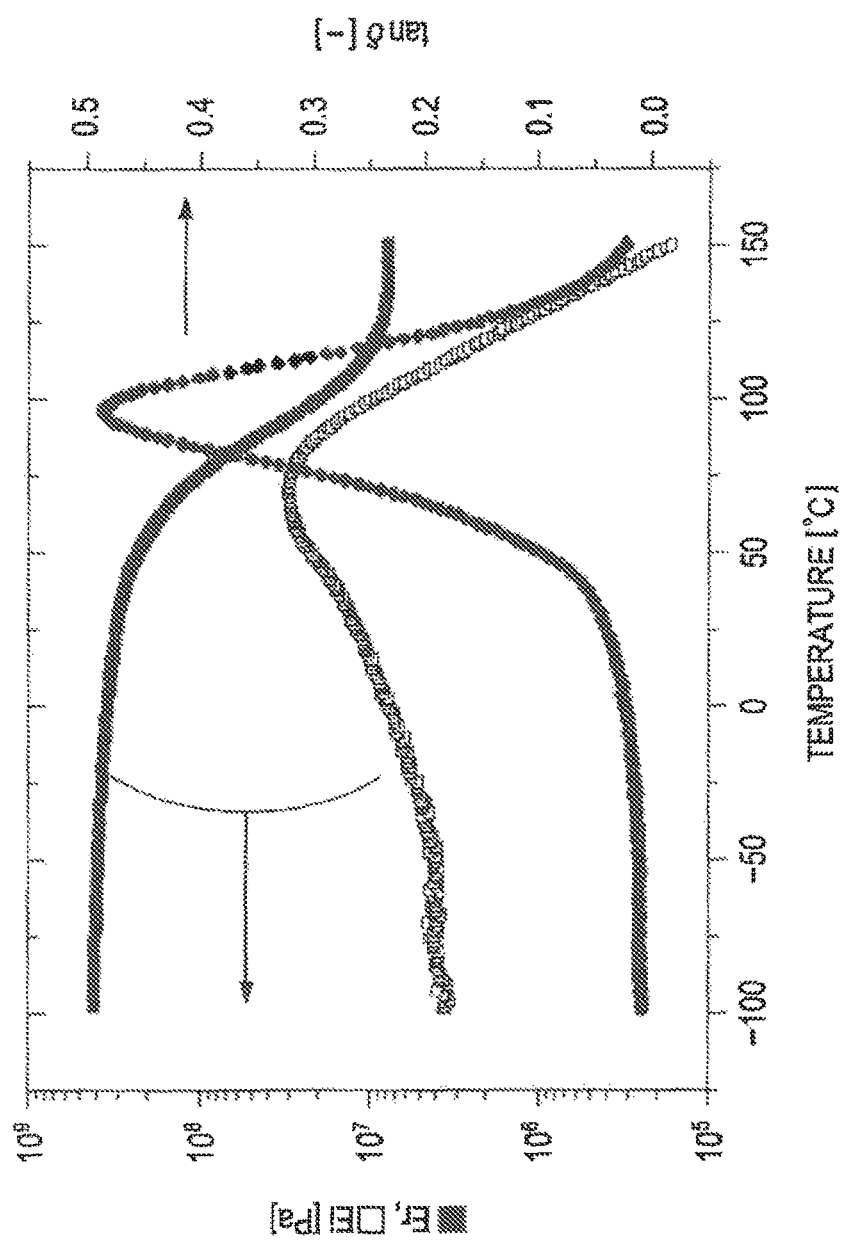
FIG. 43 is a graph showing the viscoelasticity behavior of a profile-transfer resin used in Example 2.
Figure 44A:
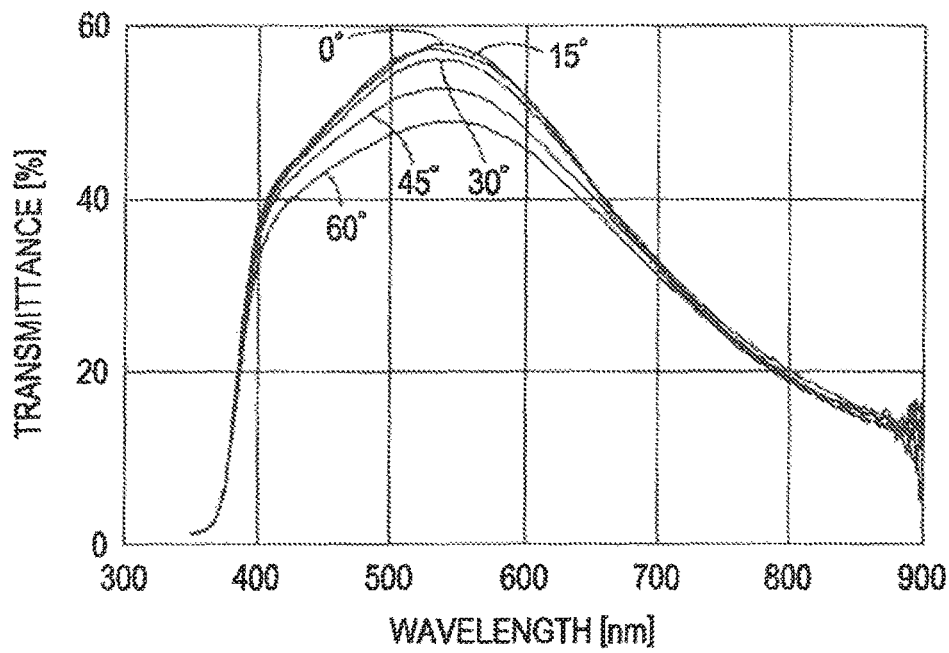
FIG. 44A is a graph showing transmission spectra of the optical film of Example 4.
Figure 44B:
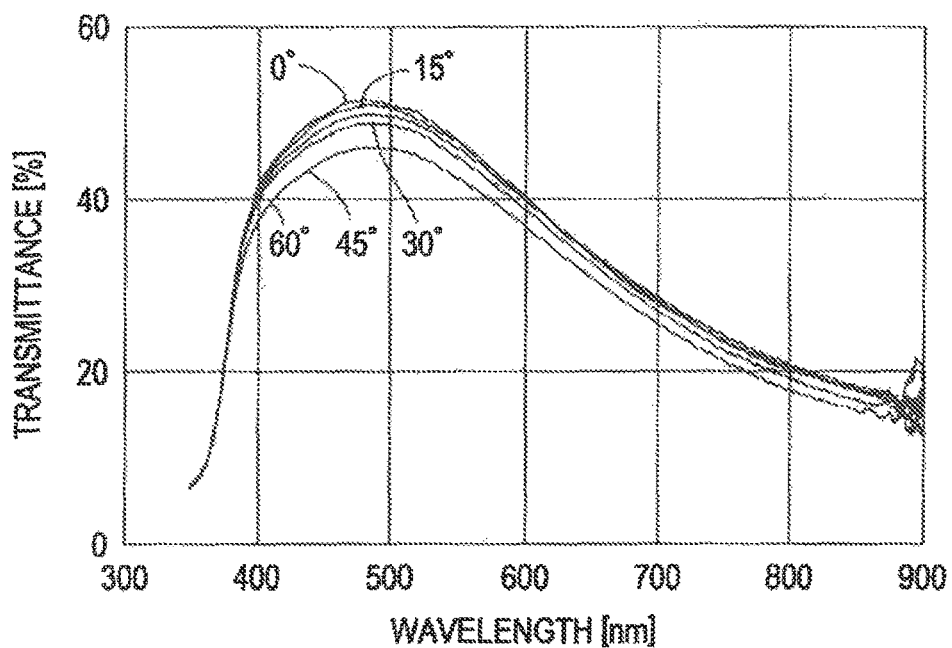
FIG. 44B is a graph showing transmission spectra of the optical film of Example 7.
Figure 45A:
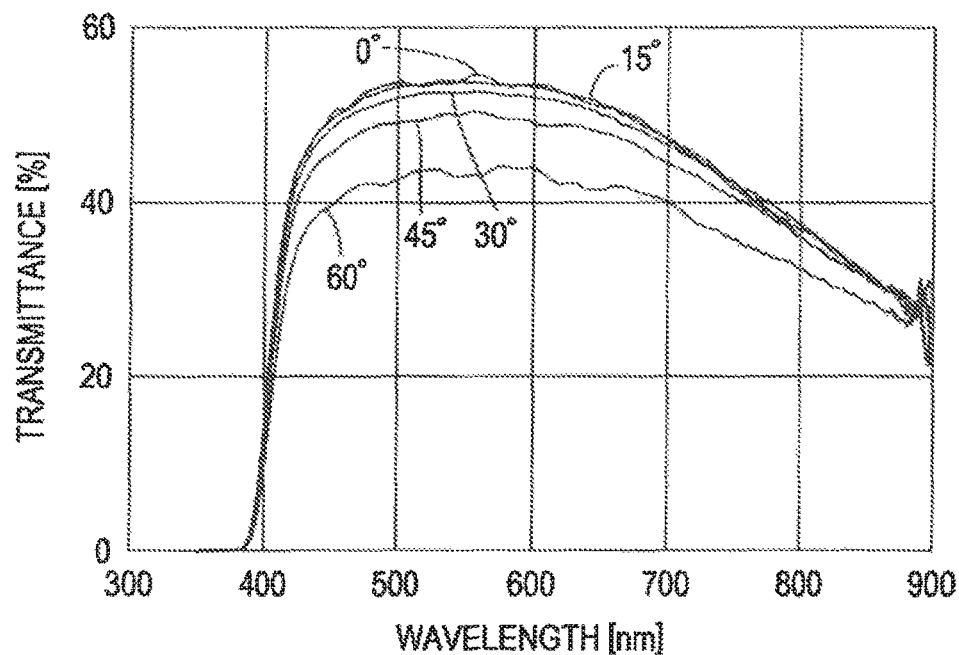
FIG. 45A is a graph showing transmission spectra of the optical film of Example 8.
Figure 45B:
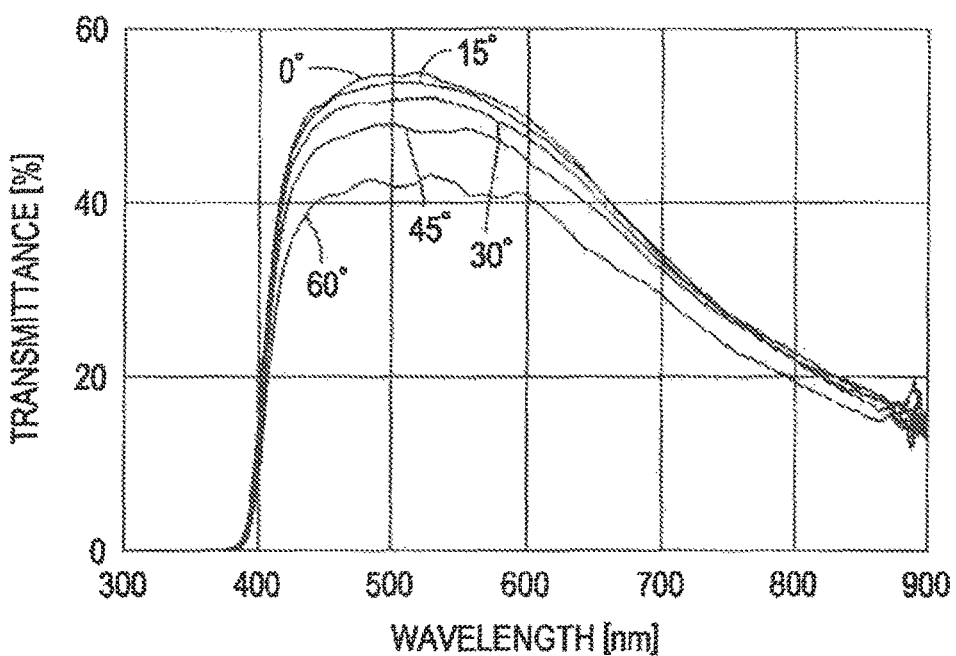
FIG. 45B is a graph showing transmission spectra of the optical film of Example 9.
Figure 46A:
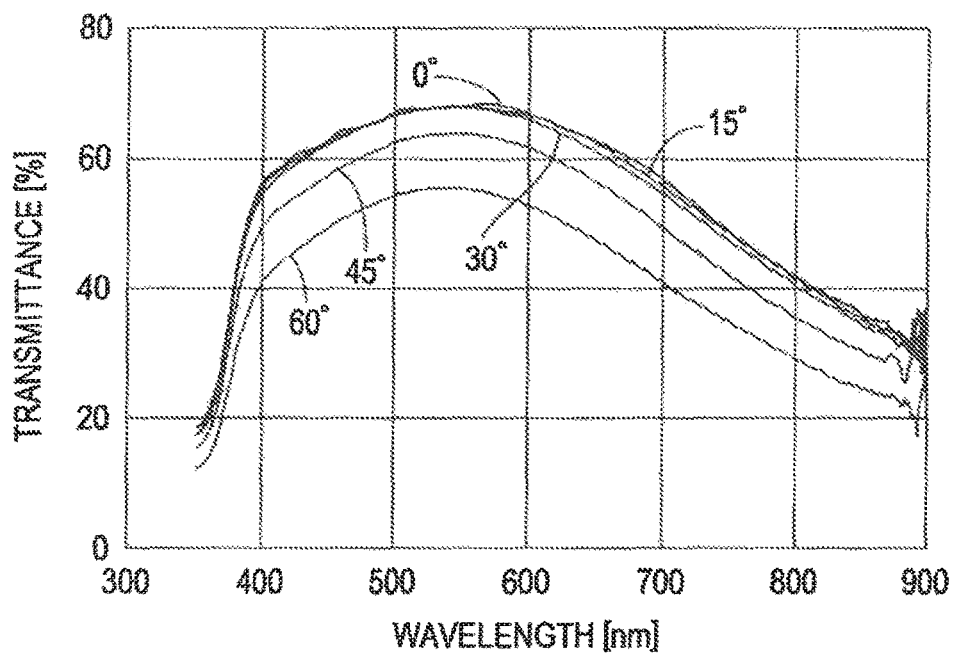
FIG. 46A is a graph showing transmission spectra of the optical film of Comparative Example 9.
Figure 46B:
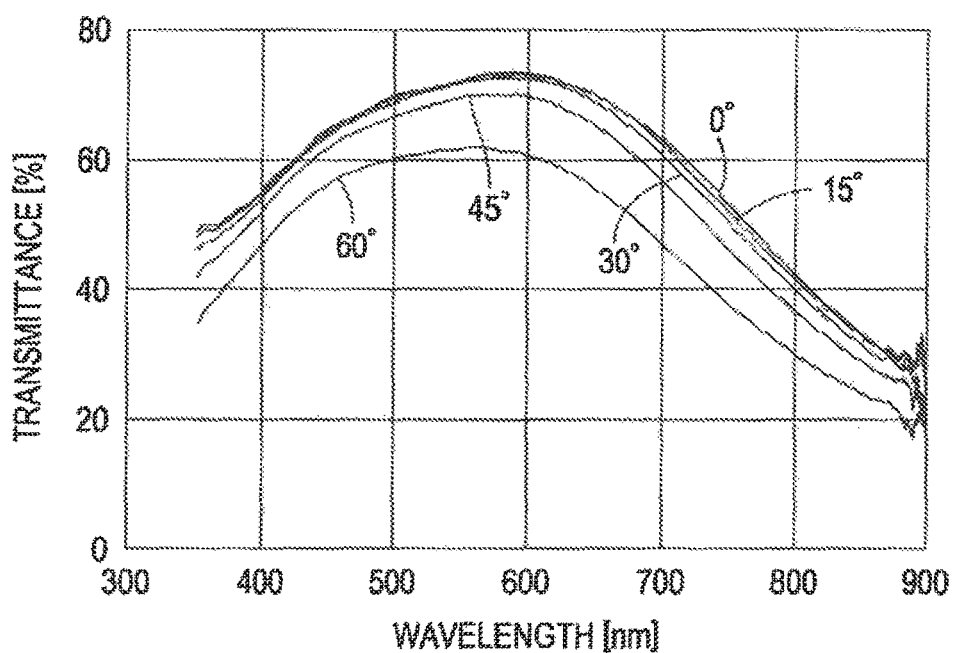
FIG. 46B is a graph showing transmission spectra of the optical film of Comparative Example 12.

FIG. 43 shows the viscoelasticity behavior of the profiletransfer resin used in Example 2, where the arrows indicate which vertical scale the curves belong to. The temperature at which the value of tan δ reaches its peak, namely, 95° C., is the glass transition temperature. Because the glass transition temperature falls within the range from 60° C. to 150° C. in Example 2, as described above, it is possible to prevent deformation of the resin due to heating or film formation during a production process and to prevent the resin layer from cracking or peeling at the interface thereof.

Evaluation of Spectral Transmittance and Reflectance

Figure 47A:
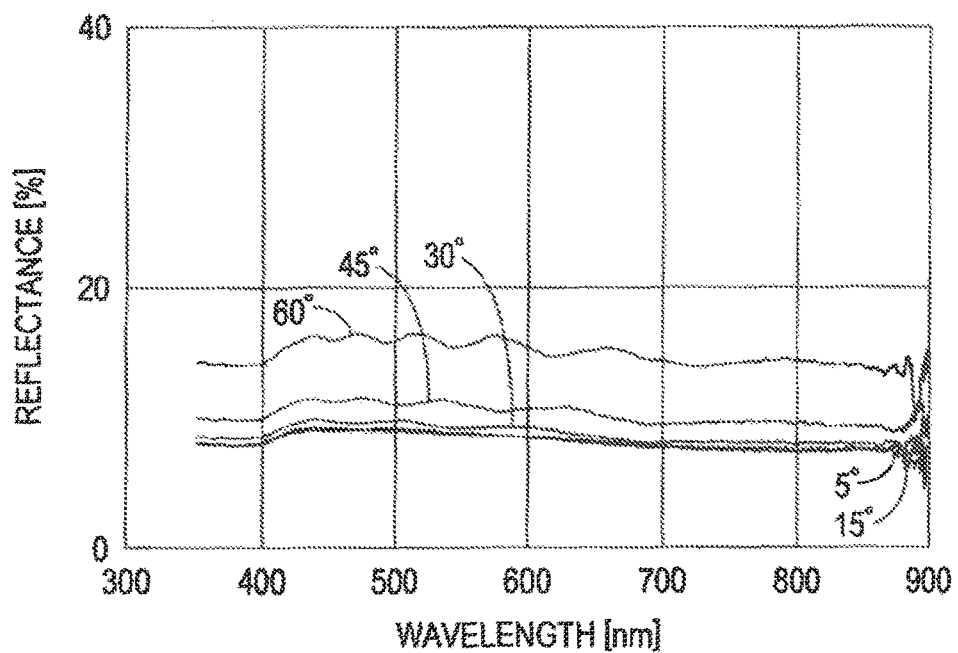
FIG. 47A is a graph showing reflection spectra of the optical film of Example 9 for retroreflective surface incidence.
Figure 47B:
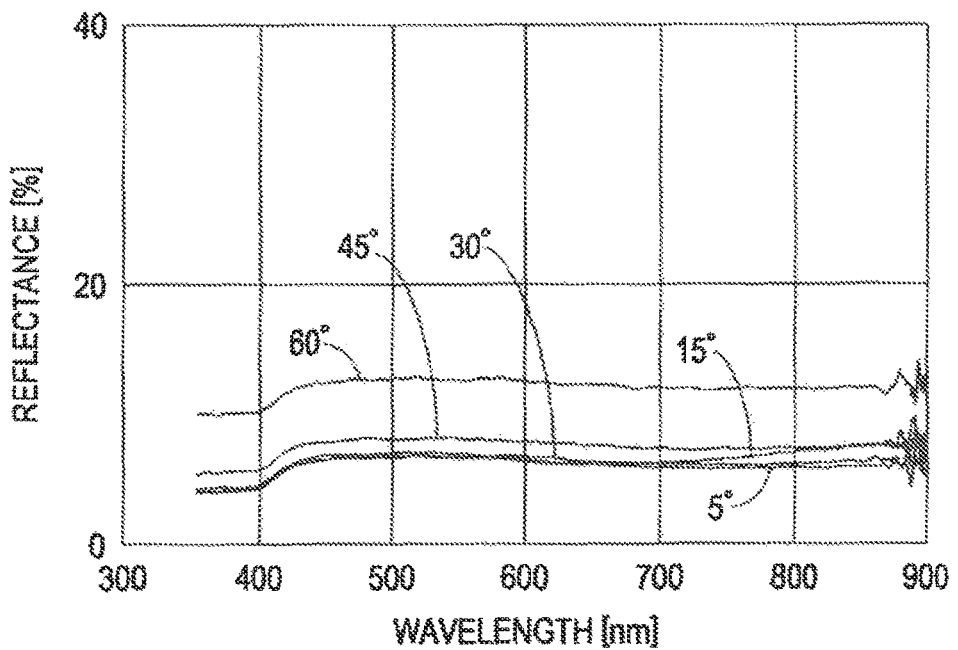
FIG. 47B is a graph showing reflection spectra of the optical film of Example 9 for nonretroreflective surface incidence.
Figure 48A:
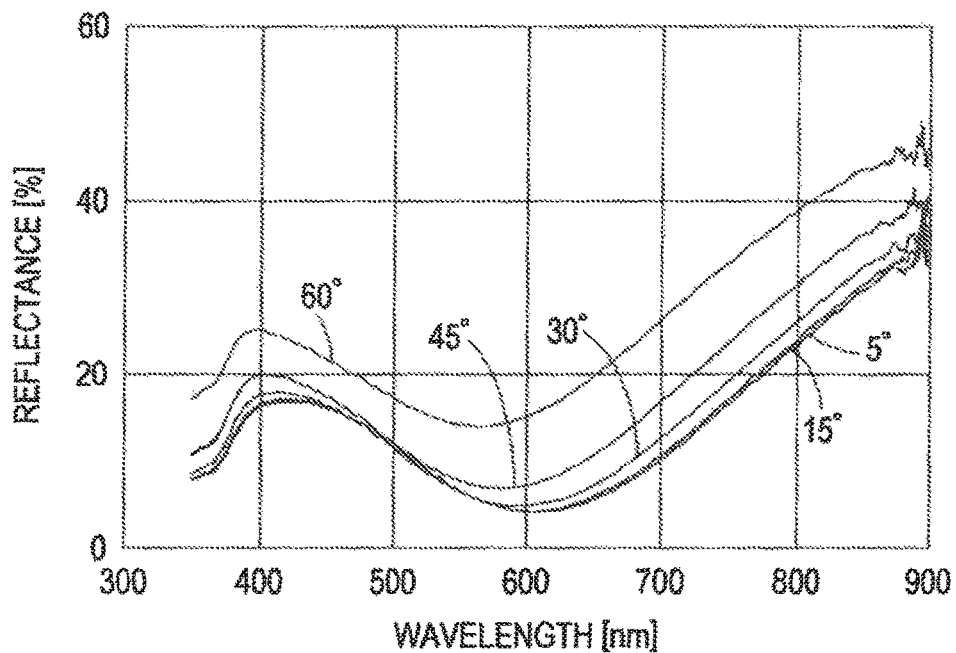
FIG. 48A is a graph showing reflection spectra of the optical film of Comparative Example 9 for film surface incidence.
Figure 48B:
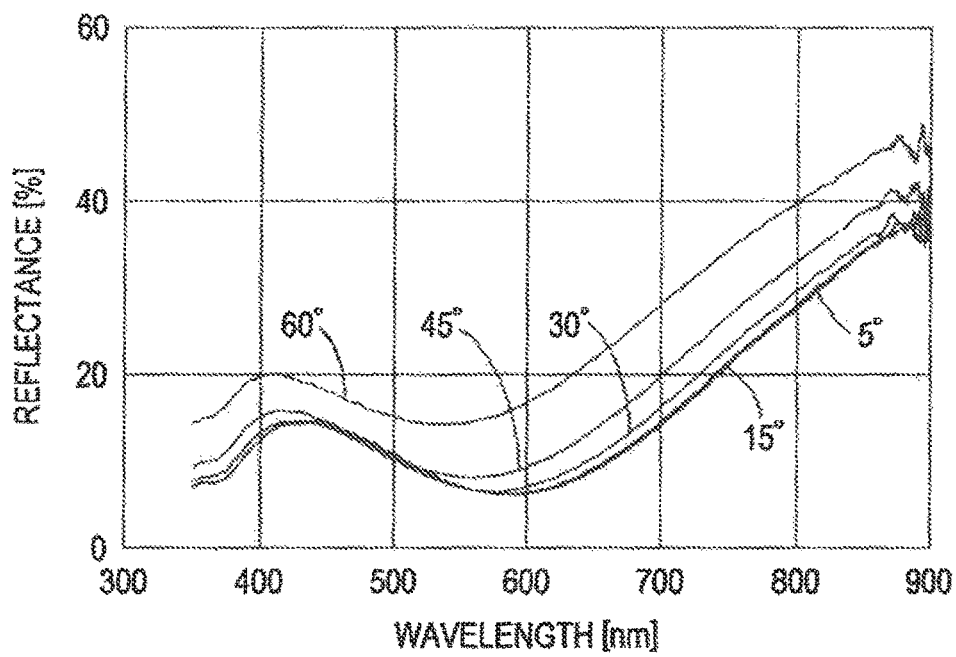
FIG. 48B is a graph showing reflection spectra of the optical film of Comparative Example 9 for non-film surface incidence.
Figure 49A:
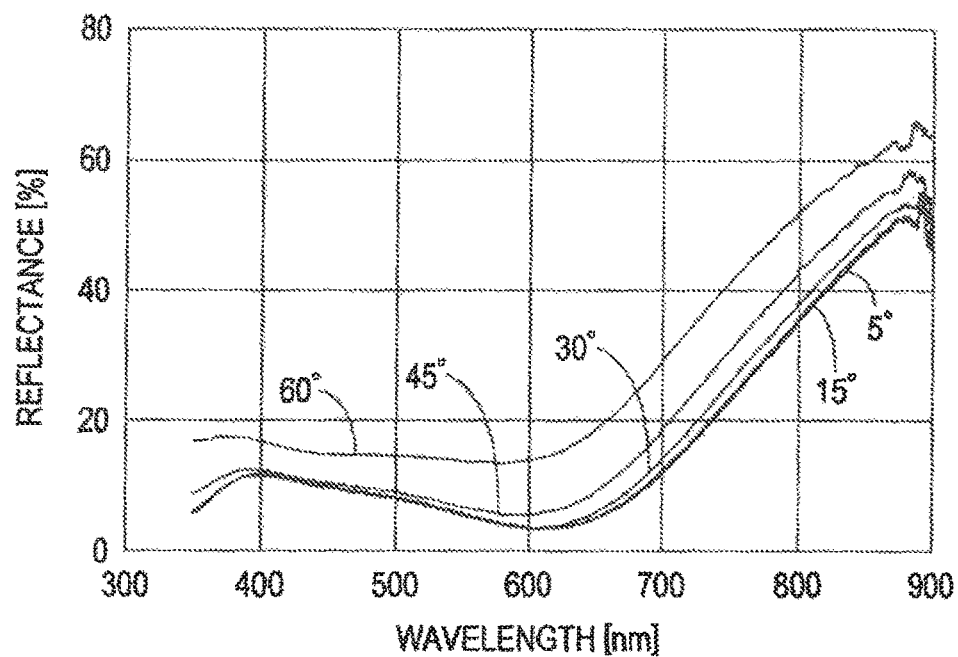
FIG. 49A is a graph showing reflection spectra of the optical film of Comparative Example 12 for film surface incidence.
Figure 49B:
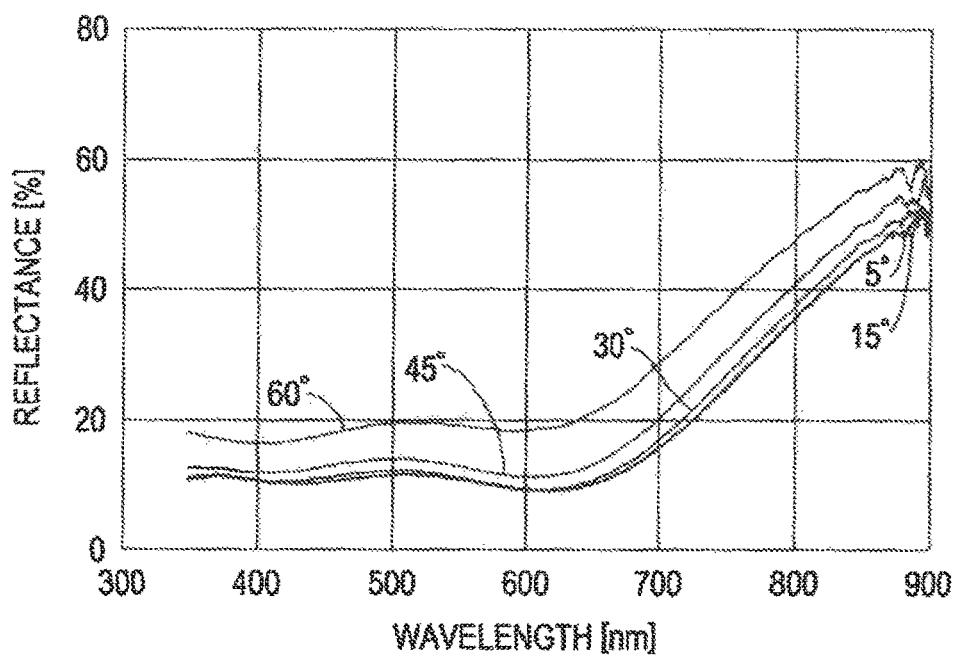
FIG. 49B is a graph showing reflection spectra of the optical film of Comparative Example 12 for non-film surface incidence.

The spectral transmittance and reflectance of the example films and the comparative examples were measured using the spectrophotometer V-550 manufactured by Jasco Corporation. The transmittance was measured by placing a detector at an angle of 0° with respect to an incident light beam and rotating the sample relative to the optical axis. The reflectance was measured by rotating the sample and the detector together so that it received specularly reflected light. In the transmittance and reflectance measurements, the angle of the sample perpendicular to the optical axis of the incident light beam was set to 0°. The measurements are shown in FIGS. 44A to 49B. The transmission and reflection colors were calculated from the spectrum measurement data according to JIS Z 8701 (1999), where the light source was a D65 light source and the field of view was 2°. The calculation results are shown in Tables 8 to 13 and FIGS. 50A and 50B. Any film had no significant variations in transmission color at different incident angles, but the films of the invention examples differed significantly from the films of the comparative Examples in the characteristics of reflection color. Any of the films of the invention examples had reflection spectra with flat spectral characteristics corresponding to Fresnel reflection either for retroreflective surface incidence or for nonretroreflective surface incidence. The reflection spectra of Example 9 are shown in FIGS. 47A and 47B, although the films of the other invention examples yielded similar results. The films of the comparative examples, however, had different colors when viewed at different angles and also had different colors between film surface incidence and non-film surface incidence. The reflection spectra of Comparative Examples 9 and 12 are shown in FIGS. 48A to 49B.

Table 8 shows the transmission colors of the optical films of Examples 4 to 9 for retroreflective surface incidence.

TABLE 8

| Incident angle | Example 4 x | Example 4 y | Example 7 x | Example 7 y | Example 8 x | Example 8 y | Example 9 x | Example 9 y |
|---|---|---|---|---|---|---|---|---|
| 0° | 0.309 | 0.349 | 0.289 | 0.324 | 0.317 | 0.341 | 0.304 | 0.335 |
| 15° | 0.309 | 0.349 | 0.289 | 0.324 | 0.317 | 0.341 | 0.304 | 0.335 |
| 30° | 0.310 | 0.348 | 0.291 | 0.325 | 0.317 | 0.341 | 0.304 | 0.335 |
| 45° | 0.309 | 0.345 | 0.290 | 0.325 | 0.317 | 0.341 | 0.305 | 0.335 |
| 60° | 0.311 | 0.344 | 0.291 | 0.326 | 0.318 | 0.342 | 0.307 | 0.336 |

Table 9 shows the transmission colors of the optical films of Comparative Examples 9 and 12 for film surface incidence.

TABLE 9

| Incident angle | Comparative Example 9 x | Comparative Example 9 y | Comparative Example 12 x | Comparative Example 12 y |
|---|---|---|---|---|
| 0° | 0.315 | 0.338 | 0.321 | 0.342 |
| 15° | 0.315 | 0.339 | 0.321 | 0.342 |
| 30° | 0.314 | 0.339 | 0.321 | 0.342 |
| 45° | 0.314 | 0.341 | 0.320 | 0.342 |
| 60° | 0.313 | 0.343 | 0.315 | 0.340 |

Table 10 shows the reflection colors of the optical films of Examples 7 to 9 for retroreflective surface incidence.

TABLE 10

| Incident angle | Example 7 x | Example 7 y | Example 8 x | Example 8 y | Example 9 x | Example 9 y |
|---|---|---|---|---|---|---|
| 5° | 0.314 | 0.335 | 0.310 | 0.328 | 0.307 | 0.326 |
| 15° | 0.314 | 0.335 | 0.310 | 0.328 | 0.306 | 0.326 |
| 30° | 0.314 | 0.334 | 0.310 | 0.328 | 0.307 | 0.326 |
| 45° | 0.314 | 0.335 | 0.311 | 0.328 | 0.307 | 0.326 |
| 60° | 0.315 | 0.333 | 0.312 | 0.330 | 0.308 | 0.328 |

Table 11 shows the reflection colors of the optical films of Examples 7 to 9 for nonretroreflective surface incidence.

TABLE 11

| Incident angle | Example 7 x | Example 7 y | Example 8 x | Example 8 y | Example 9 x | Example 9 y |
|---|---|---|---|---|---|---|
| 5° | 0.321 | 0.339 | 0.317 | 0.339 | 0.309 | 0.334 |
| 15° | 0.321 | 0.339 | 0.318 | 0.339 | 0.310 | 0.334 |
| 30° | 0.322 | 0.340 | 0.318 | 0.338 | 0.310 | 0.333 |
| 45° | 0.320 | 0.339 | 0.317 | 0.339 | 0.311 | 0.333 |
| 60° | 0.314 | 0.335 | 0.319 | 0.338 | 0.312 | 0.332 |

Table 12 shows the reflection colors of the optical films of Comparative Examples 9 and 12 for film surface incidence.

TABLE 12

| Incident angle | Comparative Example 9 x | Comparative Example 9 y | Comparative Example 12 x | Comparative Example 12 Y |
|---|---|---|---|---|
| 5° | 0.221 | 0.230 | 0.245 | 0.267 |
| 15° | 0.223 | 0.228 | 0.244 | 0.265 |
| 30° | 0.232 | 0.227 | 0.249 | 0.264 |
| 45° | 0.256 | 0.241 | 0.275 | 0.282 |
| 60° | 0.294 | 0.283 | 0.314 | 0.320 |

Table 13 shows the reflection colors of the optical films of Comparative Examples 9 and 12 for non-film surface incidence.

TABLE 13

| Incident angle | Comparative Example 9 x | Comparative Example 9 y | Comparative Example 12 x | Comparative Example 12 y |
|---|---|---|---|---|
| 5° | 0.257 | 0.253 | 0.300 | 0.334 |
| 15° | 0.261 | 0.254 | 0.299 | 0.333 |
| 30° | 0.272 | 0.255 | 0.297 | 0.331 |
| 45° | 0.293 | 0.268 | 0.302 | 0.331 |
| 60° | 0.320 | 0.305 | 0.317 | 0.338 |

Table 14 shows the absolute values of the differences in the chromaticity coordinates x (maximum differences in x) of specularly reflected light incident in the range of incident angle from 0° to 60° on the main surfaces of the optical films of Examples 4 to 9 and Comparative Examples 9 and 12 and the absolute values of the differences in the chromaticity coordinates y of the light (maximum differences in y).

TABLE 14

|  |  |  | Maximum difference in x | Maximum difference in y |
|---|---|---|---|---|
| Transmission color | Table 8 | Example 4 | 0.002 | 0.005 |
|  |  | Example 7 | 0.002 | 0.002 |
|  |  | Example 8 | 0.001 | 0.001 |
|  |  | Example 9 | 0.003 | 0.001 |
|  | Table 9 | Comparative Example 9 | 0.002 | 0.005 |
|  |  | Comparative Example 12 | 0.006 | 0.002 |
| Reflection color | Table 10 | Example 7 | 0.001 | 0.002 |
|  |  | Example 8 | 0.002 | 0.002 |
|  |  | Example 9 | 0.002 | 0.002 |
|  | Table 11 | Example 7 | 0.008 | 0.005 |
|  |  | Example 8 | 0.002 | 0.001 |
|  |  | Example 9 | 0.003 | 0.002 |
|  | Table 12 | Comparative Example 9 | 0.073 | 0.056 |
|  |  | Comparative Example 12 | 0.070 | 0.056 |
|  | Table 13 | Comparative Example 9 | 0.063 | 0.052 |
|  |  | Comparative Example 12 | 0.020 | 0.007 |

Example 13

First, a Ni—P alloy mold roller having the fine triangular pyramid profile shown in FIGS. 35A to 35C was prepared by cutting using a cutting tool. A urethane acrylate (ARONIX, manufactured by Toagosei Co., Ltd.; refractive index after curing: 1.533) was applied onto a PET film (A4300, manufactured by Toyobo Co., Ltd.) having a thickness of 75 μm and was cured in contact with the mold by irradiation with ultraviolet light through the PET film. The laminate of the resin layer formed by curing the urethane acrylate and the PET film was removed from the Ni—P alloy mold. Thus, a textured resin layer having a triangular pyramid profile was formed on the PET film. A wavelength-selective reflective layer A shown in Table 16 was then formed by sputtering on the molded surface on which the triangular pyramid profile was formed by the mold. The Ag—Pd—Cu alloy films were formed using an alloy target having the composition Ag:Pd:Cu=99.0:0.4:0.6 (in atomic percent).

Next, the production apparatus shown in FIG. 23 was used to embed the wavelength-selective reflective layer on the textured film with a resin as follows. Specifically, a resin composition having the formulation below was applied onto a flat PET film (A4300, manufactured by Toyobo Co., Ltd.) having a thickness of 75 μm, and the textured PET film having the wavelength-selective reflective layer was laminated on the flat PET film so that no bubbles remained therebetween. The resin composition was then cured by irradiation with ultraviolet light through the flat PET film. As a result, the resin composition between the flat PET film and the wavelength-selective reflective layer was cured to form an embedded resin layer. Thus, the intended optical film of Example 13 was produced.

Formulation of Resin Composition
Urethane acrylate 99 parts by mass
(ARONIX, manufactured by Toagosei Co., Ltd.; refractive index after curing: 1.533)
2-Acryloyloxyethyl acid phosphate 1 part by mass
(LIGHT-ACRYLATE P-1A, manufactured by Kyoeisha Chemical Co., Ltd.)
(the urethane acrylate contained additives such as a photoinitiator)

Example 14

An optical film of Example 14 was produced as in Example 13 except that the embedded resin layer had the following composition.
Formulation of Resin Composition
Urethane acrylate 98 parts by mass
(ARONIX, manufactured by Toagosei Co., Ltd.; refractive index after curing: 1.533)
2-Acryloyloxyethyl acid phosphate 2 parts by mass
(LIGHT-ACRYLATE P-1A, manufactured by Kyoeisha Chemical Co., Ltd.)

Example 15

An optical film of Example 15 was produced as in Example 13 except that the embedded resin layer had the following composition and the refractive index of the textured resin layer was adjusted by changing the formulation thereof so that it had a refractive index after curing of 1.530.
Formulation of Resin Composition for Upper Resin Layer
Urethane acrylate 95 parts by mass
(ARONIX, manufactured by Toagosei Co., Ltd.; refractive index after curing: 1.533)
2-Acryloyloxyethyl acid phosphate 5 parts by mass
(LIGHT-ACRYLATE P-1A, manufactured by Kyoeisha Chemical Co., Ltd.)

Example 16

An optical film of Example 16 was produced as in Example 15 except that the embedded resin layer had the following composition.
Formulation of Resin Composition for Upper Resin Layer
Urethane acrylate 95 parts by mass
(ARONIX, manufactured by Toagosei Co., Ltd.; refractive index after curing: 1.533)
2-Methacryloyloxyethyl acid phosphate 5 parts by mass
(LIGHT-ACRYLATE P-2M, manufactured by Kyoeisha Chemical Co., Ltd.)

Example 17

An optical film of Example 17 was produced as in Example 13 except that the wavelength-selective reflective layer used was a reflective layer B shown in Table 16. The Ag—Bi alloy films were formed using an alloy target having the composition Ag:Bi=99.0:1.0 (in atomic percent), and the $Nb_2O_5$ films were formed using a $Nb_2O_5$ ceramic target.

Example 18

An optical film of Example 18 was produced as in Example 17 except that the wavelength-selective reflective layer was a reflective layer C shown in Table 16.

Example 19

An optical film of Example 19 was produced as in Example 13 except that the wavelength-selective reflective layer was a reflective layer D shown in Table 16.

Example 20

An optical film of Example 20 was produced as in Example 13 except that the embedded resin layer and the textured resin layer had the following compositions.

Formulation of Resin Composition for Upper Resin Layer

Urethane acrylate 70 parts by mass (ARONIX, manufactured by Toagosei Co., Ltd.; refractive index after curing: 1.533)

2-Acryloyloxyethyl succinate 30 parts by mass (HOA-MS, manufactured by Kyoeisha Chemical Co., Ltd.)

Formulation of Resin Composition for Lower Resin Layer

Urethane acrylate 100 parts by mass (ARONIX, manufactured by Toagosei Co., Ltd.; refractive index after curing: 1.524)

Example 21

An optical film of Example 21 was produced as in Example 13 except that the embedded resin layer and the textured resin layer had the following compositions.

Formulation of Resin Composition for Upper Resin Layer

Urethane acrylate 85 parts by mass (ARONIX, manufactured by Toagosei Co., Ltd.; refractive index after curing: 1.533)

γ-butyrolactone methacrylate 15 parts by mass (GBLMA, manufactured by Osaka Organic Chemical Industry Ltd.)

Formulation of Resin Composition for Lower Resin Layer

Urethane acrylate 100 parts by mass (ARONIX, manufactured by Toagosei Co., Ltd.; refractive index after curing: 1.518)

Example 22

An optical film of Example 22 was produced as in Example 13 except that the embedded resin layer had the same composition as the textured resin layer.

Reference Example 1

An optical film of Reference Example 1 was produced as in Example 13 except that the embedded resin layer and the textured resin layer had the following composition.

Formulation of Resin Composition

Urethane acrylate 99 parts by mass (ARONIX, manufactured by Toagosei Co., Ltd.; refractive index after curing: 1.533)

2-Acryloyloxyethyl acid phosphate 1 part by mass (LIGHT-ACRYLATE P-1A, manufactured by Kyoeisha Chemical Co., Ltd.)

Evaluation of Adhesion of Reflective Layer

The prepared optical films were bonded to glass sheets having a thickness of 3 mm using an optically transparent adhesive agent, were peeled at the edges thereof, and were observed to evaluate the adhesion based on the following criteria:

A: The film was difficult to peel, and when the film was forcedly peeled, a bulk fracture occurred in the substrate or the resin layer B: The film was relatively difficult to peel, but when forcedly peeled, the film was peeled at the interface thereof C: The film was peeled at the interface thereof with resistance D: The film was peeled at the interface thereof without resistance The evaluation results are shown in Table 15.

Evaluation of Ease of Mold Release (Ni—P alloy mold)

A flat Ni—P alloy mold having the fine triangular pyramid profile shown in FIGS. 35A to 35C was prepared by cutting using a cutting tool. The resin used in each example was applied onto the mold, was covered with a PET film (A4300, manufactured by Toyobo Co., Ltd.) having a thickness of 75 μm, and was cured in contact with the mold by irradiation with ultraviolet light through the PET film at 1,000 mJ/cm$^2$. The laminate of the resin layer and the PET film was removed from the Ni—P alloy mold to evaluate the ease of mold release based on the following criteria:

A: The resin layer could be easily released from the mold after the curing

B: The resin layer could be released from the mold after the curing, with some resin remaining on the mold and the textured film appearing uneven C: The resin layer adhered to the mold and was not released after the curing The evaluation results are shown in Table 15.

Evaluation of Visibility

The prepared optical films were bonded to glass sheets with a thickness of 3 mm using an optically transparent adhesive agent. The glass sheets were held at a distance of about 50 cm from the eyes, and the interior of a neighboring building at a distance of about 10 m was observed through the glass sheets. The evaluation results were based on the following criteria:

A: Almost no multiple images due to diffraction were seen, and no problem occurred for window applications B: The shape of an object could be roughly recognized, but the multiple images due to diffraction were noticeable C: Nothing was recognized because of fogging due to diffraction The evaluation results are shown in Table 15.

Evaluation of Directional Reflection Direction

The optical films of Examples 7 to 21 were evaluated for directional reflection direction using the above measuring apparatus shown in FIG. 31 as follows. The detector 104 was rotated about the sample 103 as indicated by the arrows A to determine the direction in which the reflection intensity was maximized. The results are shown in Table 17.

Evaluation of Transmitted-Image Clarity

The optical films of Examples 7 to 21 were evaluated for transmitted-image clarity as follows. The transmitted-image clarity was evaluated using optical combs with comb widths of 2.0 mm, 1.0 mm, 0.5 mm, and 0.125 mm according to JIS K 7105. The measuring instrument used was an image clarity meter manufactured by Suga Test Instruments Co., Ltd (model: ICM-1T). Next, the sum of the values of transmitted-image clarity measured using the optical combs with comb widths of 2.0 mm, 1.0 mm, 0.5 mm, and 0.125 mm was determined. The results are shown in Table 17.

Table 15 shows the structures and evaluation results of the optical films of Examples 13 to 22 and Reference Example 1, where a sample for adhesion evaluation was not prepared in Reference Example 1 because the resin was not released from the mold.

TABLE 15

|  | Textured resin layer | Reflective layer | Embedded resin layer | Reflective layer adhesion | Ease of mold release (Ni—P) | Visibility |
|---|---|---|---|---|---|---|
| Example 13 | UV1.533 | Reflective layer A | UV1.533: 99% by mass<br>P-1A: 1% by mass | A | A | A |
| Example 14 | UV1.533 | Reflective layer A | UV1.533: 98% by mass<br>P-1A: 2% by mass | A | A | A |
| Example 15 | UV1.530 | Reflective layer A | UV1.533: 95% by mass<br>P-1A: 5% by mass | A | A | A |
| Example 16 | UV1.530 | Reflective layer A | UV1.533: 95% by mass<br>P-2M: 5% by mass | A | A | A |
| Example 17 | UV1.533 | Reflective layer B | UV1.533: 99% by mass<br>P-1A: 1% by mass | A | A | A |
| Example 18 | UV1.533 | Reflective layer C | UV1.533: 99% by mass<br>P-1A: 1% by mass | B | A | A |
| Example 19 | UV1.533 | Reflective layer D | UV1.533: 99% by mass<br>P-1A: 1% by mass | A | A | A |
| Example 20 | UV1.524 | Reflective layer A | UV1.533: 70% by mass<br>HOA-MS 30% by mass | A | A | A |
| Example 21 | UV1.518 | Reflective layer A | UV1.533: 85% by mass<br>GBLMA 15% by mass | B | A | A |
| Example 22 | UV1.533 | Reflective layer A | UV1.533 | D | A | A |
| Reference Example 1 | UV1.533: 99%<br>P-1A: 1% | Reflective layer A | UV1.533: 99% by mass<br>P-1A: 1% by mass | — | C | — |

UV1.533: ARONIX (refractive index after curing: 1.533), manufactured by Toagosei Co., Ltd.
UV1.530: ARONIX (refractive index after curing: 1.530), manufactured by Toagosei Co., Ltd.
UV1.524: ARONIX (refractive index after curing: 1.524), manufactured by Toagosei Co., Ltd.
UV1.518: ARONIX (refractive index after curing: 1.518), manufactured by Toagosei Co., Ltd.
P-1A: 2-acryloyloxyethyl acid phosphate, manufactured by Kyoeisha Chemical Co., Ltd.
P-2M: 2-methacryloyloxyethyl acid phosphate, manufactured by Kyoeisha Chemical Co., Ltd.
HOA-MS: 2-acryloyloxyethyl succinate, manufactured by Kyoeisha Chemical Co., Ltd.
GBLMA: γ-butyrolactone methacrylate, manufactured by Osaka Organic Chemical Industry Ltd.

Table 16 shows the film structures of the wavelength-selective reflective layers of the optical films of Examples 13 to 22.

TABLE 16

|  | First layer | Second layer | Third layer | Fourth layer | Fifth layer | Sixth layer | Seventh layer | Eighth layer |
|---|---|---|---|---|---|---|---|---|
| Reflective layer A | ZnO<br>40 nm | AgPdCu<br>9 nm | ZnO<br>80 nm | AgPdCu<br>9 nm | ZnO<br>40 nm | — | — | — |
| Reflective layer B | $Nb_2O_5$<br>38 nm | AgBi<br>18 nm | ZnO<br>7 nm | $Nb_2O_5$<br>63 nm | AgBi<br>19 nm | ZnO<br>7 nm | $Nb_2O_5$<br>33 nm | ZnO<br>3 nm |
| Reflective layer C | $Nb_2O_5$<br>38 nm | AgBi<br>18 nm | ZnO<br>7 nm | $Nb_2O_5$<br>63 nm | AgBi<br>19 nm | ZnO<br>7 nm | $Nb_2O_5$<br>35 nm | — |
| Reflective layer D | ZnO<br>200 nm | — | — | — | — | — | — | — |

Table 17 shows the evaluation results of the directional reflection direction and transmitted-image clarity of the optical films of Examples 7 to 21 and at an incident angle (θ, φ) of (10°, 45°).

TABLE 17

| | Directional reflection direction | | Transmitted-image clarity | | | | |
|---|---|---|---|---|---|---|---|
| | φ | θ | 0.125 mm | 0.5 mm | 1.0 mm | 2.0 mm | Total |
| Example 7 | 10° | 45° | 58 | 77 | 89 | 95 | 319 |
| Example 8 | 10° | 45° | 75 | 88 | 94 | 97 | 354 |
| Example 9 | 10° | 45° | 62 | 81 | 90 | 97 | 330 |
| Example 10 | 10° | 45° | 71 | 84 | 92 | 97 | 344 |
| Example 11 | 10° | 45° | 66 | 83 | 91 | 96 | 336 |
| Example 12 | 10° | 45° | 57 | 80 | 90 | 96 | 323 |
| Example 13 | 10° | 45° | 75 | 91 | 94 | 98 | 358 |
| Example 14 | 10° | 45° | 69 | 86 | 92 | 97 | 344 |
| Example 15 | 10° | 45° | 65 | 83 | 92 | 97 | 337 |
| Example 16 | 10° | 45° | 67 | 85 | 93 | 98 | 343 |
| Example 17 | 10° | 45° | 71 | 84 | 92 | 95 | 342 |
| Example 18 | 10° | 45° | 68 | 79 | 90 | 96 | 333 |
| Example 19 | 10° | 45° | 70 | 80 | 89 | 96 | 335 |
| Example 20 | 10° | 45° | 65 | 82 | 91 | 97 | 335 |
| Example 21 | 10° | 45° | 69 | 83 | 90 | 96 | 338 |

The following can be seen from Table 17.

For the optical films of Examples 7 to 21, the value of image clarity measured using the optical comb with a comb width of 0.5 mm was more than 50, and the sum of the values of image clarity measured using the individual optical combs was more than 230.

In view of visibility, it can be concluded from the evaluation results in Tables 3 and 17 that the value of transmitted-image clarity measured using an optical comb with a comb width of 0.5 mm is preferably 50 or more and that the sum of the values of image clarity measured using optical combs with comb widths of 0.125 mm, 0.5 mm, 1.0 mm, and 2.0 mm is preferably 230 or more.

Experimental Example 1

First, ZnO films were deposited to a thickness of 20 nm on glass sheets by vacuum sputtering to prepare test pieces. Then 2-acryloyloxyethyl acid phosphate (LIGHT-ACRYLATE P-1A, manufactured by Kyoeisha Chemical Co., Ltd.) was added to an acrylic resin composition (ARONIX, manufactured by Toagosei Co., Ltd.; refractive index after curing: 1.533) in varying amounts shown in Table 18 to prepare acrylic resin compositions containing different amounts of additive. The test pieces were coated with the acrylic resin compositions, were covered with ZEONOR® films (manufactured by Zeon Corporation), and were irradiated with ultraviolet light at 1,000 mJ/cm² to cure the resins. Thus, the intended samples were prepared.

Experimental Example 2

Samples were prepared as in Experimental Example 1 except that 2-methacryloyloxyethyl acid phosphate (LIGHT-ACRYLATE P-2M, manufactured by Kyoeisha Chemical Co., Ltd.) was added as the additive in varying amounts shown in Table 18.

Experimental Example 3

Samples were prepared as in Experimental Example 1 except that 2-acryloyloxyethyl succinate (HOA-MS, manufactured by Kyoeisha Chemical Co., Ltd.) was added as the additive in varying amounts shown in Table 18.

Experimental Example 4

Samples were prepared as in Experimental Example 1 except that γ-butyrolactone methacrylate (GBLMA, manufactured by Osaka Organic Chemical Industry Ltd.) was added as the additive in varying amounts shown in Table 18.

Evaluation of Adhesion

The ZEONOR® films were removed from the samples, and the resin layers were cross-cut into 100 squares using a cutter to carry out an adhesion test based on the following criteria:

A: The resin layer had high adhesion, and no square was peeled

B: The resin layer had relatively high adhesion, and 0 to 20 squares were peeled C: The resin layer had relatively low adhesion, and 20 to 50 squares were peeled D: The resin layer had low adhesion, and 50 to 100 squares were peeled The evaluation results are shown in Table 18.

Table 18 shows the evaluation results of the samples of Experimental Examples 1 to 4.

TABLE 18

| | Additive | | Content | | | | | | | |
|---|---|---|---|---|---|---|---|---|---|---|
| | Type | Product No. | 0% | 0.5% | 1% | 2% | 5% | 10% | 20% | 50% |
| Experimental Example 1 | Phosphate | P-1A | D | A | A | A | A | A | — | — |
| Experimental Example 2 | | P-2M | — | — | A | A | A | A | — | — |
| Experimental Example 3 | Succinate | HOA-MS | — | — | — | — | D | D | B | A |
| Experimental Example 4 | Butyrolactone | GBLMA | — | — | — | D | D | B | — | — |

%: percent by mass

The following can be seen from Table 18.

If the additive used is phosphate-based, the adhesion can be improved by adding a relatively small amount of additive, namely, about 0.5%. If the additive used is succinate- or butyrolactone-based, the adhesion can be improved by adding a relatively large amount of additive, namely, about 20% or more.

Experimental Example 5

First, flat Ni—P alloy molds having the fine triangular profile shown in FIGS. 35A to 35C were prepared by cutting using a cutting tool. Then 2-acryloyloxyethyl acid phosphate (LIGHT-ACRYLATE P-1A, manufactured by Kyoeisha Chemical Co., Ltd.) was added to an acrylic resin composition (ARONIX, manufactured by Toagosei Co., Ltd.; refractive index after curing: 1.533) in varying amounts shown in Table 19 to prepare acrylic resin compositions containing different amounts of additive. These acrylic resin compositions were applied onto the textured surfaces of the flat Ni—P alloy molds, were covered with PET films (A4300, manufactured by Toyobo Co., Ltd.) having a thickness of 75 μm, and were cured in contact with the molds by irradiation with ultraviolet light through the PET film at 1,000 mJ/cm$^2$. Thus, the intended samples were prepared.

Experimental Example 6

Samples were prepared as in Experimental Example 5 except that 2-methacryloyloxyethyl acid phosphate (LIGHT-ACRYLATE P-2M, manufactured by Kyoeisha Chemical Co., Ltd.) was added as the additive in varying amounts shown in Table 19.

Experimental Example 7

Samples were prepared as in Experimental Example 5 except that 2-acryloyloxyethyl succinate (HOA-MS, manufactured by Kyoeisha Chemical Co., Ltd.) was added as the additive in varying amounts shown in Table 19.

Experimental Example 8

Samples were prepared as in Experimental Example 5 except that γ-butyrolactone methacrylate (GBLMA, manufactured by Osaka Organic Chemical Industry Ltd.) was added as the additive in varying amounts shown in Table 19.

Evaluation of Ease of Mold Release

The laminates of the cured resin layers and the PET films were removed from the flat Ni—P alloy molds to evaluate the ease of mold release based on the following criteria:
A: The resin layer could be easily released from the mold after the curing
B: The resin layer could be released from the mold after the curing, with some resin remaining on the mold and the textured film appearing uneven
C: The resin layer adhered to the mold and was not released after the curing The evaluation results are shown in Table 19.
Table 19 shows the evaluation results of the samples of Experimental Examples 5 to 8.

The following can be seen from Table 19.

While a resin layer containing no additive can be easily released from a mold, a resin layer containing at least 1% of additive for improving adhesion has a problem in adhesion. In particular, a resin layer containing 1% of phosphate-based additive, which improves adhesion when added in small amounts, adheres completely to a mold, and even a resin layer containing 1% of butyrolactone-based additive, which has relatively low adhesion, is unsuitable for profile transfer because some resin remains on the mold.

The structures, shapes, materials, values, etc. shown in the above embodiments and examples are merely illustrative, and different structures, shapes, materials, values, etc. may be used where appropriate.

In addition, the features of the above embodiments can be combined.

In addition, although the removable film 22 is used to form the flat surface of the second optical layer 5 in the above embodiments, the method for forming the surface is not limited thereto. For example, it is possible to apply a hot-melt resin or a radiation-curable resin onto the textured surface of the wavelength-selective reflective layer and form a flat surface using a mirror roller. It is also possible to apply a resin suitable for leveling, such as a radiation-curable resin or a thermosetting resin, onto the textured surface of the wavelength-selective reflective layer and form a flat surface. Alternatively, the step of applying a resin onto the textured surface of the wavelength-selective reflective layer may be omitted, and it is possible to apply an adhesive agent onto the textured surface and form a flat surface by leveling the adhesive agent.

Although the directional reflectors according to the above embodiments are applied to window articles as an example of application, as described above, they may also be applied to, for example, Venetian blinds or roll curtains.

Examples of Venetian blinds or roll curtains to which the directional reflectors are applied include those formed of the directional reflectors themselves and those formed of transparent substrates having the directional reflectors laminated thereon. Such a Venetian blind or roll curtain can be disposed indoors near a window to, for example, directionally reflect only infrared light outdoors while transmitting visible light indoors. This reduces the usage of interior illumination and also alleviates an ambient temperature rise because the Venetian blind or roll curtain does not scatter light. In addition, the Venetian blind or roll curtain may be lifted if reflection of thermal radiation is not desired, as in winter, thus providing the advantage that its function to reflect thermal radiation can be flexibly used depending on situations. In contrast, Venetian blinds and roll curtains for

TABLE 19

| | Additive | | Content | | | | | | | |
| | Type | Product No. | 0% | 0.5% | 1% | 2% | 5% | 10% | 20% | 50% |
| --- | --- | --- | --- | --- | --- | --- | --- | --- | --- | --- |
| Experimental Example 5 | Phosphate | P-1A | A | — | C | — | — | — | — | — |
| Experimental Example 6 | | P-2M | — | C | — | — | — | — | — | — |
| Experimental Example 7 | Succinate | HOA-MS | — | — | — | — | — | B | C | C |
| Experimental Example 8 | Butyrolactone | GBLMA | — | B | — | B | C | — | — | — |

%: percent by mass shielding infrared light in the related art are white, gray, or cream because they are coated with, for example, infrared-reflecting paints. Because these Venetian blinds and roll curtains simultaneously shield infrared light and visible light, the usage of interior illumination is increased. The directional reflectors according to the above embodiments can also be used in a form such as a Japanese Shoji screen (a type of sliding door) and may be removed when it is not used.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An optical element comprising:
   an optical layer having a flat incident surface on which light is incident; and
   a wavelength-selective reflective layer disposed in the optical layer, the wavelength-selective reflective layer having a surface profile including a one-dimensional array of columns extending in one direction;
   wherein $\theta$ is the angle of light incident on the first surface or reflected light exiting the first surface with respect to a normal of the first surface,
   $\varphi$ is the angle of a component of the light incident on the first surface or the reflected light projected on the first surface with respect to a line perpendicular to ridges of the columns in the first surface, and
   of light incident on the first surface at an incident angle ($\theta$, $\varphi$), the optical element selectively directionally reflects the light in at least one specific wavelength range in at least one direction other than a specular reflection direction ($-\theta$, $\varphi+180°$) and in at least one ($\theta_0$, $-\varphi$) direction, where $0°<\theta_0<90°$, while transmitting light in at least one wavelength range other than the specific wavelength range, and is transparent to light in at least one wavelength range other than the specific wavelength range.

2. The optical element according to claim 1, wherein a value of transmitted-image clarity measured according to JIS K 7105 using an optical comb with a comb width of 0.5 mm in the wavelength range where light is transmitted is 50 or more.

3. The optical element according to claim 1, wherein the sum of values of transmitted-image clarity measured according to JIS K 7105 using optical combs with comb widths of 0.125 mm, 0.5 mm, 1.0 mm, and 2.0 mm in the wavelength range where light is transmitted is 230 or more.

4. The optical element according to claim 1, wherein the angle $\varphi$ of the directionally reflected light in the specific wavelength range is $-90°$ to $90°$.

5. The optical element according to claim 1, wherein the angle of the directionally reflected light in the specific wavelength range lies near ($\theta$, $-\varphi$).

6. The optical element according to claim 1, wherein the angle of the directionally reflected light in the specific wavelength range lies near ($\theta$, $\varphi$).

7. The optical element according to claim 1, wherein the directionally reflected light mainly includes near infrared light in a wavelength range from 780 to 2,100 nm.

8. The optical element according to claim 1, wherein the wavelength selective reflective layer is a transparent conductive layer mainly containing a conductive material transparent in the visible region or a functional layer mainly containing a chromic material whose reflection performance changes reversibly in response to external stimuli.

9. The optical element according to claim 1, wherein
the wavelength-selective reflective layer includes a plurality of wavelength selective reflective layers inclined with respect to the incident surface; and
the wavelength-selective reflective layers are arranged parallel to each other.

10. The optical element according to claim 1, wherein
the wavelength-selective reflective layer has first and second main surfaces;
the optical layer includes a first optical layer on the first main surface of the wavelength-selective reflective layer and a second optical layer on the second main surface of the wavelength-selective reflective layer; and
the first optical layer has a one- or two-dimensional array of structures on a surface on which the wavelength-selective reflective layer is disposed.

11. The optical element according to claim 10, wherein the first and second optical layers have a refractive index difference of 0.010 or less.

12. The optical element according to claim 10, wherein
the first and second optical layers are formed of the same resin transparent in the visible region; and
the second optical layer contains an additive.

13. The optical element according to claim 10, wherein the structures have a prism shape, a cylindrical shape, a hemispherical shape, or a corner cube shape.

14. The optical element according to claim 10, wherein
the major axis of the structures is inclined in a direction in which the structures are arranged with respect to a normal to the incident surface.

15. The optical element according to claim 10, wherein the pitch of the structures is from 5 μm to 5 mm.

16. The optical element according to claim 1, wherein the optical layer absorbs light in at least one specific wavelength range in the visible region.

17. The optical element according to claim 1, further comprising a light scatterer at one or more of a surface of the optical layer, an inside of the optical layer, and an interface between the optical layer and the wavelength-selective reflective layer.

18. The optical element according to claim 1, wherein the maximum absolute value of difference in the chromaticity coordinate x of light incident on the incident surface or a surface opposite to the incident surface in the range of incident angle e from 0° to 60° and specularly reflected by the optical element and the maximum absolute value of difference in the chromaticity coordinate y of the light are each 0.05 or less for each surface.

19. A window article comprising:
an optical element, the optical element including:
    an optical layer having a flat incident surface on which light is incident; and
    a wavelength-selective reflective layer disposed in the optical layer, the wavelength-selective reflective layer having a surface profile including a one-dimensional array of columns extending in one direction;
    wherein $\theta$ is the angle of the light incident on the first surface or reflected light exiting the first surface with respect to a normal of the first surface,
    $\varphi$ is the angle of a component of the light incident on the first surface or the reflected light projected on the first surface with respect to a line perpendicular to ridges of the columns in the first surface, and of the light incident on the first surface at an incident angle $(\theta, \varphi)$, the optical element selectively directionally reflects the light in at least one specific wavelength range in at least one direction other than a specular reflection direction $(-\theta, \varphi+180°$ and in at least one $(\theta_0, -\varphi)$ direction, where $0°<\theta_0<90°$, while transmitting light in at least one wavelength range other than the specific wavelength range, and is transparent to light in at least one wavelength range other than the specific wavelength range.

\* \* \* \* \*